US010649622B2

(12) United States Patent
Yang et al.

(10) Patent No.: US 10,649,622 B2
(45) Date of Patent: May 12, 2020

(54) ELECTRONIC MESSAGE USER INTERFACE

(71) Applicant: Apple Inc., Cupertino, CA (US)

(72) Inventors: Lawrence Y. Yang, San Francisco, CA (US); Stephen O. Lemay, Palo Alto, CA (US); Alan C. Dye, San Francisco, CA (US); Christopher Patrick Foss, San Francisco, CA (US); Christopher Wilson, Santa Clara, CA (US); Imran Chaudhri, San Francisco, CA (US); Gary Ian Butcher, San Jose, CA (US); Jonathan R. Dascola, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 232 days.

(21) Appl. No.: 14/641,308

(22) Filed: Mar. 7, 2015

(65) Prior Publication Data

US 2016/0065509 A1    Mar. 3, 2016

Related U.S. Application Data

(60) Provisional application No. 62/044,950, filed on Sep. 2, 2014.

(51) Int. Cl.
*G06F 3/0482*     (2013.01)
*H04L 12/58*      (2006.01)
(Continued)

(52) U.S. Cl.
CPC .......... *G06F 3/0482* (2013.01); *G06F 3/0362* (2013.01); *G06F 3/04883* (2013.01); *G06F 3/04886* (2013.01); *H04L 51/22* (2013.01)

(58) Field of Classification Search
CPC .. G06F 3/0482; G06F 3/0362; G06F 3/04883; G06F 3/04886; H04L 51/22
See application file for complete search history.

(56) References Cited

U.S. PATENT DOCUMENTS

| 5,751,260 A | 5/1998 | Nappi et al. |
| 6,266,098 B1 | 7/2001 | Cove et al. |

(Continued)

FOREIGN PATENT DOCUMENTS

| AU | 2014100584 A4 | 7/2014 |
| CN | 101203821 A | 6/2008 |

(Continued)

OTHER PUBLICATIONS

Dewsbery, V. "Designing for Small Screens", 2005, AVA Publishing (Year: 2005).*

(Continued)

*Primary Examiner* — Stella Higgs
(74) *Attorney, Agent, or Firm* — Dentons US LLP

(57) ABSTRACT

The present disclosure relates to electronic message user interfaces. A device, including a display, a touch-sensitive surface, and a rotatable input mechanism, is described in relation to accessing, composing, and manipulating electronic messages. In some examples, a user can provide input through the rotatable input mechanism to access a landing screen of an electronic messages application. The landing screen concurrently displays an affordance for accessing an electronic messages inbox and an affordance for accessing an interface for composing electronic message.

45 Claims, 19 Drawing Sheets

(51) Int. Cl.
*G06F 3/0488* (2013.01)
*G06F 3/0362* (2013.01)

(56) References Cited

U.S. PATENT DOCUMENTS

| | | |
|---|---|---|
| 6,323,846 B1 | 11/2001 | Westerman et al. |
| 6,477,117 B1 | 11/2002 | Narayanaswami et al. |
| 6,556,222 B1 | 4/2003 | Narayanaswami |
| 6,570,557 B1 | 5/2003 | Westerman et al. |
| 6,661,438 B1 | 12/2003 | Shiraishi et al. |
| 6,662,023 B1 | 12/2003 | Helle |
| 6,677,932 B1 | 1/2004 | Westerman |
| 6,809,724 B1* | 10/2004 | Shiraishi ............... G06F 1/163 345/157 |
| 7,081,905 B1 | 7/2006 | Raghunath |
| 7,091,964 B2 | 8/2006 | Wong et al. |
| 7,130,664 B1 | 10/2006 | Williams |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,050,997 B1 | 11/2011 | Nosek et al. |
| 8,239,784 B2 | 8/2012 | Hotelling et al. |
| 8,279,180 B2 | 10/2012 | Hotelling et al. |
| 8,365,090 B2 | 1/2013 | Ording |
| 8,381,135 B2 | 2/2013 | Hotelling et al. |
| 8,479,122 B2 | 7/2013 | Hotelling et al. |
| 8,665,209 B2 | 3/2014 | Rimas-Ribikauskas et al. |
| 8,666,361 B2 | 3/2014 | Chu et al. |
| 8,860,674 B2 | 10/2014 | Lee et al. |
| 8,868,338 B1 | 10/2014 | Chau et al. |
| 8,954,887 B1 | 2/2015 | Tseng et al. |
| 9,052,814 B2 | 6/2015 | Ording |
| 9,195,219 B2 | 11/2015 | Hong et al. |
| 9,395,905 B2 | 7/2016 | Wherry |
| 9,798,443 B1 | 10/2017 | Gray |
| 2002/0015024 A1 | 2/2002 | Westerman et al. |
| 2003/0052901 A1 | 3/2003 | Fukuchi |
| 2004/0130581 A1* | 7/2004 | Howard ............... G06F 3/0482 715/854 |
| 2005/0187873 A1 | 8/2005 | Labrou et al. |
| 2005/0190059 A1 | 9/2005 | Wehrenberg |
| 2005/0191159 A1 | 9/2005 | Benko |
| 2006/0017692 A1 | 1/2006 | Wehrenberg et al. |
| 2006/0026536 A1 | 2/2006 | Hotelling et al. |
| 2006/0033724 A1 | 2/2006 | Chaudhri et al. |
| 2006/0069604 A1 | 3/2006 | Leukart et al. |
| 2006/0085751 A1 | 4/2006 | O'Brien et al. |
| 2006/0197753 A1 | 9/2006 | Hotelling |
| 2006/0212905 A1 | 9/2006 | Matsuda et al. |
| 2006/0294025 A1 | 12/2006 | Mengerink |
| 2007/0030256 A1 | 2/2007 | Akaike et al. |
| 2007/0135043 A1 | 6/2007 | Hayes et al. |
| 2007/0168369 A1 | 7/2007 | Bruns |
| 2008/0033779 A1 | 2/2008 | Coffman et al. |
| 2008/0052643 A1 | 2/2008 | Ike et al. |
| 2008/0062141 A1 | 3/2008 | Chandhri |
| 2008/0165153 A1 | 7/2008 | Platzer et al. |
| 2008/0174570 A1* | 7/2008 | Jobs ............... G06F 3/0488 345/173 |
| 2008/0216001 A1* | 9/2008 | Ording ............... G06F 3/044 715/763 |
| 2008/0320391 A1 | 12/2008 | Lemay et al. |
| 2009/0036165 A1 | 2/2009 | Brede |
| 2009/0119678 A1* | 5/2009 | Shih ............... G06Q 10/10 719/313 |
| 2009/0177538 A1 | 7/2009 | Brewer et al. |
| 2009/0189915 A1 | 7/2009 | Mercer et al. |
| 2009/0199130 A1 | 8/2009 | Tsern et al. |
| 2009/0204929 A1 | 8/2009 | Baurmann et al. |
| 2009/0205041 A1 | 8/2009 | Michalske |
| 2010/0017748 A1 | 1/2010 | Taylor et al. |
| 2010/0026640 A1 | 2/2010 | Kim et al. |
| 2010/0223055 A1* | 9/2010 | McLean ............ H04M 1/72552 704/235 |
| 2010/0223145 A1 | 9/2010 | Dragt |
| 2010/0271312 A1 | 10/2010 | Alameh et al. |
| 2011/0022472 A1 | 1/2011 | Zon et al. |
| 2011/0078622 A1 | 3/2011 | Missig et al. |
| 2011/0086613 A1 | 4/2011 | Doudkine et al. |
| 2011/0088086 A1 | 4/2011 | Swink et al. |
| 2011/0167369 A1 | 7/2011 | Van Os |
| 2011/0202861 A1 | 8/2011 | Fritzley et al. |
| 2011/0234633 A1 | 9/2011 | Ogura et al. |
| 2011/0248948 A1 | 10/2011 | Griffin et al. |
| 2011/0251892 A1 | 10/2011 | Laracey et al. |
| 2011/0302493 A1 | 12/2011 | Runstedler et al. |
| 2012/0016678 A1 | 1/2012 | Gruber et al. |
| 2012/0019513 A1 | 1/2012 | Fong et al. |
| 2012/0050185 A1 | 3/2012 | Davydov et al. |
| 2012/0066629 A1 | 3/2012 | Lee et al. |
| 2012/0083260 A1 | 4/2012 | Arriola et al. |
| 2012/0089507 A1 | 4/2012 | Zhang et al. |
| 2012/0089951 A1 | 4/2012 | Cassidy |
| 2012/0159380 A1 | 6/2012 | Kocienda et al. |
| 2012/0197743 A1 | 8/2012 | Grigg et al. |
| 2012/0204123 A1 | 8/2012 | Bauer et al. |
| 2012/0258684 A1 | 10/2012 | Franz et al. |
| 2012/0272145 A1 | 10/2012 | Ryan et al. |
| 2012/0290449 A1 | 11/2012 | Mullen et al. |
| 2012/0306765 A1* | 12/2012 | Moore ............... G06F 3/041 345/173 |
| 2012/0310760 A1 | 12/2012 | Phillips et al. |
| 2012/0322370 A1 | 12/2012 | Lee |
| 2012/0322371 A1 | 12/2012 | Lee |
| 2012/0324357 A1 | 12/2012 | Viegers et al. |
| 2012/0324390 A1 | 12/2012 | Tao |
| 2013/0024780 A1* | 1/2013 | Sutedja ............... G06Q 10/107 715/752 |
| 2013/0063383 A1 | 3/2013 | Anderssonreimer et al. |
| 2013/0097566 A1 | 4/2013 | Berglund |
| 2013/0103519 A1 | 4/2013 | Kountotsis et al. |
| 2013/0110719 A1 | 5/2013 | Carter et al. |
| 2013/0111407 A1 | 5/2013 | Mullen |
| 2013/0143512 A1 | 6/2013 | Hernandez et al. |
| 2013/0225118 A1 | 8/2013 | Jang et al. |
| 2013/0244615 A1 | 9/2013 | Miller et al. |
| 2013/0304651 A1 | 11/2013 | Smith et al. |
| 2013/0332364 A1 | 12/2013 | Templeton et al. |
| 2013/0339343 A1 | 12/2013 | Hierons et al. |
| 2014/0028735 A1 | 1/2014 | Williams et al. |
| 2014/0036639 A1 | 2/2014 | Boni et al. |
| 2014/0040742 A1 | 2/2014 | Park et al. |
| 2014/0068751 A1 | 3/2014 | Last |
| 2014/0074716 A1 | 3/2014 | Ni |
| 2014/0101056 A1 | 4/2014 | Wendling |
| 2014/0105278 A1 | 4/2014 | Bivolarsky |
| 2014/0129441 A1 | 5/2014 | Blanco et al. |
| 2014/0139422 A1 | 5/2014 | Mistry et al. |
| 2014/0139637 A1 | 5/2014 | Mistry et al. |
| 2014/0155031 A1 | 6/2014 | Lee et al. |
| 2014/0279442 A1 | 9/2014 | Luoma et al. |
| 2014/0279556 A1 | 9/2014 | Priebatsch et al. |
| 2014/0333670 A1* | 11/2014 | Agnetta ............... G06F 3/0481 345/650 |
| 2015/0058744 A1 | 2/2015 | Dhingra et al. |
| 2015/0077398 A1 | 3/2015 | Yairi et al. |
| 2015/0178041 A1 | 6/2015 | Uskoreit |
| 2015/0302301 A1* | 10/2015 | Petersen ............... G06Q 10/107 706/11 |
| 2015/0379476 A1 | 12/2015 | Chaudhri et al. |
| 2016/0054710 A1 | 2/2016 | Jo et al. |
| 2016/0062567 A1 | 3/2016 | Yang et al. |
| 2016/0065525 A1 | 3/2016 | Dye et al. |
| 2018/0367489 A1 | 12/2018 | Dye et al. |

(56) References Cited

U.S. PATENT DOCUMENTS

FOREIGN PATENT DOCUMENTS

| | | |
|---|---|---|
| CN | 102763066 A | 10/2012 |
| EP | 1052566 A1 | 11/2000 |
| EP | 1679879 A2 | 7/2006 |
| EP | 2284646 A1 | 2/2011 |
| EP | 2547117 A1 | 1/2013 |
| EP | 2551784 A1 | 1/2013 |
| EP | 2693382 A2 | 2/2014 |
| EP | 2733579 A2 | 5/2014 |
| EP | 2733598 A2 | 5/2014 |
| JP | 55-80084 A | 6/1980 |
| TW | I394410 B1 | 4/2013 |
| TW | I395498 B | 5/2013 |
| TW | 201403363 A | 1/2014 |
| TW | I443547 B | 7/2014 |
| WO | 2006/037545 A2 | 4/2006 |
| WO | 2008/033853 A2 | 3/2008 |
| WO | 2008/085742 A2 | 7/2008 |
| WO | 2009/097592 A1 | 8/2009 |
| WO | 2012/006494 A1 | 1/2012 |
| WO | 2013/169842 A2 | 11/2013 |
| WO | 2013/169849 A2 | 11/2013 |
| WO | 2013/169875 A2 | 11/2013 |
| WO | 2014078965 A1 | 5/2014 |
| WO | 2014/105276 A1 | 7/2014 |

OTHER PUBLICATIONS

Office Action received for Taiwanese Patent Application No. 104120843, dated Jan. 30, 2016, 5 pages (1 page of English Translation and 4 pages of Official Copy).

Ellis Benus, "Put a Phone Number in Google Calender Where Line for One Click Calling", Oct. 31, 2012, 5 pages.

International Search Report and Written Opinion received for PCT Patent Application No. PCT/US2015/038173 dated Sep. 25, 2015, 13 pages.

International Search Report and Written Opinion received for PCT Application No. PCT/US2015/038174, dated Jan. 18, 2016, 38 pages.

Invitation to Pay Additional Fees Due and Communication Relating to the Results of the Partial International Search received for PCT Patent Application No. PCT/US2015/038174, dated Oct. 5, 2015, 5 pages.

International Search Report and Written Opinion received for PCT Application No. PCT/US2015/045936, dated Nov. 4, 2015, 12 pages.

International Search Report and Written Opinion received for PCT Patent Application No. PCT/US2015/045965, dated Feb. 1, 2016, 20 pages.

Tablet Talk, "Tablet Talk App: Frequently Asked Questions—Tablet Talk.", URL:https://web.archive.org/web/201406251 02903/http://1www.tablettalkapp.com/faq/, Jun. 25, 2014, 6 pages.

International Preliminary Report on Patentability received for PCT Patent Application No. PCT/US2015/038173, dated Jan. 5, 2017, 10 pages.

International Preliminary Report on Patentability received for PCT Patent Application No. PCT/US2015/038174, dated Jan. 5, 2017, 27 pages.

International Preliminary Report on Patentability received for PCT Patent Application No. PCT/US2015/045965, dated Dec. 27, 2016, 10 pages.

Non-Final Office Action received for U.S. Appl. No. 14/830,629, dated Dec. 1, 2016, 20 pages.

Office Action received for Australian Patent Application No. 2015279544, dated Apr. 18, 2017, 4 pages.

Office Action received for Australian Patent Application No. 2016231598, dated Apr. 7, 2017, 5 Pages.

Office Action received for Australian Patent Application No. 2015279545, dated Apr. 13, 2017, 3 pages.

Notice of Allowance and Search Report received for Taiwanese Patent Application No. 104128687.0, dated Jun. 7, 2016, 4 pages (3 pages of Official Copy and 1 page of Search Report Translation). (See Communication under 37 CFR § 1.98(a) (3)).

Extended European Search Report received for European Patent Application No. 16190252.3 dated Mar. 1, 2017, 10 pages.

International Preliminary Report on Patentability received for PCT Patent Application No. PCT/US2015/045936, dated Mar. 16, 2017, 9 Pages.

International Preliminary Report on Patentability received for PCT Patent Application No. PCT/US2015/019321, dated Mar. 16, 2017, 8 Pages.

"Accepted Outlook Meetings Move to Deleted Folder", Available online at:- https://social.technet.microsoft.com/Forums/office/en-US/f3301c9a-a93f-49f7-be13-c642e285f150/accepted-outlook-meetings-move-to-deleted-folder?forum=outlook, Jan. 13, 2011, 4 pages.

"Microsoft Outlook 2010™ A Beginners Guide", Available online at:- http://www.reading.ac.uk/web/files/its/outlook2010.pdf, Apr. 1, 2012, 24 pages.

Office Action Received for European Patent Application No. 15739109.5, dated Jan. 31, 2018, 7 pages.

Office Action Received for European Patent Application No. 15739110.3, dated Jan. 31, 2018, 8 pages.

"Responding to a meeting invitation", Available online at:- https://web.archive.org/web/20121128174157/https://www.zimbra.com/desktop7/help/en_US/Calendar/Responding_to_an_invitation.html, Nov. 28, 2012, 1 page.

Non-Final Office Action received for U.S. Appl. No. 14/752,776, dated Jan. 2, 2018, 30 pages.

Non-Final Office Action received for U.S. Appl. No. 14/829,573, dated Jan. 22, 2018, 26 pages.

Non-Final Office Action received for U.S. Appl. No. 14/830,629, dated Jun. 15, 2017, 24 pages.

Notice of Allowance received for U.S. Appl. No. 14/830,629, dated Oct. 17, 2018, 8 pages.

Summons to Attend Oral Proceedings received for European Patent Application No. 15739109.5, mailed on Oct. 4, 2018, 3 Pages.

Summons to Attend Oral Proceedings received for European Patent Application No. 15739110.3, mailed on Oct. 2, 2018, 3 pages.

Corrected Notice of Allowance received for U.S. Appl. No. 14/829,573, dated Sep. 11, 2018, 3 pages.

Advisory Action received for U.S. Appl. No. 14/752,776, dated Aug. 31, 2018, 3 pages.

Corrected Notice of Allowance received for U.S. Appl. No. 14/829,573, dated Aug. 9, 2018, 3 pages.

Summons to Attend Oral Proceedings received for European Patent Application No. 15739109.5, mailed on Aug. 23, 2018, 9 pages.

Summons to Attend Oral Proceedings received for European Patent Application No. 15739110.3, mailed on Aug. 23, 2018, 10 pages.

Final Office Action received for U.S. Appl. No. 14/752,776, dated May 29, 2018, 36 pages.

Final Office Action received for U.S. Appl. No. 14/830,629, dated Apr. 16, 2018, 27 pages.

Notice of Acceptance received for Australian Patent Application No. 2015279544, dated Mar. 1, 2018, 3 pages.

Notice of Acceptance received for Australian Patent Application No. 2016231598, dated Mar. 1, 2018, 3 pages.

Notice of Acceptance received for Australian Patent Application No. 2015279545, dated Feb. 9, 2018, 3 pages.

Notice of Allowance received for U.S. Appl. No. 14/829,573, dated Apr. 25, 2018, 6 pages.

Office Action received for Australian Patent Application No. 2015279544, dated Feb. 13, 2018, 5 pages.

Office Action received for European Patent Application No. 16190252.3, dated Feb. 19, 2018, 7 pages.

Studio 39, "Clock & Calendar for Smartwatch 2", Available online at:- https://www.youtube.com/watch?v=Uj-K2vMnrj8, Nov. 20, 2013, 2 pages.

Office Action received for Australian Patent Application No. 2018204286, dated Apr. 17, 2019, 5 pages.

Intention to Grant received for European Patent Application No. 15739110.3, dated Mar. 7, 2019, 8 pages.

(56) References Cited

OTHER PUBLICATIONS

Corrected Notice of Allowance received for U.S. Appl. No. 14/830,629, dated Feb. 13, 2019, 3 pages.
Office Action received for Taiwanese Patent Application No. 104107318, dated Dec. 26, 2018, 33 pages (9 pages of English Translation and 24 pages of Official Copy).
Office Action received for Chinese Patent Application No. 201580029054.3, dated Dec. 5, 2018, 12 pages (6 pages of English Translation and 6 pages of Official Copy).
Summons to Attend Oral Proceedings received for European Patent Application No. 16190252.3, mailed on Jan. 8, 2019, 3 pages.
Non-Final Office Action received for U.S. Appl. No. 14/752,776, dated Nov. 5, 2018, 48 pages.
Office Action received for Taiwanese Patent Application No. 104107327, dated Sep. 28, 2018, 7 pages (3 pages of English Translation and 4 pages of Official Copy).
Summons to Attend Oral Proceedings received for European Patent Application No. 16190252.3, mailed on Oct. 30, 2018, 13 pages.
Office Action received for Chinese Patent Application No. 201580046339.8, dated Feb. 26, 2019, 18 pages (6 pages of English Translation and 12 pages of Official Copy).
Decision to Grant received for European Patent Application No. 15739110.3, dated Sep. 19, 2019, 2 pages.
Intention to Grant received for European Patent Application No. 15739110.3, dated Sep. 11, 2019, 6 pages.
Notice of Allowance received for Chinese Patent Application No. 201580029054.3, dated Jul. 19, 2019, 2 pages (1 page of English Translation and 1 page of Official Copy).
Notice of Allowance received for Taiwanese Patent Application No. 104107327, dated Jul. 19, 2019, 5 pages (2 pages of English Translation and 3 pages of Official copy).
Office Action received for Australian Patent Application No. 2018204286, dated Nov. 12, 2019, 5 pages.
Office Action received for Australian Patent Application No. 2018204286, dated Sep. 5, 2019, 5 pages.
Non Final Office Action received for U.S. Appl. No. 14/503,072, dated Jan. 26, 2015, 12 pages.
Non Final Office Action received for U.S. Appl. No. 14/503,296, dated Jan. 30, 2015, 16 pages.
Non-Final Office Action received for U.S. Appl. No. 14/503,372, dated Dec. 5, 2014, 11 pages.
Non-Final Office Action received for U.S. Appl. No. 14/503,381, dated May 13, 2015, 13 pages.
Non-Final Office Action received for U.S. Appl. No. 14/599,425, dated Mar. 17, 2015, 16 pages.
Kamijo, Noboru, "Next Generation Mobile System—WatchPad1. 5", Available at "http://researcher.ibm.com/researcher/view_group_subpage.php?id=5617", retrieved on Jul. 4, 2015, 2 pages.
Lemay et al., U.S. Appl. No. 60/936,562, filed Jun. 20, 2007, titled "Portable Multifunction Device, Method, and Graphical User Interface for Playing Online Videos", 61 pages.
NDTV, "Sony SmartWatch 2 Launched in India for Rs. 14,990", available at "http://gadgets.ndtv.com/others/news/sony-smartwatch-2-launched-in-india-for-rs-14990-420319", Sep. 18, 2013, 4 pages.
International Search Report and Written Opinion received for PCT Patent Application No. PCT/US2014/053951, dated Dec. 8, 2014, 11 pages.
International Search Report and Written Opinion received for PCT Patent Application No. PCT/US2014/053957, dated Feb. 19, 2015, 11 pages.
International Search Report and Written Opinion received for PCT Patent Application No. PCT/US2014/053958, dated Feb. 19, 2015, 10 pages.
Yang et al., U.S. Appl. No. 62/004,886, filed May 29, 2014, titled "User Interface for Payments", 198 pages.
International Search Report and Written Opinion received for PCT Patent Application No. PCT/US2015/019321, dated Jun. 3, 2015, 11 pages.
Apple, "iPhone User's Guide", 2007, 137 pages.
Headset Button Controller v7.3 APK Full APP Download for Andriod, Blackberry, iPhone, Jan. 27, 2014, 11 pages.
Colt, Sam, "Here's One Way Apple's Smartwatch Could Be Better Than Anything Else", Business Insider, Aug. 21, 2014, pp. 1-4.
International Search Report and Written Opinion received for PCT Patent Application No. PCT/US2015/019322, dated Jun. 18, 2015, 16 pages.
Final Office Action received for U.S. Appl. No. 14/503,296, dated Jul. 2, 2015, 7 pages.
Yang et al., U.S. Appl. No. 62/006,211, filed Jun. 1, 2014, titled "Displaying Options, Assigning Notification, Ignoring Messages, and Simultaneous User Interface Displays in a Messaging Application", 254 pages.
International Search Report and Written Opinion received for PCT Patent Application No. PCT/US2015/019320, dated Jul. 2, 2015, 14 pages.
International Search Report and Written Opinion received for PCT Patent Application No. PCT/US2015/025188, dated Jun. 23, 2015, 11 pages.
"Android 2.3.4 User's Guide", Online available at: https://static.googleusercontent.com/media/www.google.com/en//help/hc/pdfs/mobile/AndroidUsersGuide-2.3.4.pdf, May 20, 2011, 384 pages.
Extended European Search Report for European Application No. 19185318.3, dated Nov. 20, 2019, 8 pages.
Office Action received for Chinese Patent Application No. 201580046339.8, dated Oct. 31, 2019, 9 pages (3 pages of English Translation and 6 pages of Official Copy).

* cited by examiner

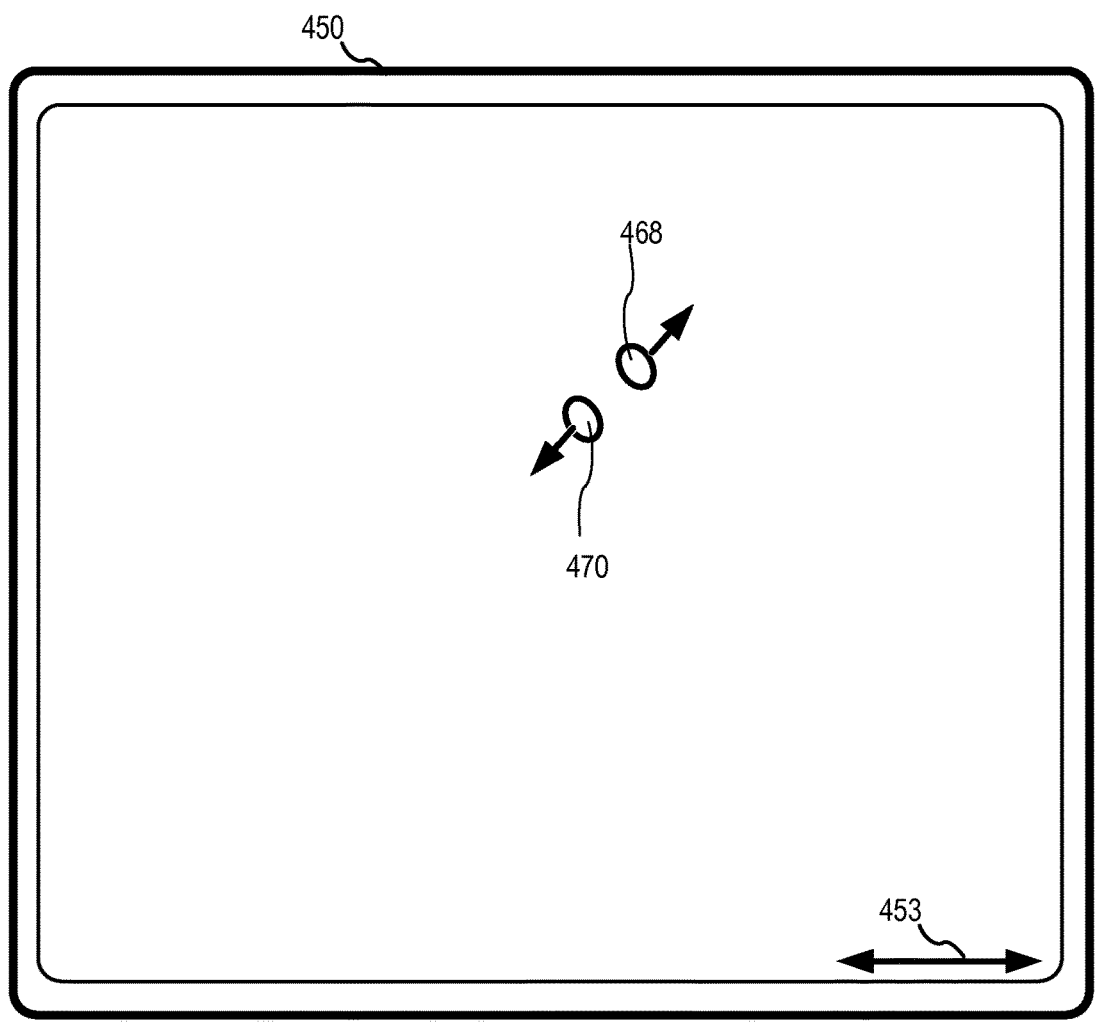
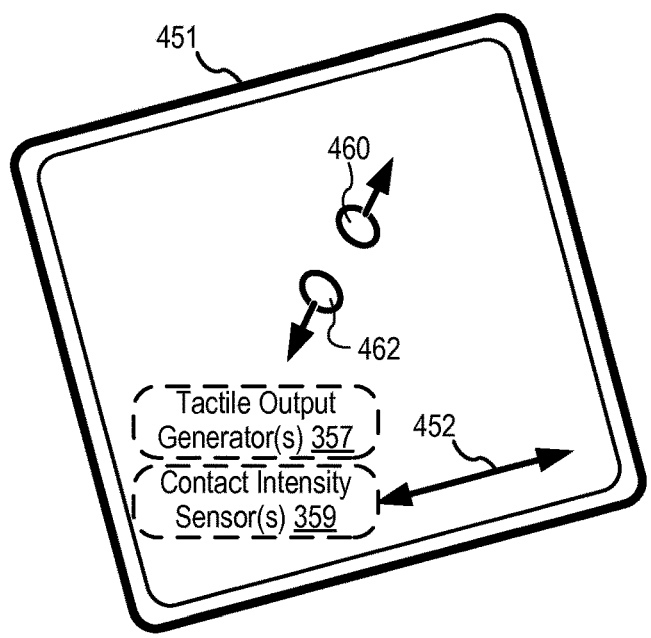
FIG. 4B

700

702
Displaying, on the display, an affordance representing an electronic message application.

704
Receiving user input representing movement of the rotatable input mechanism.

706
In response to receiving the user input representing the movement of the rotatable input mechanism, displaying a landing screen of the electronic message application, wherein the landing screen includes display of an inbox affordance and a compose affordance.

708
Receiving user input associated with the landing screen.

710
Determining whether the user input associated with the landing screen represents a touch associated with the displayed inbox affordance or a touch associated with the displayed compose affordance.

712
In response to receiving the user input associated with the landing screen and in accordance with a determination that the user input associated with the landing screen represents a touch associated with the displayed inbox affordance, displaying, on the display, a list of electronic conversation objects.

714
In response to receiving the user input associated with the landing screen and in accordance with a determination that the user input associated with the landing screen represents a touch associated the displayed compose affordance, displaying, on the display, an interface for composing a new electronic message.

*FIG. 7*

ELECTRONIC MESSAGE USER INTERFACE

CROSS-REFERENCE TO RELATED APPLICATIONS

This application claims priority to U.S. Provisional Patent Application No. 62/044,950, entitled "ELECTRONIC MESSAGE USER INTERFACE," filed Sep. 2, 2014, which is hereby incorporated by reference in its entirety.

This application relates to the following applications: International Patent Application Serial No. PCT/US2013/040087, entitled "Device, Method, and Graphical User Interface for Moving a User Interface Object Based on an Intensity of a Press Input," filed May 8, 2013; International Patent Application Serial No. PCT/US2013/040072, entitled "Device, Method, and Graphical User Interface for Providing Feedback for Changing Activation States of a User Interface Object," filed May 8, 2013; International Patent Application Serial No. PCT/US2013/040070, entitled "Device, Method, and Graphical User Interface for Providing Tactile Feedback for Operations Performed in a User Interface," filed May 8, 2013; International Patent Application Serial No. PCT/US2013/040067, entitled "Device, Method, and Graphical User Interface for Facilitating User Interaction with Controls in a User Interface," filed May 8, 2013; International Patent Application Serial No. PCT/US2013/040061, entitled "Device, Method, and Graphical User Interface for Displaying User Interface Objects Corresponding to an Application," filed May 8, 2013; International Patent Application Serial No. PCT/US2013/040058, entitled "Device, Method, and Graphical User Interface for Displaying Additional Information in Response to a User Contact," filed May 8, 2013; International Patent Application Serial No. PCT/US2013/040056, entitled "Device, Method, and Graphical User Interface for Scrolling Nested Regions," filed May 8, 2013; International Patent Application Serial No. PCT/US2013/040054, entitled "Device, Method, and Graphical User Interface for Manipulating Framed Graphical Objects," filed May 8, 2013; International Patent Application Serial No. PCT/US2013/069489, entitled "Device, Method, and Graphical User Interface for Switching Between User Interfaces," filed Nov. 11, 2013; International Patent Application Serial No. PCT/US2013/069486, entitled "Device, Method, and Graphical User Interface for Determining Whether to Scroll or Select Content," filed Nov. 11, 2013; International Patent Application Serial No. PCT/US2013/069484, entitled "Device, Method, and Graphical User Interface for Moving a Cursor According to a Change in an Appearance of a Control Icon with Simulated Three-Dimensional Characteristics," filed Nov. 11, 2013; International Patent Application Serial No. PCT/US2013/069483, entitled "Device, Method, and Graphical User Interface for Transitioning Between Touch Input to Display Output Relationships," filed Nov. 11, 2013; International Patent Application Serial No. PCT/US2013/069479, entitled "Device, Method, and Graphical User Interface for Forgoing Generation of Tactile Output for a Multi-Contact Gesture," filed Nov. 11, 2013; International Patent Application Serial No. PCT/US2013/069472, entitled "Device, Method, and Graphical User Interface for Navigating User Interface Hierarchies," filed Nov. 11, 2013; International Patent Application Serial No. PCT/US2013/040108, entitled "Device, Method, and Graphical User Interface for Moving and Dropping a User Interface Object," filed May 8, 2013; International Patent Application Serial No. PCT/US2013/040101, entitled "Device, Method, and Graphical User Interface for Selecting User Interface Objects," filed May 8, 2013; International Patent Application Serial No. PCT/US2013/040098, entitled "Device, Method, and Graphical User Interface for Displaying Content Associated with a Corresponding Affordance," filed May 8, 2013; International Patent Application Serial No. PCT/US2013/040093, entitled "Device, Method, and Graphical User Interface for Transitioning Between Display States in Response to a Gesture," filed May 8, 2013; International Patent Application Serial No. PCT/US2013/040053, entitled "Device, Method, and Graphical User Interface for Selecting Object within a Group of Objects," filed May 8, 2013; U.S. Patent Application Ser. No. 61/778,211, entitled "Device, Method, and Graphical User Interface for Facilitating User Interaction with Controls in a User Interface," filed Mar. 12, 2013; U.S. Patent Application Ser. No. 61/778,191, entitled "Device, Method, and Graphical User Interface for Displaying User Interface Objects Corresponding to an Application," filed Mar. 12, 2013; U.S. Patent Application Ser. No. 61/778,171, entitled "Device, Method, and Graphical User Interface for Displaying Additional Information in Response to a User Contact," filed Mar. 12, 2013; U.S. Patent Application Ser. No. 61/778,179, entitled "Device, Method and Graphical User Interface for Scrolling Nested Regions," filed Mar. 12, 2013; U.S. Patent Application Ser. No. 61/778,156, entitled "Device, Method, and Graphical User Interface for Manipulating Framed Graphical Objects," filed Mar. 12, 2013; U.S. Patent Application Ser. No. 61/778,125, entitled "Device, Method, And Graphical User Interface for Navigating User Interface Hierarchies," filed Mar. 12, 2013; U.S. Patent Application Ser. No. 61/778,092, entitled "Device, Method, and Graphical User Interface for Selecting Object Within a Group of Objects," filed Mar. 12, 2013; U.S. Patent Application Ser. No. 61/778,418, entitled "Device, Method, and Graphical User Interface for Switching Between User Interfaces," filed Mar. 13, 2013; U.S. Patent Application Ser. No. 61/778,416, entitled "Device, Method, and Graphical User Interface for Determining Whether to Scroll or Select Content," filed Mar. 13, 2013; U.S. Patent Application Ser. No. 61/747,278, entitled "Device, Method, and Graphical User Interface for Manipulating User Interface Objects with Visual and/or Haptic Feedback," filed Dec. 29, 2012; U.S. Patent Application Ser. No. 61/778,414, entitled "Device, Method, and Graphical User Interface for Moving and Dropping a User Interface Object," filed Mar. 13, 2013; U.S. Patent Application Ser. No. 61/778,413, entitled "Device, Method, and Graphical User Interface for Selecting User Interface Objects," filed Mar. 13, 2013; U.S. Patent Application Ser. No. 61/778,412, entitled "Device, Method, and Graphical User Interface for Displaying Content Associated with a Corresponding Affordance," filed Mar. 13, 2013; U.S. Patent Application Ser. No. 61/778,373, entitled "Device, Method, and Graphical User Interface for Managing Activation of a Control Based on Contact Intensity," filed Mar. 12, 2013; U.S. Patent Application Ser. No. 61/778,265, entitled "Device, Method, and Graphical User Interface for Transitioning Between Display States in Response to a Gesture," filed Mar. 12, 2013; U.S. Patent Application Ser. No. 61/778,367, entitled "Device, Method, and Graphical User Interface for Moving a User Interface Object Based on an Intensity of a Press Input," filed Mar. 12, 2013; U.S. Patent Application Ser. No. 61/778,363, entitled "Device, Method, and Graphical User Interface for Transitioning Between Touch Input to Display Output Relationships," filed Mar. 12, 2013; U.S. Patent Application Ser. No. 61/778,287, entitled "Device, Method, and Graphical User Interface for Providing Feedback for Changing Activation States of a User Interface Object," filed Mar. 12, 2013; U.S. Patent Application Ser. No. 61/778,284, entitled "Device, Method, and Graphical User Interface for Providing Tactile Feedback for Operations Performed in a User Interface," filed Mar. 12, 2013; U.S. Patent Application Ser. No. 61/778,239, entitled "Device, Method, and Graphical User Interface for Forgoing Generation of Tactile Output for a Multi-Contact Gesture," filed Mar. 12, 2013; U.S. Patent Application Ser. No. 61/688,227, entitled "Device, Method, and Graphical User Interface for Manipulating User Interface Objects with Visual and/or Haptic Feedback," filed May 9, 2012; U.S. Provisional Patent Application Ser. No. 61/645,033, filed on May 9, 2012, entitled "Adaptive Haptic Feedback for Electronic Devices;" U.S. Provisional Patent Application Ser. No. 61/665,603, filed on Jun. 28, 2012, entitled "Adaptive Haptic Feedback for Electronic Devices;" and U.S. Provisional Patent Application Ser. No. 61/681,098, filed on Aug. 8, 2012, entitled "Adaptive Haptic Feedback for Electronic Devices." The content of these applications is hereby incorporated by reference in their entirety.

FIELD

The present disclosure relates generally to computer user interfaces, and more specifically to techniques for accessing, composing, and manipulating messages.

BACKGROUND

The use of electronic devices for accessing, composing, and manipulating electronic messages (e.g., text messages, SMS, MMS, iMessages®) has significantly increased in recent years. Devices receive messages and display the message for a user to view. The user can continue the conversation by responding to the sender. The user can also use the device to compose a new message to be transmitted to one or more recipients. Traditionally, messages were limited in length to 128 bytes to accommodate prevailing wireless communications standards. Recently, standards and implementations have increased (or removed) the length limitation. As a result, use of messages to communicate has significantly increased.

BRIEF SUMMARY

Some techniques for accessing, composing, and manipulating electronic messages using electronic devices, however, are generally cumbersome and inefficient. For example, accessing and responding to a message requires navigating a complex and time-consuming user interface. For another example, some user interface techniques for composing new electronic messages can be inefficient and cumbersome. In addition, existing techniques take longer than necessary, thereby wasting energy. This latter consideration is particularly important in battery-operated devices.

Accordingly, there is a need for electronic devices with faster, more efficient methods and interfaces for accessing, composing, and manipulating electronic messages. Such methods and interfaces optionally complement or replace other methods for accessing, composing, and manipulating electronic messages. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices for accessing, composing, and manipulating electronic messages are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device is user-wearable. In some embodiments, the device has a touch-sensitive display (also known as a "touch screen" or "touch screen display"). In some embodiments, the device has a display and a touch-sensitive surface. In some embodiments, the device has a short-range communication radio. In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. Executable instructions for performing these functions may be included in a computer readable storage medium or other computer program product configured for execution by one or more processors.

In accordance with some embodiments, a method is performed at an electronic device with a display, a touch-sensitive surface, and a rotatable input mechanism. The method includes displaying, on the display, an affordance representing an electronic message application. The method includes receiving user input representing movement of the rotatable input mechanism. The method includes, in response to receiving the user input representing the movement of the rotatable input mechanism, displaying a landing screen of the electronic message application, wherein the landing screen includes display of an inbox affordance and a compose affordance. The method includes receiving user input associated with the landing screen. The method includes determining whether the user input associated with the landing screen represents a touch associated with the displayed inbox affordance or a touch associated with the displayed compose affordance. The method includes, in response to receiving the user input associated with the landing screen and in accordance with a determination that the user input associated with the landing screen represents a touch associated with the displayed inbox affordance, displaying, on the display, a list of electronic conversation objects. The method also includes, in response to receiving the user input associated with the landing screen and in accordance with a determination that the user input associated with the landing screen represents a touch associated the displayed compose affordance, displaying, on the display, an interface for composing a new electronic message.

In accordance with some embodiments, a system is described. The system includes: a display; a touch-sensitive surface; a rotatable input mechanism; means for displaying, on the display, an affordance representing an electronic message application; means for receiving user input representing movement of the rotatable input mechanism; means responsive to receiving the user input representing the movement of the rotatable input mechanism, for displaying a landing screen of the electronic message application, wherein the landing screen includes display of an inbox affordance and a compose affordance; means for receiving user input associated with the landing screen; means for determining whether the user input associated with the landing screen represents a touch associated with the displayed inbox affordance or a touch associated with the displayed compose affordance; means response to receiving the user input associated with the landing screen and in accordance with a determination that the user input associated with the landing screen represents a touch associated with the displayed inbox affordance, for displaying, on the display, a list of electronic conversation objects; and means response to receiving the user input associated with the landing screen and in accordance with a determination that the user input associated with the landing screen represents a touch associated the displayed compose affordance, for displaying, on the display, an interface for composing a new electronic message.

Thus, devices are provided with faster, more efficient methods and interfaces for accessing, composing, and manipulating electronic messages, thereby increasing the effectiveness, efficiency, and user satisfaction with such devices. Such methods and interfaces may complement or replace conventional methods for accessing, composing, and manipulating electronic messages.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 7 is a flow diagram illustrating an exemplary process for accessing, composing, and manipulating electronic messages.

DESCRIPTION OF EMBODIMENTS

Figure 1A:
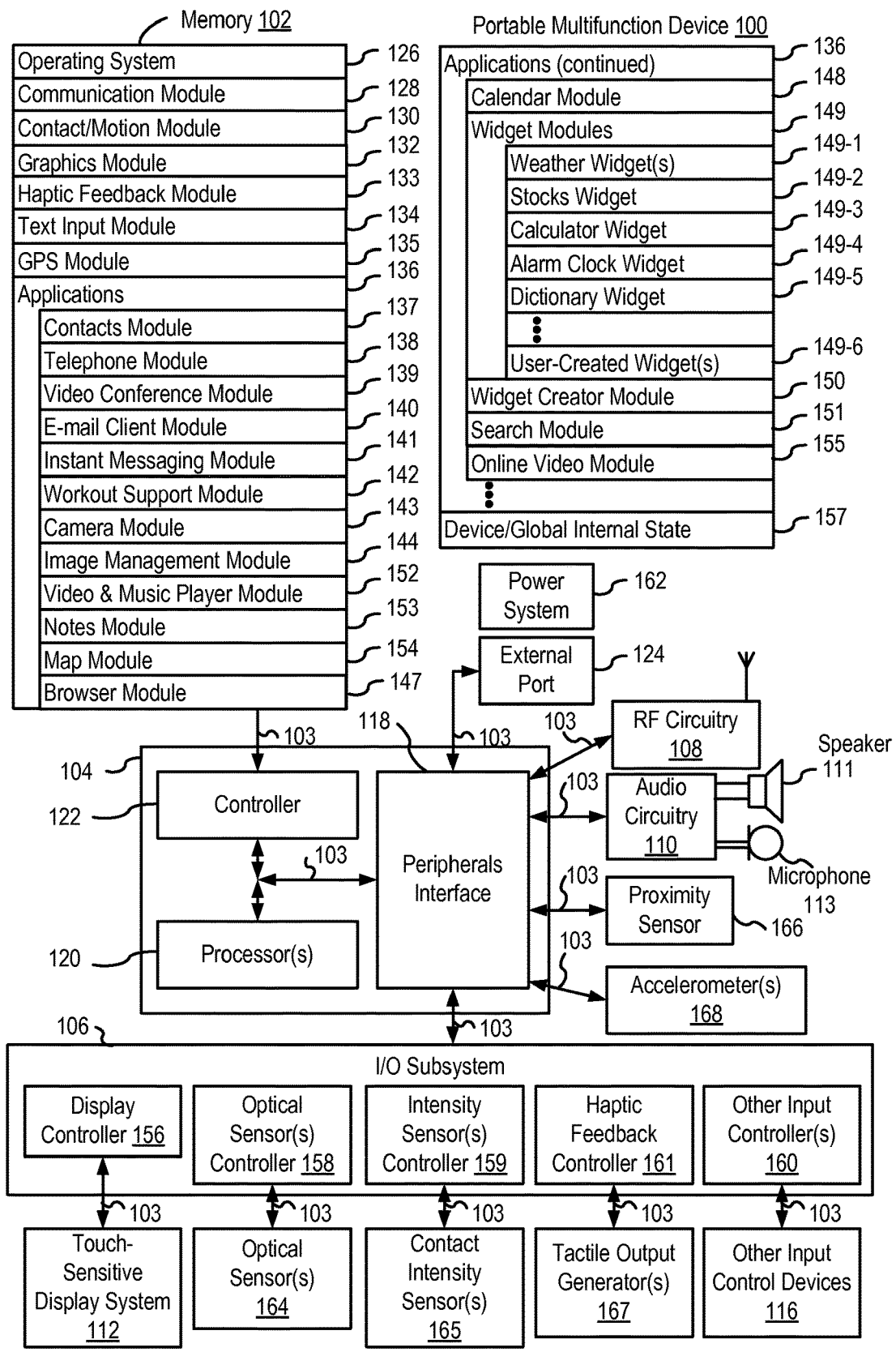
FIG. 1A is a block diagram illustrating a portable multifunction device with a touch-sensitive display in accordance with some embodiments.

The following description sets forth exemplary methods, parameters and the like. It should be recognized, however, that such description is not intended as a limitation on the scope of the present disclosure but is instead provided as a description of exemplary embodiments.

There is a need for electronic devices that provide efficient messages access to a user. For example, ease of use for viewing messages and conversations, replying to messages, deleting conversations, and composing messages contribute to the efficiency of messages access. Such techniques can reduce the cognitive burden on a user who uses messages, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for accessing, composing, and manipulating messages. FIGS. 6A-6H illustrate exemplary user interfaces for accessing, composing, and manipulating messages. The user interfaces in the figures are also used to illustrate the processes described below, including the processes in FIGS. 7 and 8.

Although the following description uses terms first, second, etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display systems 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 may include one or more computer readable storage mediums. The computer readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, webpages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Figure 1B:
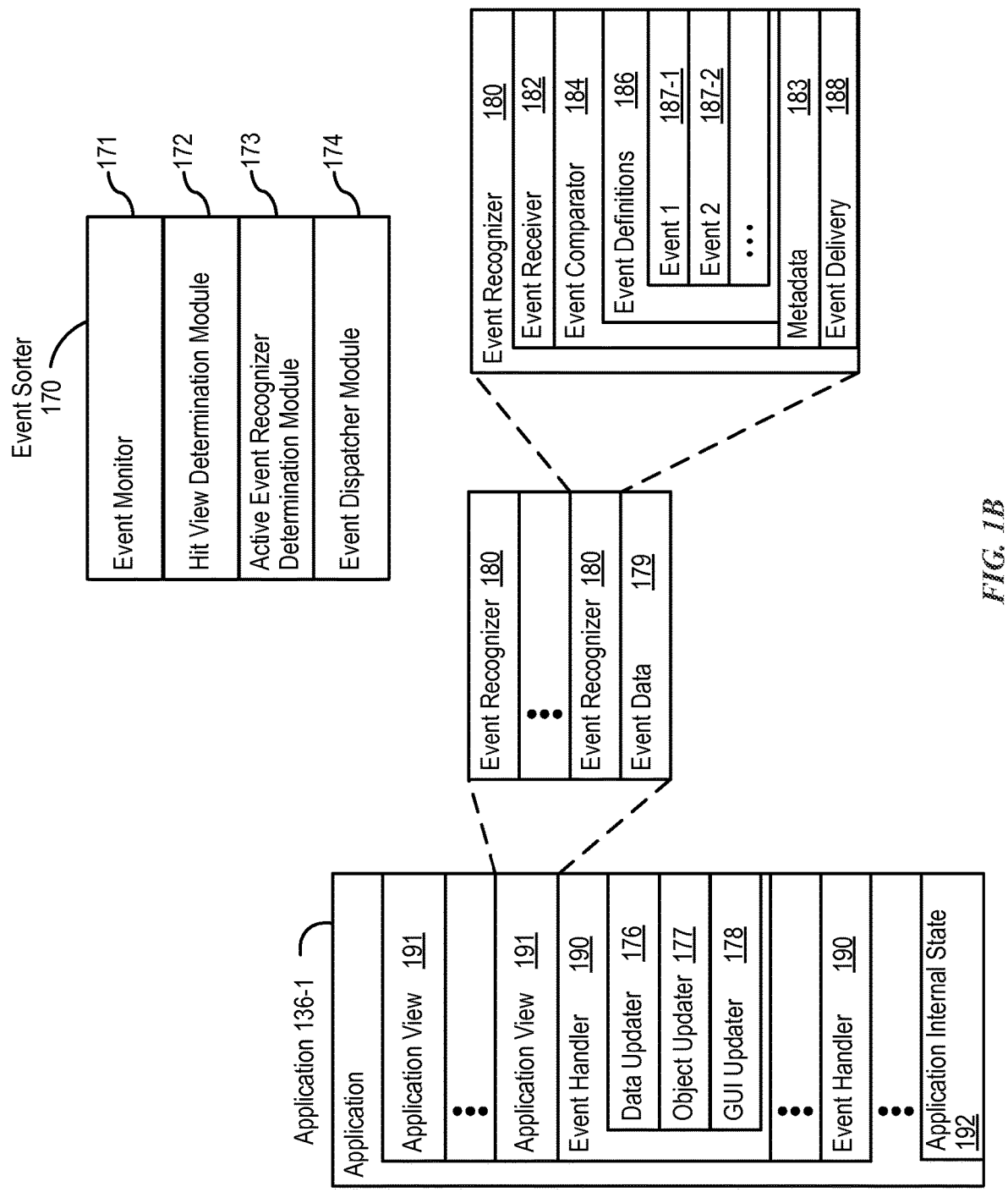
FIG. 1B is a block diagram illustrating exemplary components for event handling in accordance with some embodiments.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
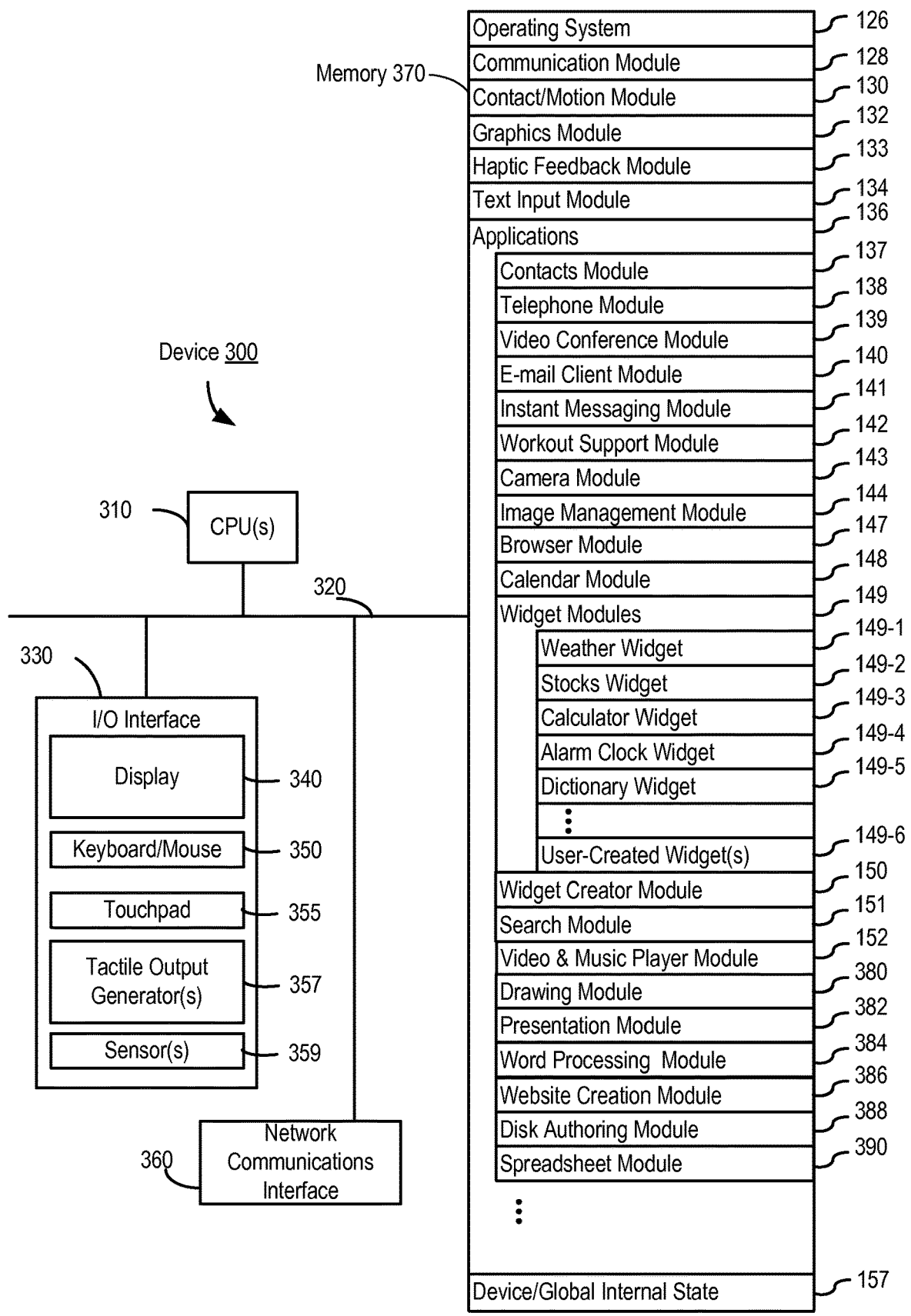
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod® (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  video player module;
  music player module;
  browser module 147;
  calendar module 148;
  widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which merges video player module and music player module;
  notes module 153;
  map module 154; and/or
  online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contacts module 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web-pages or portions thereof, as well as attachments and other files linked to web-pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web-page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules may be combined or otherwise re-arranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 177 updates the telephone number used in contacts module 137, or stores a video file used in video player module. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
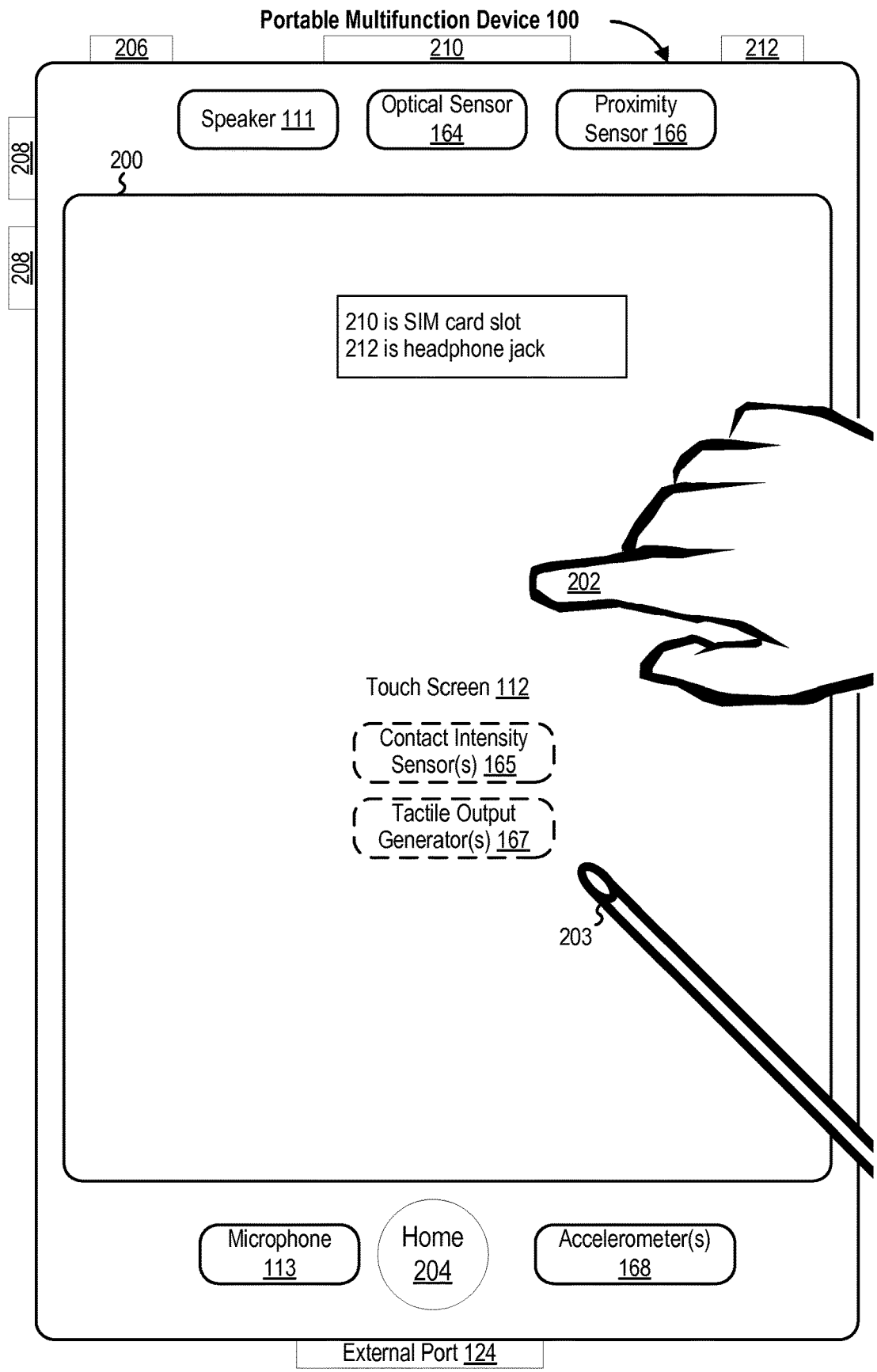
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 may be stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
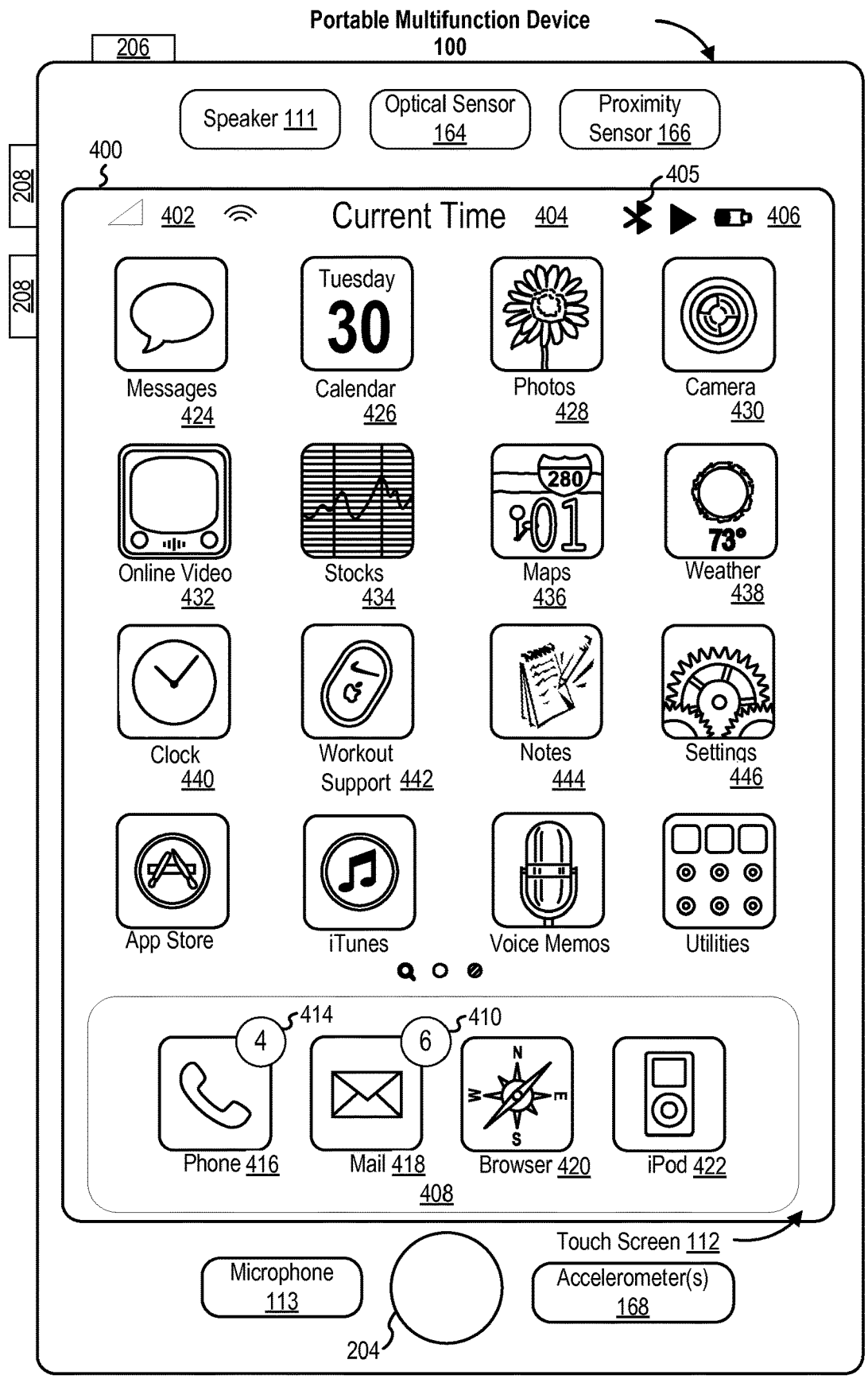
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
　Icon 416 for telephone module 138, labeled "Phone," which optionally includes an indicator 414 of the number of missed calls or voicemail messages;
　Icon 418 for e-mail client module 140, labeled "Mail," which optionally includes an indicator 410 of the number of unread e-mails;
　Icon 420 for browser module 147, labeled "Browser;" and Icon 422 for video and music player module 152, also referred to as iPod (trademark of Apple Inc.) module 152, labeled "iPod;" and Icons for other applications, such as:
- Icon 424 for IM module 141, labeled "Messages;"
- Icon 426 for calendar module 148, labeled "Calendar;"
- Icon 428 for image management module 144, labeled "Photos;"
- Icon 430 for camera module 143, labeled "Camera;"
- Icon 432 for online video module 155, labeled "Online Video"
- Icon 434 for stocks widget 149-2, labeled "Stocks;"
- Icon 436 for map module 154, labeled "Maps;"
- Icon 438 for weather widget 149-1, labeled "Weather;"
- Icon 440 for alarm clock widget 149-4, labeled "Clock;"
- Icon 442 for workout support module 142, labeled "Workout Support;"
- Icon 444 for notes module 153, labeled "Notes;" and
- Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
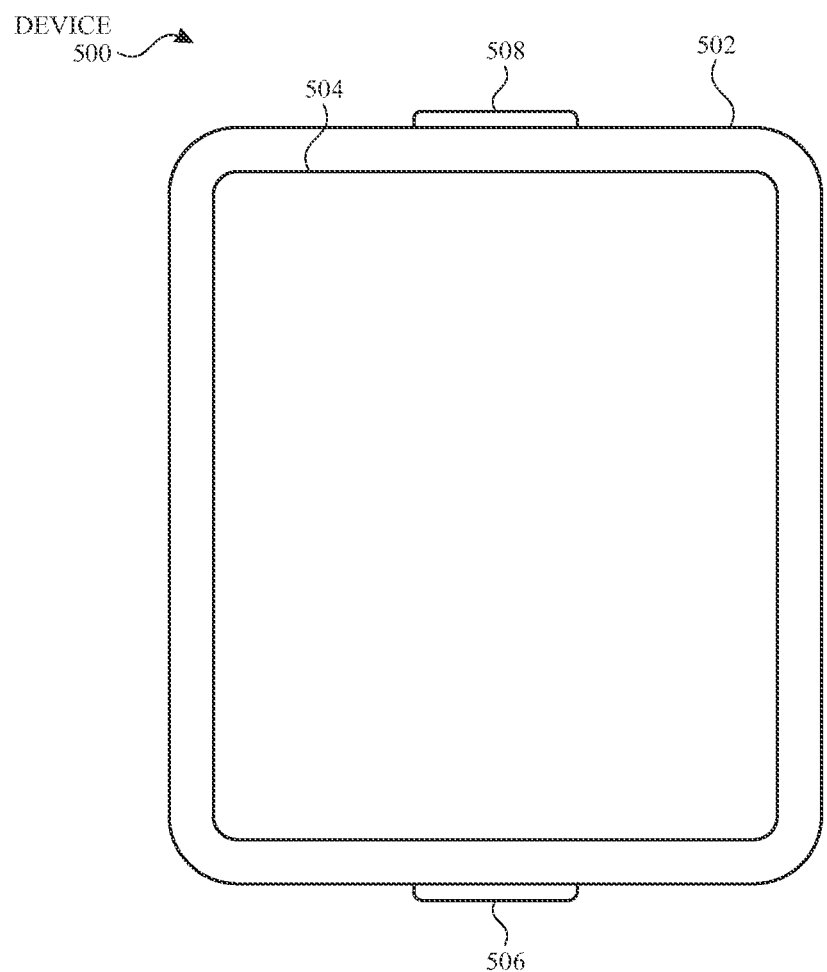
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touchscreen 504. Alternatively, or in addition to touchscreen 504, device 500 has a display and a touch-sensitive surface. As with devices 100 and 300, in some embodiments, touchscreen 504 (or the touch-sensitive surface) may have one or more intensity sensors for detecting intensity of contacts (e.g., touches) being applied. The one or more intensity sensors of touchscreen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity may be found, for example, in related applications: International Patent Application Serial No. PCT/US2013/040061, entitled "Device, Method, and Graphical User Interface for Displaying User Interface Objects Corresponding to an Application," filed May 8, 2013 and International Patent Application Serial No. PCT/US2013/069483, entitled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
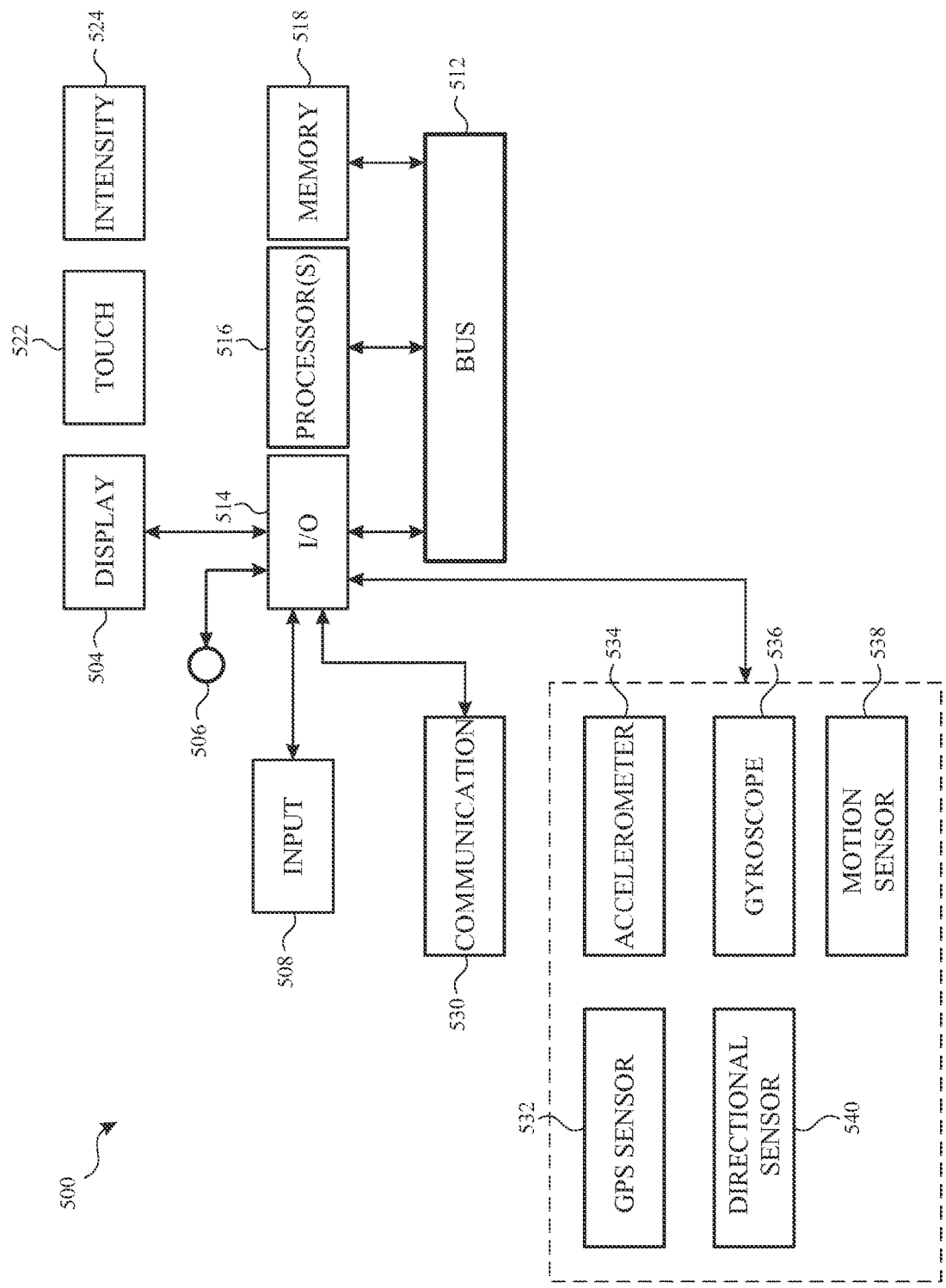
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth™, near field communication ("NFC"), cellular and/or other wireless communication techniques. Device 500 can include input mechanisms 506 and/or 508. Input mechanism 506 may be a rotatable input device, for example. Input mechanism 508 may be a button, in some examples.

Input mechanism 508 may be a microphone, in some examples. Personal electronic device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Figure 8:
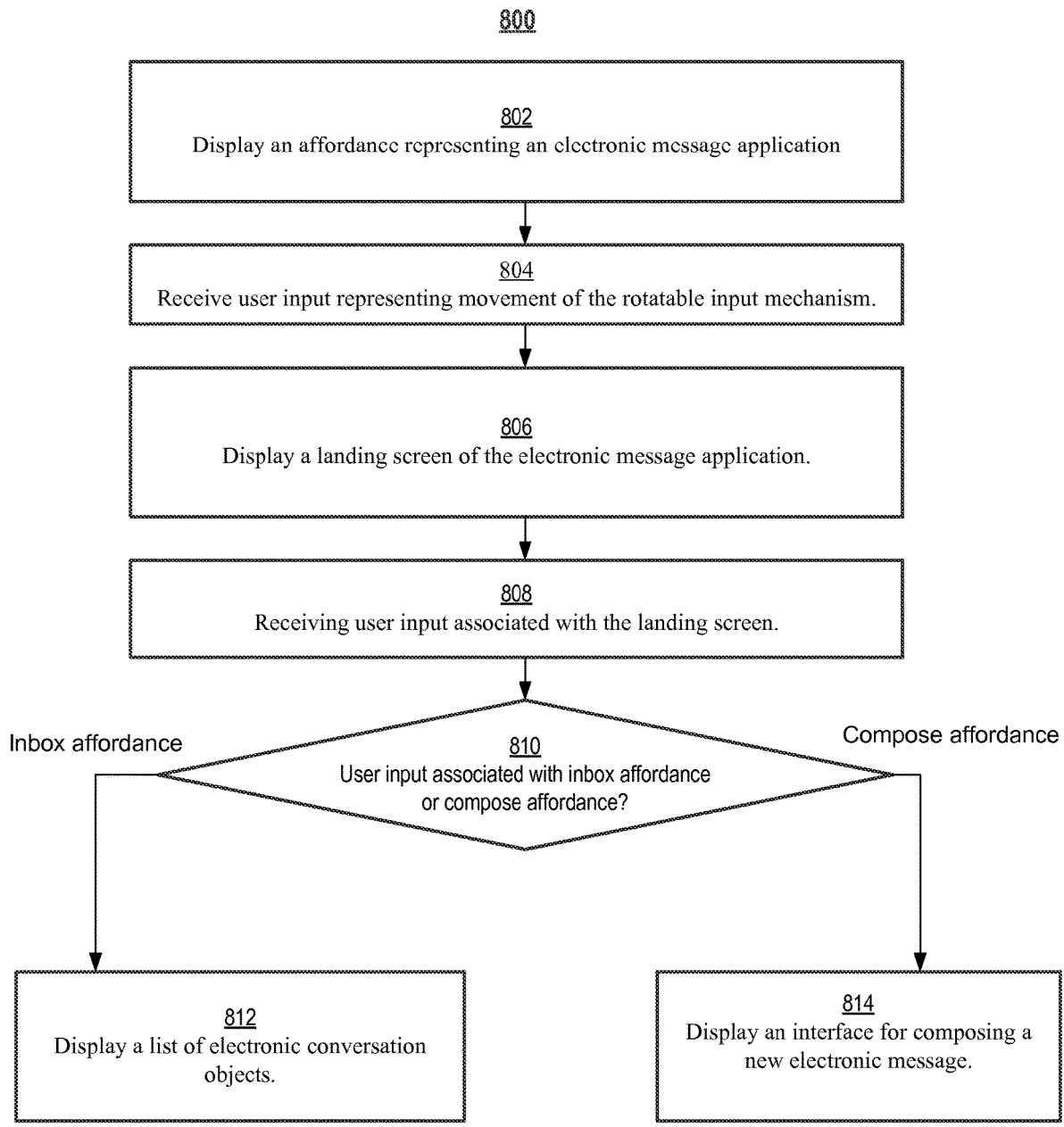
FIG. 8 is a flow diagram illustrating an exemplary process for accessing, composing, and manipulating electronic messages.

Memory 518 of personal electronic device 500 can be a non-transitory computer readable storage medium, for storing computer-executable instructions, which, when executed by one or more computer processors 516, for example, can cause the computer processors to perform the techniques described above, including processes 700 (FIG. 7) and 800 (FIG. 8). The computer-executable instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer readable storage medium" can be any medium that can tangibly contain or store computer-executable instructions for use by or in connection with the instruction execution system, apparatus, or device. The non-transitory computer readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that may be displayed on the display screen of devices 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments the contact-detection intensity threshold is zero. In some embodiments the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that may be implemented on a multifunction device with a display and a touch-sensitive surface, such as devices 100, 300, and/or 500, to improve a user's experience in accessing, composing, and manipulating electronic messages.

Figure 6A:
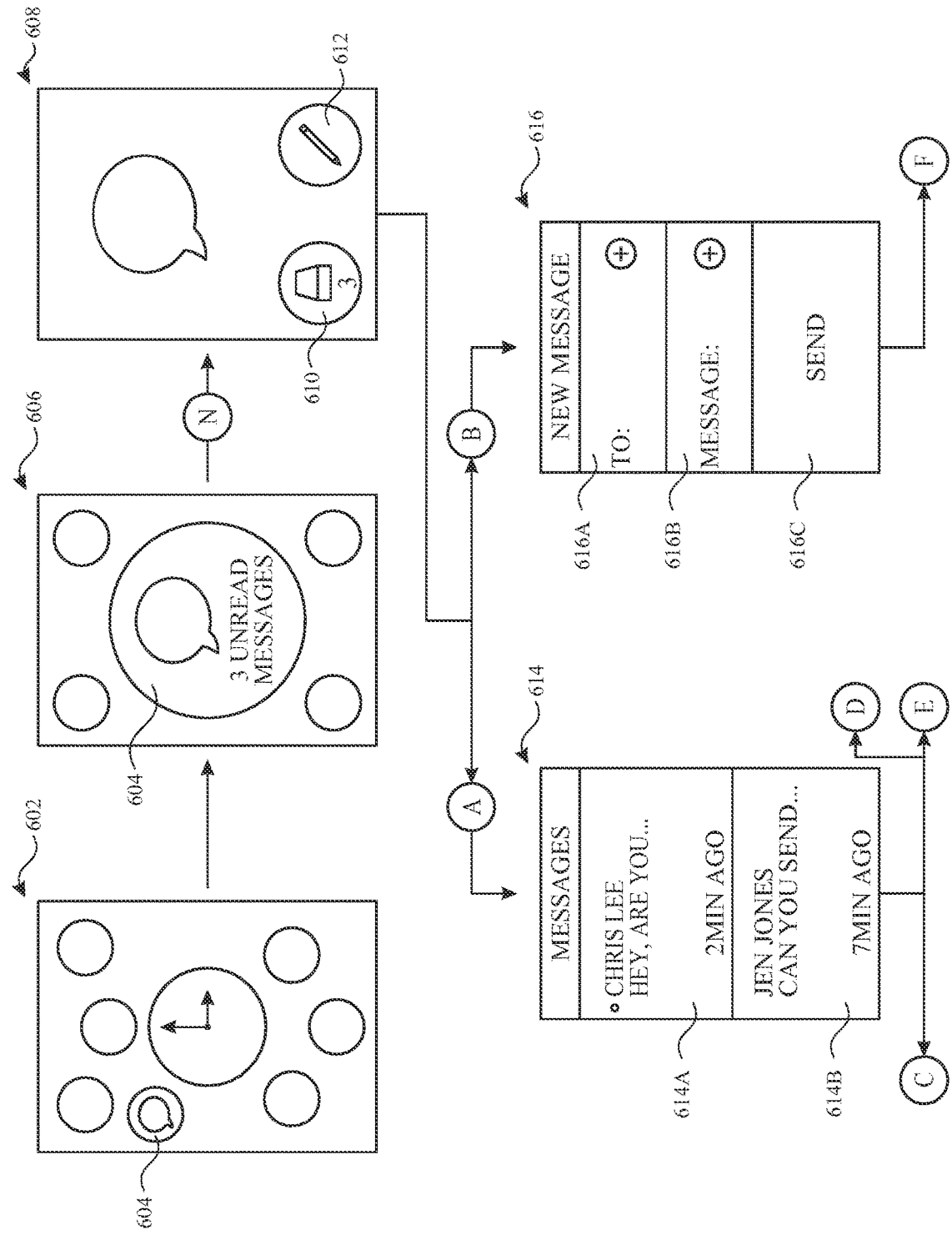
FIGS. 6A-6H illustrate exemplary user interfaces for accessing, composing, and manipulating electronic messages.

FIGS. 6A-6H illustrate exemplary user interfaces for accessing, composing, and manipulating electronic messages using an electronic device. In some embodiments, the electronic device is device 500. The electronic device has a display (e.g., 112, 340, 504), a touch-sensitive surface (e.g., 112, 355, 504), and a rotatable input mechanism (e.g., 506). In FIG. 6A, user interface screen 602 displays multiple affordances (e.g., a plurality of icons). Each affordance is associated with a software application such that when an affordance is activated by a user, the application associated with the activated affordance is displayed on the display of the electronic device. User interface screen 602 includes an affordance representing an electronic messages application 604 (e.g., an icon among the plurality of icons). The device receives user input representing movement of the rotatable input mechanism (e.g., the user rotates the rotatable input mechanism in a first direction). In accordance with some embodiments, in response to receiving the user input representing movement of the rotatable input mechanism or detecting a touch at a location corresponding to the affordance representing the electronic messages application, the device displays user interface screen 606, which includes an enlarged view of the affordance representing the electronic messages application 604. In accordance with some embodiments, in response to receiving the user input representing movement of the rotatable input mechanism (e.g., rotation in a first direction) or detecting a touch at a location corresponding to the affordance representing the electronic messages application (e.g., at user interface screen 604), the device displays a landing screen 608 (e.g., the screen displayed when the application starts or the screen displayed after the application initializes) of the electronic messages application. In some examples, if the user rotates the rotatable input mechanism in a second direction (e.g., opposite to the first direction) while at user interface screen 604, the device does not display the landing screen 608 in response to the rotation in the second direction.

In FIG. 6A, the affordance representing the electronic messages application 604 on user interface screen 606 includes an indication of a number of unread electronic messages (e.g., the icon includes the number of unread messages) of the electronic messages application. In this example, the affordance representing the electronic messages application 604 indicates that the electronic messages application includes three unread electronic messages (e.g., "3 unread messages"). In other words, the affordance representing the electronic messages application 604 includes an indication of a number of unread electronic messages (e.g., the icon includes the number of unread text/SMS or iMessage® messages) of the electronic messages application. Alternatively, or in addition, the affordance representing the electronic messages application 604 may indicate the number of unread conversations of the electronic messages application. In some examples, if there are no unread messages (or unread conversations), there may not be any indication of the number of unread messages (or conversations). In other words, the affordance representing the electronic messages application 604 does not include an indication of a number of unread electronic messages (e.g., the icon does not include the number of unread text/SMS or iMessage® messages, such as when the number of unread text/SMS or iMessage® messages is zero) of the electronic messages application.

In accordance with some embodiments, the device determines whether there are a number of unread messages associated with the electronic message application. In accordance with a determination that there is a number of unread messages associated with the electronic message application, the device displays the affordance representing the electronic message application 604 with an indication that a number of unread messages are associated with the electronic message application. In accordance with a determination that there is not a number of unread messages associated with the electronic message application, displaying the affordance representing the electronic message application 604 without indication that there is a number of unread messages.

The device receives user input representing movement of the rotatable input mechanism (e.g., rotation of the rotatable input mechanism in the first direction while the affordance representing the electronic messages application 604 is substantially in the center of the display; the user activates the electronic messages application). In response to receiving the user input representing the movement of the rotatable input mechanism, the device displays a landing screen 608 (e.g., the screen displayed when the application starts or the screen displayed after the application initializes) of the electronic messages application. In some examples, if the user rotates the rotatable input mechanism in a second direction (e.g., opposite to the first direction) while at user interface screen 606, the device does not display the landing screen 608 in response to the rotation in the second direction.

Alternatively, rather than receiving user input representing movement of the rotatable input mechanism, the device receives user input associated with the affordance representing the electronic messages application 604 (e.g., the user activates the affordance 604 by touching the affordance 604). In response to receiving the user input associated with the affordance representing the electronic messages application 604, the device displays the landing screen 608 (e.g., the screen displayed when the application starts or the screen displayed after the application initializes) of the electronic messages application.

At FIG. 6A, the landing screen 608 includes at least two affordances: an inbox affordance 610 and a compose affordance 612. In this example, inbox affordance 610 also includes an indication of the number of unread messages (e.g., "3"). In some embodiments, the inbox affordance 610 and the compose affordance 612 are displayed concurrently. Thus, the user can select between the inbox affordance 610 and the compose affordance 612 on the landing screen 608. The inbox affordance 610, when activated, enables display of an electronic conversations inbox. The compose affordance 612, when activated, enables a user to compose a new electronic message. Generally, a user can activate an affordance or object by using a finger tap on the displayed affordance or object.

Reviewing electronic messages (e.g., in the form of conversations) stored in the inbox and composing electronic messages are two frequently accessed functions. Accordingly, providing concurrent access to these two functions provides the user with efficient messages access. The device receives user input associated with the landing screen 608 (e.g., the user activates the inbox affordance 610 or the compose affordance 612; generally, displayed items are associated with user inputs in a contextual manner, such as the user input being received at a location on the touch-sensitive surface that corresponds to the location of the displayed item on the display to activate the displayed item). Thus, an input associated with a particular displayed affordance or object may be, for example, a detected touch at the location of the displayed affordance or object.

The device determines whether the user input associated with the landing screen 608 represents a touch associated with the displayed inbox affordance 610 or a touch associated with the displayed compose affordance 612 (e.g., the devices determines whether the user activates the inbox affordance 610 or the compose affordance 612 by, for example, tapping on the affordance).

At FIG. 6A, in response to receiving the user input associated with the landing screen 608 and in accordance with a determination that the user input associated with the landing screen 608 represents a touch associated with the displayed inbox affordance 610 (e.g., the user tapped on the inbox affordance 610), the device displays, on the display, a list of electronic conversation objects 614A-B, including electronic conversation object 614A and 614B (e.g., the device displays a messages inbox that includes different conversations). Thus, the inbox affordance 610, when activated, causes display of the list of electronic conversation objects 614A-B.

At FIG. 6A, at user interface screen 614, the list of electronic conversation objects 614A-B includes electronic conversation objects 614A and 614B. An electronic conversation object (e.g., 614A and 614B) may include one or more of: all or a portion of the name(s) (or phone numbers) of the individuals who are included in the conversation (e.g., senders and recipients, not including the user) associated with the electronic conversation object (e.g., "Chris Lee" in object 614A, "Jen Jones" in object 614B), all or a portion of the body of the conversation associated with the electronic conversation object (e.g., "Hey, are you" in object 614A, "Can you send" in object 614B), and the day and/or time stamp of a message associated with the electronic conversation object (e.g., "2 min ago" for object 614A, "7 min ago" for object 614B", "3:02 PM", "Fri, 3:02 PM"). In some embodiments, the user can swipe up or down on the list of electronic conversation objects 614A-B to scroll through the list of electronic conversation objects 614A-B. In some embodiments, the user can rotate the rotatable input mechanism to scroll through the list of electronic conversation objects 614A-B. Rotating the rotatable input mechanism in a first direction causes the list to scroll up. Rotating the rotatable input mechanism in a second direction causes the list to scroll down. The first direction is different than the second direction.

At FIG. 6A, in response to receiving the user input associated with the landing screen 608 and in accordance with a determination that the user input associated with the landing screen 608 represents a touch associated the displayed compose affordance 612 (e.g., the user activates the compose affordance 612), the device displays an interface for composing a new electronic message 616 (e.g., a user interface for entering a recipient and a message body for a new electronic message). Thus, the compose affordance 612, when activated, causes display of the interface for composing a new electronic message 616.

Affordance 616A, when activated, enables a user to add recipients to the new electronic message. Affordance 616B, when activated, enables a user to add a text to the body. Affordance 616C, when enabled and activated, causes the new electronic message to be transmitted to the recipients.

Returning to user interface screen 614, the user can access multiple features of the electronic messages application. In accordance with some embodiments, the device receives user input representing a touch associated with an electronic conversation object 614B of the list of electronic conversation objects 614A-B. In response to receiving user input representing the touch associated with an electronic conversation object 614B of the list of electronic conversation objects, the device displays, on the display, an electronic conversation 618A-B (e.g., messages sent to a recipient and messages received from the recipient) associated with the electronic conversation object 614B, as illustrated in user interface screen 618 of FIG. 6B. Thus, object 614B, when activated, causes display of an electronic conversation 618A-B.

Figure 6B:
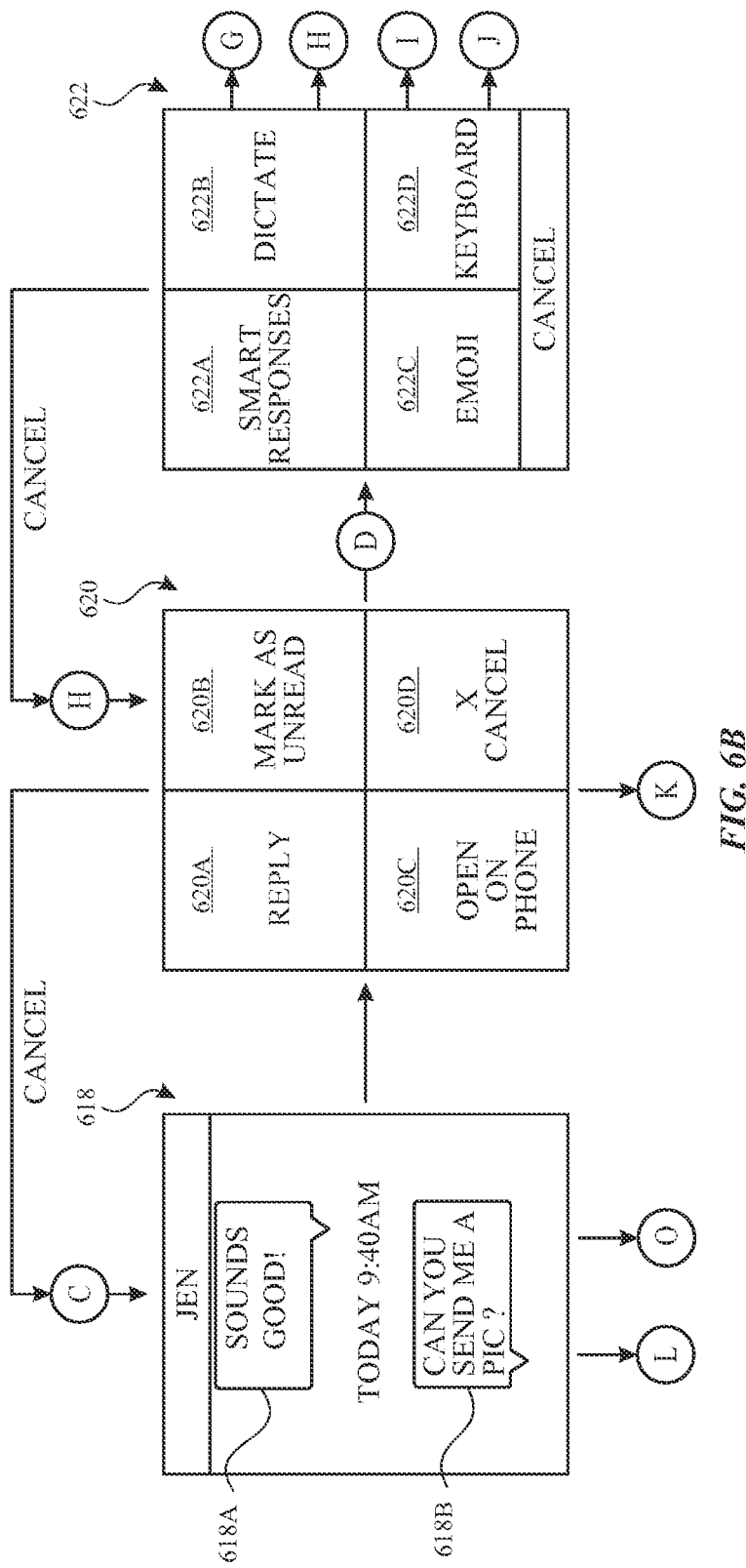
Figure 6C:
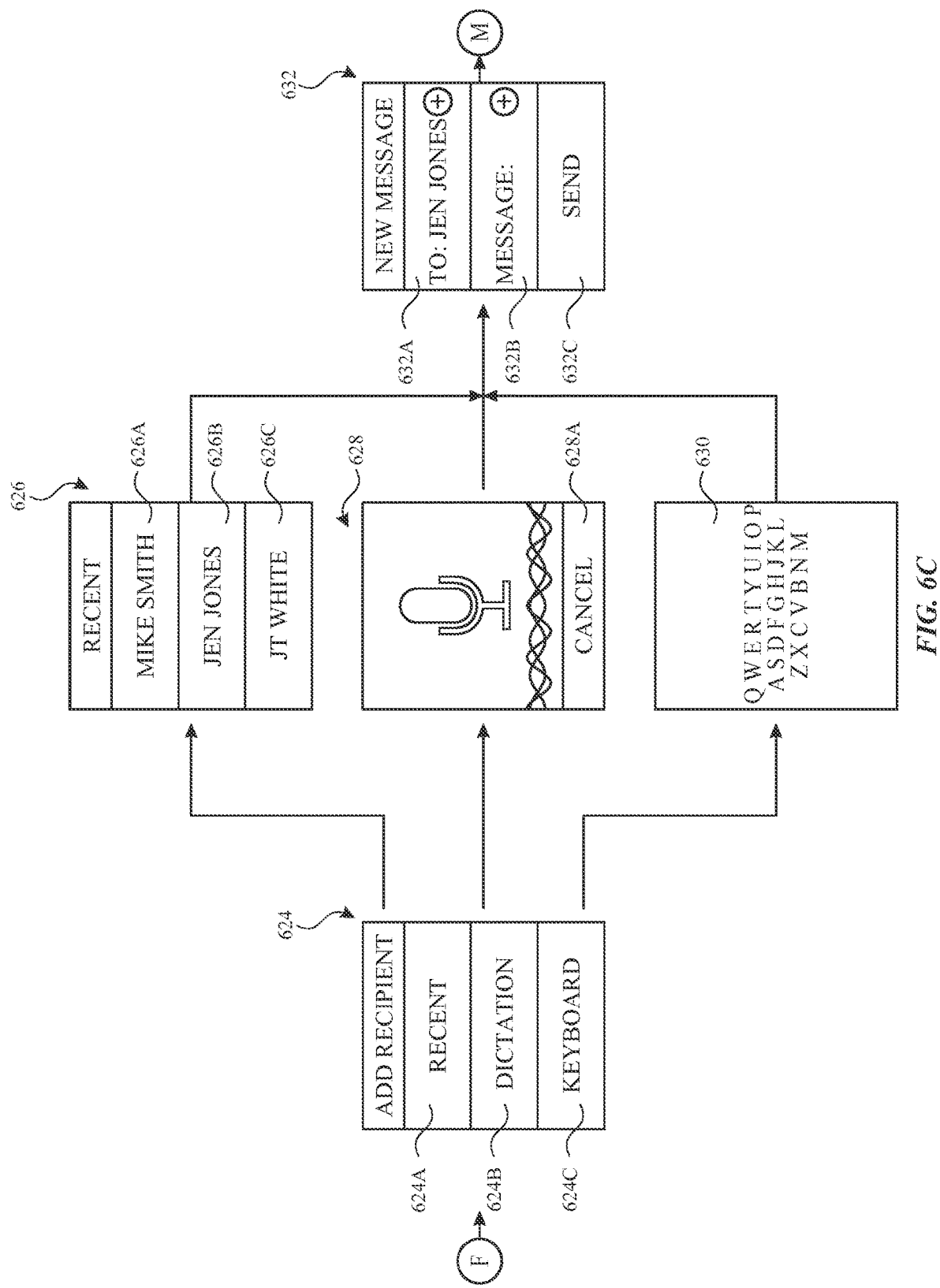

At FIG. 6B, the electronic conversation 618A-B includes electronic messages 618A and 618B. In some embodiments, the user can swipe up or down to scroll the electronic conversation 618A-B. In some embodiments, the user can rotate the rotatable input mechanism to scroll the electronic conversation 618A-B. Rotating the rotatable input mechanism in a first direction causes the electronic conversation to scroll up. Rotating the rotatable input mechanism in a second direction causes the electronic conversation to scroll down. The first direction is different than the second direction.

In accordance with some embodiments, an electronic device may receive a set of images for display in an electronic conversation (e.g., another device sends a text message that includes two images, or sends two concurrent text messages, each with a separate image to the electronic device). The electronic device determines whether the set of images includes more than a single image. In accordance with a determination that the set of images includes more than the single image, the electronic device displays a first thumbnail of a first image of the set of images and a second thumbnail (e.g., different from the first thumbnail) of a second image of the set of images (e.g., first displays thumbnails of the images while it processes and/or receives the full images. After processing and/or receiving the full images, the electronic device may display the first image and the second image, such as by replacing display of the corresponding thumbnail with display of the corresponding image). In accordance with a determination that the set of images includes a single image, the electronic device displays the single image. Thus, when multiple images are received, the electronic device can display the thumbnails of the images more quickly, as compared to waiting to display the full images. When a single image is received, the electronic device can wait for the full image to be received and/or processed before displaying the full image.

In accordance with some embodiments, while displaying user interface screen 618 the device receives user input representing a substantially horizontal swipe gesture (e.g., a swipe right gesture originating at a left bezel) on the electronic conversation 618A-B. In response to receiving user input representing the substantially horizontal swipe gesture (e.g., a swipe right gesture originating at a left bezel) on the electronic conversation 618A-B, the device replaces display of the electronic conversation with the list of electronic conversation objects 614A-B. In accordance with some embodiments, the user input representing a substantially horizontal swipe gesture is a user input representing a substantially horizontal swipe gesture from a bezel of the electronic device (e.g., a swipe right gesture originating at a left bezel).

In accordance with some embodiments, the touch-sensitive surface of the electronic device is configured to detect intensity of touches (e.g., using 524). The device receives user input representing a touch on the electronic conversation 618A-B. The device determines whether a characteristic intensity of the touch on the electronic conversation 618A-B is above an intensity threshold (e.g., a hard press; intensity may be measured based on pressure or determined based on the size of a touch). In response to receiving the user input representing the touch on the electronic conversation and in accordance with a determination that the characteristic intensity of the touch is above the intensity threshold (e.g., a deep press; intensity may be measured based on pressure or determined based on the size of a touch), the device displays, on the display, a first set of one or more affordances 620A-D associated with the electronic conversation, as illustrated in user interface screen 620. Thus, electronic conversation 618A-B, when activated with a touch above the intensity threshold, causes display of a contextual menu with affordances. A touch below the intensity threshold on electronic conversation 618A-B will not cause display of the contextual menu with affordances. Instead, for example, a touch below the intensity threshold on electronic conversation 618A-B may be used to scroll the electronic conversation 618A-B, such as by touching and swiping up or down.

In accordance with some embodiments, displaying the first set of one or more affordances 620A-D associated with the electronic conversation comprises replacing display of the electronic conversation 618A-B with display of the first set of one or more affordances 620A-D associated with the electronic conversation.

In accordance with some embodiments, the first set of one or more affordances 620A-D associated with the electronic conversation includes one or more of: (1) an affordance associated with replying to the electronic conversation 620A, (2) an affordance associated with marking the electronic conversation as unread 620B, (3) an affordance associated with opening the electronic conversation on a second device 620C (e.g., a phone, tablet, or computer), and (4) a first affordance associated with a cancel action associated with the electronic conversation 620D.

In accordance with some embodiments, the first set of one or more affordances may further include one or more of: (5) an affordance for starting a new conversation (e.g., the affordance for starting a new conversation, when activated, causes display of user interface screen 616) and (6) an affordance for muting a conversation (e.g., the affordance, when activated, disables notifications related to new incoming messages in the conversation). When a conversation is already muted, the affordance for muting the conversation provides an unmute functionality (e.g., the affordance, when activated, enables notifications related to new incoming messages in the conversation). In one embodiment, when notifications are disabled for a conversation (e.g., the conversation is muted), one or more of visual, audible, and haptic alerts normally performed (e.g., normally, as in when the conversation is not muted) at the electronic device in relation receiving (or detecting) a new incoming message related to the conversation are not performed. This has the benefit of allowing a user to not be notified when incoming messages are received in relation to a conversation that, for example, includes many participates and is very active (such as several incoming messages every minute). Subsequently, when the user wants to again receive notifications related to the muted conversation, the user can unmute the conversation. In one embodiment, when the user unmutes the conversation, the device performs one or more of the previously unperformed notifications relating to messages that were received while the conversation was muted.

Figure 6D:
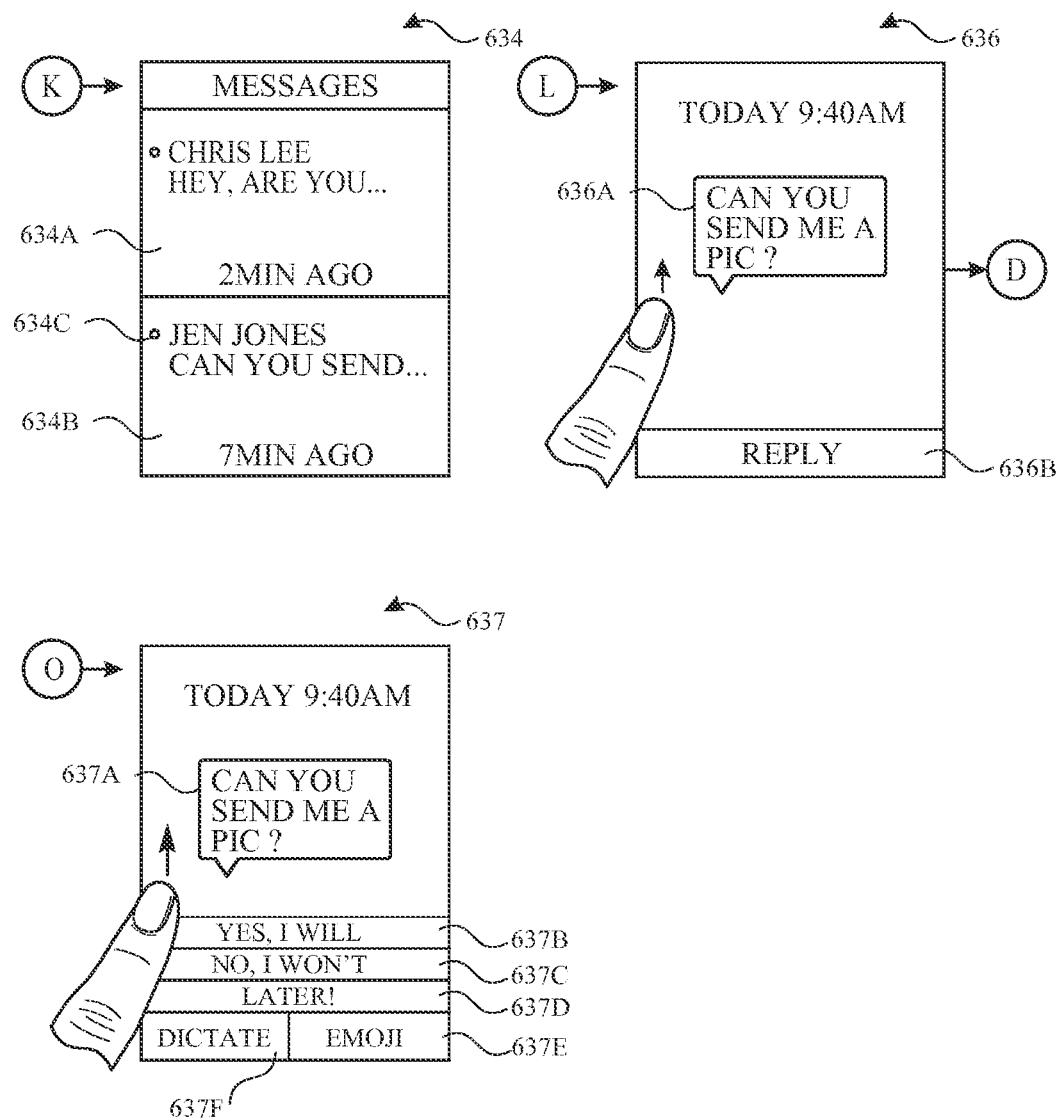

At FIG. 6D, in accordance with some embodiments, the device receives user input representing a substantially upward swipe gesture (e.g., a swipe up gesture) or rotation of the rotatable input mechanism associated with the electronic conversation, as illustrated in user interface screen 636. In response to receiving user input representing the substantially upward swipe gesture (e.g., a swipe up gesture) associated with the electronic conversation, the device displays an affordance associated with replying to the electronic conversation 636B. Thus, when the device detects a swipe up gesture at the electronic conversation, an affordance for replying to the conversation is displayed at the end of the displayed conversation (e.g., 636A).

Figure 6E:
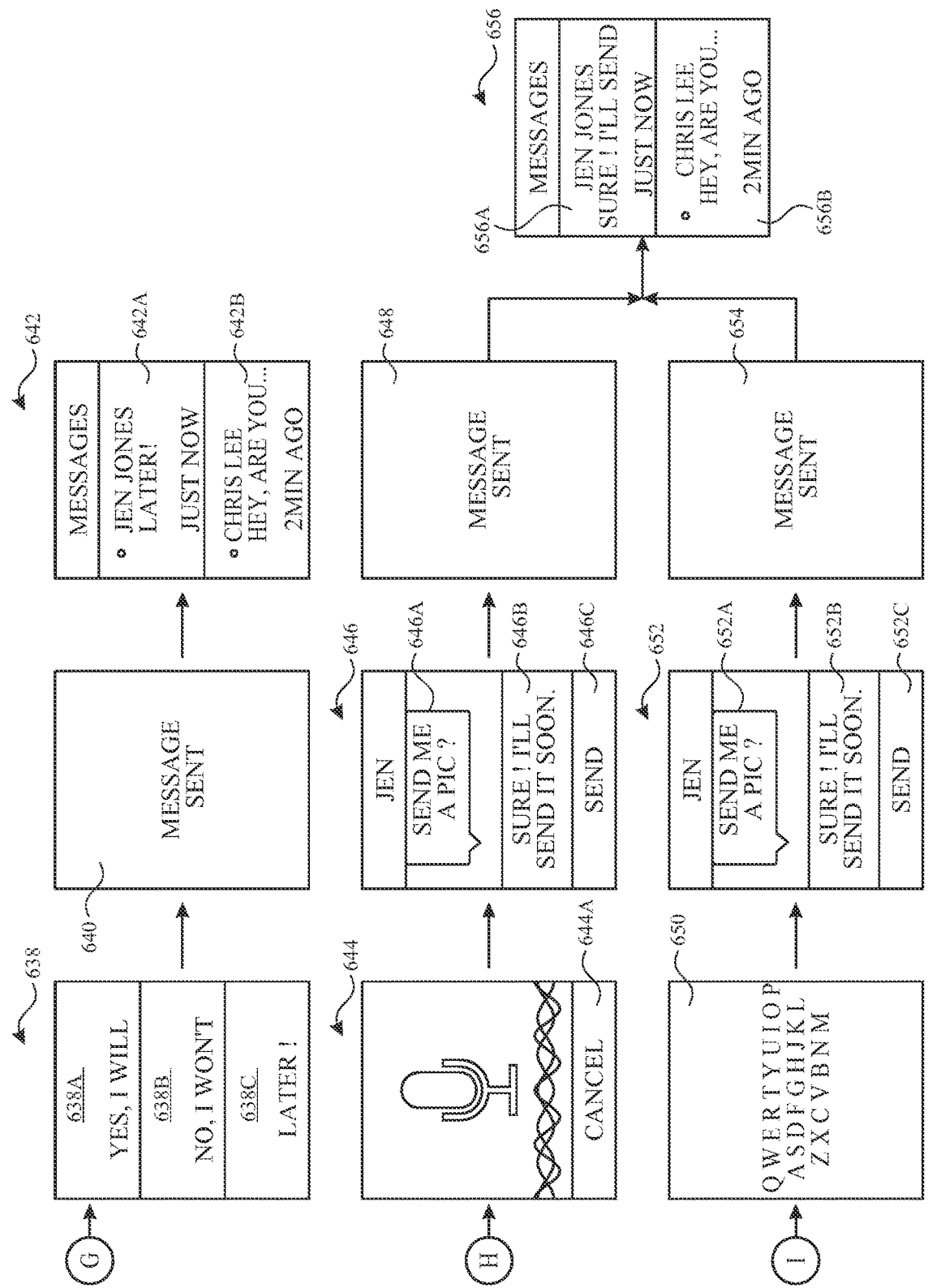

At FIG. 6D, in accordance with some embodiments, the device receives user input representing a swipe gesture (e.g., a substantially upward swipe gesture) or rotation of the rotatable input mechanism associated with the electronic conversation, as illustrated in user interface screen 637. In response to receiving user input representing the swipe gesture (e.g., a substantially upward swipe gesture) associated with the electronic conversation, the device displays a set of one or more affordances of suggested responses 637B-D (e.g., the device determines potential responses to the last received message in the conversation and presents the responses to the user as suggestions for selection), as illustrated in user interface 637 of FIG. 6D. For example, a tap on one of the affordances (e.g., 637C) selects the corresponding suggested response. In accordance with some embodiments, in response to receiving user input representing the swipe gesture (e.g., a substantially upward swipe gesture) associated with the electronic conversation, the device also displays an affordance associated with dictation 637F. In response to receiving user input representing the touch associated with the affordance associated with dictation 637F, the device displays a dictation interface (e.g., 644, as illustrated in FIG. 6E). In accordance with some embodiments, in response to receiving user input representing the swipe gesture (e.g., a substantially upward swipe gesture) associated with the electronic conversation, the device also displays an affordance associated with emoji 637E. In response to receiving user input representing the touch associated with the affordance associated with emoji 637E, the device displays an interactive graphical object 659A, such as illustrated in user interface screen 658 of FIG. 6F. For example, the interactive graphical object may be a smiley face object, a thumbs up/down object, or the like. Thus, when the device detects a swipe up gesture at the electronic conversation, suggested affordances for replying to the conversation are displayed at the end of the displayed conversation, and optionally, an affordance for dictating a response and an affordance for selecting an emoji are displayed at the end of the displayed conversation. Thus, some or all of the techniques of user interface screen 622 and 638 may be placed in-line with the conversation.

Returning to user interface screen 620 of FIG. 6B, in accordance with some embodiments, the device receives user input representing a touch associated with the first affordance associated with the cancel action 620D. In response to receiving user input representing the touch associated with the first affordance associated with the cancel action, the device replaces display of the first set of one or more affordances 620A-D with display of the electronic conversation 618A-B. Thus, affordance 620D, when activated, causes display of the electronic conversation 618A-B.

In accordance with some embodiments, the device receives user input representing a touch associated with the affordance associated with replying to the electronic conversation 620A. In response to receiving user input representing the touch associated with the affordance associated with replying to the electronic conversation 620A, the device replaces display of the first set of one or more affordances 620A-D with a second set of one or more affordances 622A-D associated with the electronic conversation, as illustrated in user interface 622. Thus, affordance 620A, when activated, causes display of the second set of one or more affordances 622A-D.

In accordance with some embodiments, the second set of affordances 622A-D associated with the electronic conversation includes one or more of (1) an affordance associated with smart response 622A, (2) an affordance associated with emoji response 622C, (3) an affordance associated with dictation 622B, and (4) an affordance associated with keyboard 622D.

Techniques for receiving user input related to smart responses, dictation, emoji, and keyboard may be found, for example, in related U.S. Provisional Patent Application entitled "USER INTERFACE FOR RECEIVING USER INPUT," filed on Sep. 2, 2014, naming Zambetti et al. as inventors, the entire disclosure of which is incorporated herein by reference.

In accordance with some embodiments, the device receives user input representing a touch associated with the affordance associated with smart response 622A In response to receiving user input representing the touch associated with the affordance associated with smart response, the device replaces display of the second set of one or more affordances 622A-D with display of one or more suggested responses 638A-C (e.g., the device determines potential responses to the last received message in the conversation and presents the responses to the user as suggestions for selection), as illustrated in user interface 638 of FIG. 6E.

In one example, the device determines whether a received message contains an interrogatory. This determination may be based on the determination that the received message contains the verbiage "are you" at the beginning of the received message and a question mark at the end of the received message. Based on determining that the received message contains an interrogatory, the one or more suggested responses may include "yes," "no," and "maybe."

In another example, the received message may state "beef or chicken?" As before, the device may determine that the message contains an interrogatory (based on at least the use of the question mark in the message). In addition, the device may recognize the interrogatory is one that contains alternative choices, based on the appearance of the word "or" in the received message. In this case, the device may parse the words immediately before and after the word "or". Accordingly, the one or more suggested responses may include "beef" and "chicken".

Techniques for determining suggested responses may be found, for example, in related U.S. Provisional Patent Application Ser. No. 62/005,958, entitled "Canned Answers in Messages," filed May 30, 2014, the entire disclosure of which is incorporated herein by reference.

User interface screen 638 of FIG. 6E illustrates an example of one or more suggested responses 638A-C. Affordance 638A may be selected to respond with "Yes, I will." Affordance 638B may be selected to respond with "No, I won't." Affordance 638C may be selected to respond with "Later!" Note that the suggested responses may include, for example, one or more of: frequently used responses of the user (e.g., responses that were previously used more than a predetermined number of times), preselected responses (e.g., responses that the user previously selected to be made available), and intelligent responses determined by the device based on one or more of: the current date, location, and conversation text.

In accordance with some embodiments, the device transmits a selected response directly in response to the user selection of the response. For example, the device receives user input representing a touch associated with a first suggested response 638C of the one or more suggested responses 638A-C. In response to receiving user input representing the touch associated with the first suggested response 638C, the device transmits the first suggested response (e.g., as response information to the other members of the conversation). Response information is transmitted to recipients, for example, (1) by direct wireless WiFi communication with a WiFi-enabled router, (2) by direct wireless cellular communication with a cellular base station, or (3) by using a companion device (such as a cellular telephone or laptop) as an intermediary and requesting that the companion device transmit the response information. The companion device also includes a user-accessible electronic message application and may be configured for accessing the electronic messages of the user of the electronic device. Once the reply is sent, a notification 640 indicating that the reply has been sent is displayed. Thus, affordance 638C, when activated, causes a reply message to be transmitted to the members of the current electronic conversation.

Once the response is transmitted in a conversation, the electronic conversation object 642A associated with that conversation is displayed at the top of the list of electronic conversation objects 642A-B, as illustrated in user interface screen 642. For example, user interface screen 640 displays for a predetermined amount of time before the display is replaced with user interface screen 642A-B.

Alternatively, in accordance with some embodiments, the device adds the suggested response to an electronic conversation, but does not transmit the response to recipients until the user requests that the response be transmitted (e.g., by activating a send affordance). For example, the device receives user input representing a touch associated with a first suggested response 638C of the one or more suggested responses 638A-C. In response to receiving user input representing the touch associated with the first suggested response 638C, the device adds the first suggested response as response information for the electronic conversation (e.g., as illustrated in user interface 646 of FIG. 6E).

In accordance with some embodiments, at user interface screen 622, the device receives user input representing a touch associated with the affordance associated with emoji response 622C. In response to receiving user input representing the touch associated with the affordance associated with emoji response 622C, the device replaces display of the second set of one or more affordances 622A-D with display of an interactive graphical object 659A, such as illustrated in user interface screen 658 of FIG. 6F. For example, the graphical item may be a smiley face object, a thumbs up/down object, or the like.

Figure 6F:
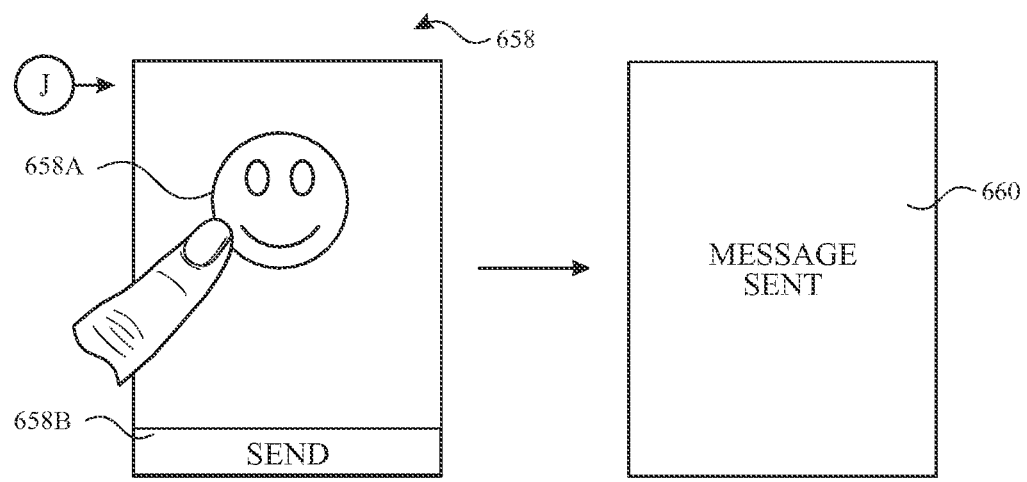
Figure 6G:
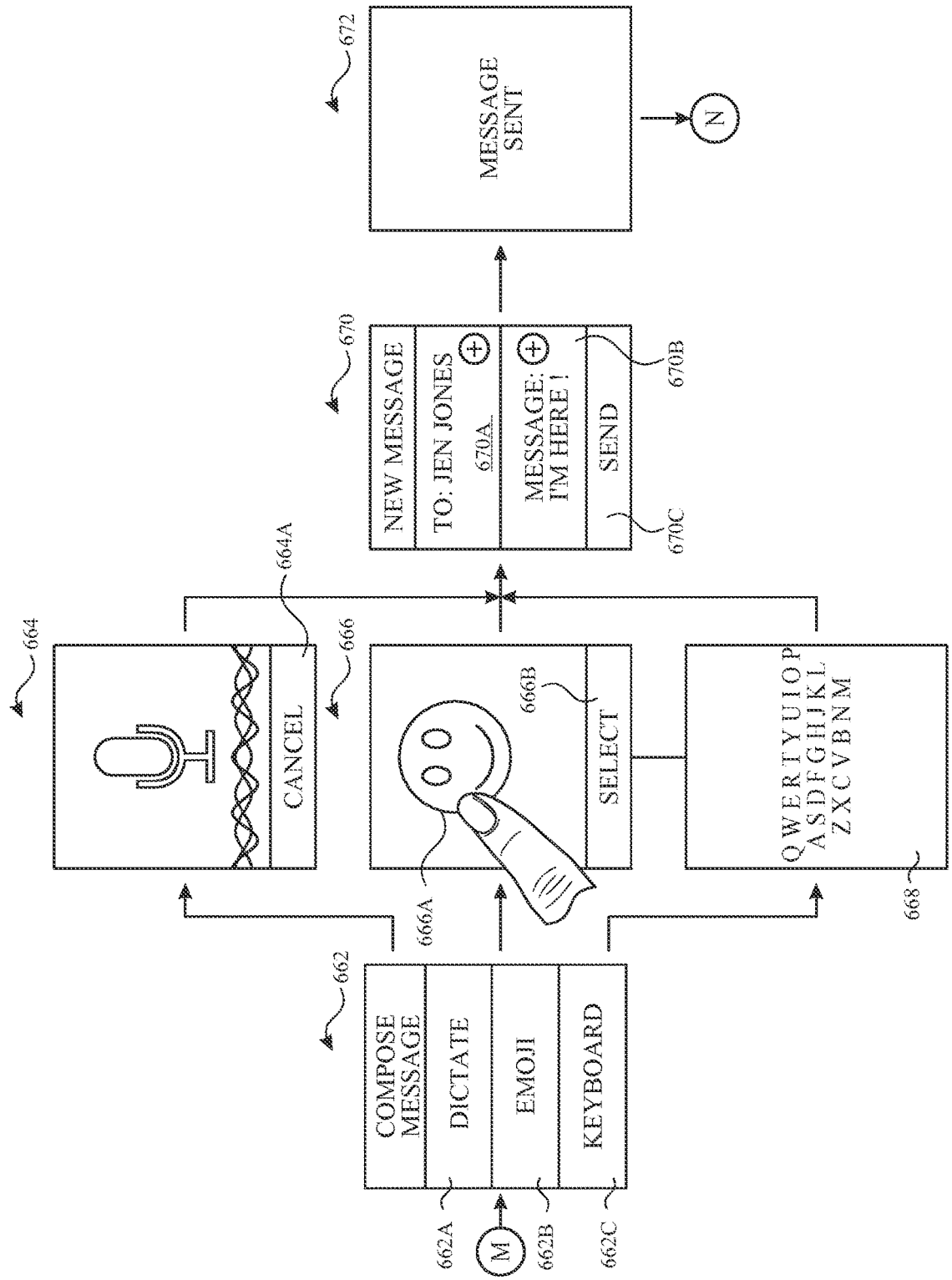

In accordance with some embodiments, the graphical object can be altered (e.g., manipulated) prior to sending the graphical object to the recipient(s) using send affordance 658B. For example, in response to receiving a user input associated with the send affordance 658B, the device transmits the (user-altered) graphical object as the response information to the recipient(s). Once the reply is transmitted, a notification 660 indicating that the reply has been sent is displayed, as illustrated in FIG. 6F.

In accordance with some embodiments, at user interface screen 622, the device receives user input representing a touch associated with the affordance associated with dictation 622B. In response to receiving user input representing the touch associated with the affordance associated with dictation 622B, the device replaces display of the second set of one or more affordances 622A-D with display of a dictation interface 644, as illustrated in FIG. 6E. In some examples, the waveform of dictate interface 644 is animated so that it appears to emanate from a physical button used to initiate the action, such as a hardware button or a rotatable input mechanism, of the electronic device. In some examples, a microphone of the electronic device is enabled and the graphic waveform display is based on audio input received at the microphone. Automatic speech recognition to transcribe the audio input can happen at the device, at a remote device (such as a laptop, phone, or tablet wirelessly connected to the device using WiFi or bluetooth), or at a remote server (such as a server accessed over the Internet). Cancel affordance 644A can be used, for example, to end transcription and to transition the display back to user interface screen 622.

In accordance with some embodiments, the device receives user input representing speech. In response to receiving user input representing speech, the device transcribes the user input representing speech (e.g., the device records audio input at the device that represents content to be sent in reply to the message). Transcribing the speech can be done several ways, including: (1) locally, by the electronic device, (2) remotely, where the electronic device transmits (e.g., via WiFi or Bluetooth) the user input representing speech (or data that is based on the user input representing speech) to a companion device (e.g., a cellular phone or laptop), the companion device locally transcribes the user input, and the electronic device receives the transcribed speech from the companion device, (3) remotely, where the electronic device transmits (e.g., via WiFi or Bluetooth) the user input representing speech (or data that is based on the user input representing speech) to a server (e.g., a server connected over the Internet), the server transcribes the user input, and the electronic device receives the transcribed speech from the server (e.g., via WiFi or Bluetooth), or (4) remotely, where the electronic device transmits (e.g., via WiFi or Bluetooth) the user input representing speech (or data that is based on the user input representing speech) to a companion device (e.g., a cellular phone or laptop), the companion device transmits the user input to a server, the server transcribes the user input, the companion device receives the transcribed speech from the server, and the electronic device receives the transcribed speech from the companion device. The device adds the transcribed speech as response information for the electronic conversation. For example, the transcription can be performed using speech-to-text and/or automatic speech recognition using a virtual assistant. At user interface screen 646, the conversation 646A has been updated to reflect the addition of "Sure! I'll sent it soon." in the field 646B. Thus, the user can provide audio input to enter response information for an electronic conversation. Send affordance 646C, when enabled and activated, causes the response information (e.g., the transcribed speech) to be transmitted to the recipient(s) of the conversation. Once the reply is sent, a notification 648 indicating that the reply has been sent is displayed.

An example of a virtual assistant is described in Applicants' U.S. Utility application Ser. No. 12/987,982 for "Intelligent Automated Assistant," filed Jan. 10, 2011, the entire disclosure of which is incorporated herein by reference.

Once the response is transmitted in a conversation, the electronic conversation object 656A associated with that conversation is displayed at the top of the list of electronic conversation objects 656A-B, as illustrated in user interface screen 656. For example, user interface screen 648 displays for a predetermined amount of time before the display is replaced with user interface screen 656A-B.

In accordance with some embodiments, at user interface screen 622, the device receives user input representing a touch associated with the affordance associated with keyboard 622D. In response to receiving user input representing the touch associated with the affordance associated with the keyboard 622D, the device replaces display of the second set of one or more affordances 622A-D with display of one or more keys of a keyboard (e.g. display a keyboard that allows user input to enter a reply; the reply is the response information that will be sent to the recipient(s)), as illustrated in user interface screen 650 of FIG. 6E. Thus, affordance 622D, when activated, causes the display of a keyboard that the user may use for inputting data, such as text.

In accordance with some embodiments, once keyboard input is received, the received keyboard input is added to the conversation. For example, at user interface screen 652, the conversation 652A has been updated to reflect the addition of "Sure! I'll sent it soon." in the field 652B. Thus, the user can provide keyboard input to enter response information for an electronic conversation.

In accordance with some embodiments, the device determines whether the electronic conversation includes response information (e.g., 646B, 652B). In response to determining that the electronic conversation includes response information, displaying an affordance associated with sending the response information 652C. For example, once the user has entered a response into the response field, the send affordance 652C becomes enabled and is no longer grayed out. Prior to entering response information into the response field, the send affordance 652C cannot be activated. After entering response information into the response field, the send affordance 652C can be activated. When the send affordance 652C is activated, the response information is transmitted to the recipient(s) and user interface screen 654 is displayed. User interface screen 654 is displayed for a predetermined amount of time before the display is replaced with user interface screen 656A-B.

In accordance with some embodiments, the device receives user input representing a touch associated with the affordance associated with sending the response information (e.g., 652C, 646C). In response to receiving user input representing the touch associated with the affordance associated with sending the response information (e.g., 652C, 646C), the device transmits the response information. For example, the device sends the response to the recipient(s) using text entered by the user when the user presses the send affordance (e.g., 646C, 652C). The response information is transmitted to recipients, for example, (1) by direct wireless WiFi communication with a WiFi-enabled router, (2) by direct wireless cellular communication with a cellular base station, or (3) by using a companion device (such as a cellular telephone or laptop) as an intermediary and requesting that the companion device transmit the response information. The companion device also includes a user-accessible electronic message application and may be configured for accessing the electronic messages of the user of the electronic device.

Once the response is transmitted to the recipient(s) in a conversation, the electronic conversation object 656A associated with that conversation is displayed at the top of the list of electronic conversation objects 656A-B, as illustrated in user interface screen 656. For example, user interface screen 648 displays for a predetermined amount of time before the display is replaced with user interface screen 656A-B.

In accordance with some embodiments, at user interface screen 620, the device receives user input representing a touch associated with the affordance associated with marking the electronic conversation as unread 620B. In response to receiving user input representing the touch associated with the affordance associated with marking the electronic conversation as unread 620B, the device replaces display of the first set of one or more affordances 620A-D with display of the list of electronic conversation objects 634A-B, including an unread indicator 634C (e.g., display the conversation with a circle to indicate the conversation is unread), as illustrated in user interface screen 634 of FIG. 6D. For example, each conversation object 634A and 634B includes a circle indicator that indicates the corresponding conversations include at least one unread message.

In accordance with some embodiments, at user interface screen 620, the device receives user input representing a touch associated with the affordance associated with opening the electronic conversation on a second device 620C (e.g., opening the electronic conversation on a phone, tablet, or computer). In response to receiving user input representing the touch associated with the affordance associated with opening the electronic conversation on a second device 620C, the device causes the electronic conversation to be displayed on a linked companion device (e.g., displaying the conversation on a phone, tablet, or laptop that has been linked to the electronic device, such as through WiFi, Bluetooth). Thus, affordance 620C, when activated, causes the electronic conversation to be displayed on a linked device.

Figure 6H:
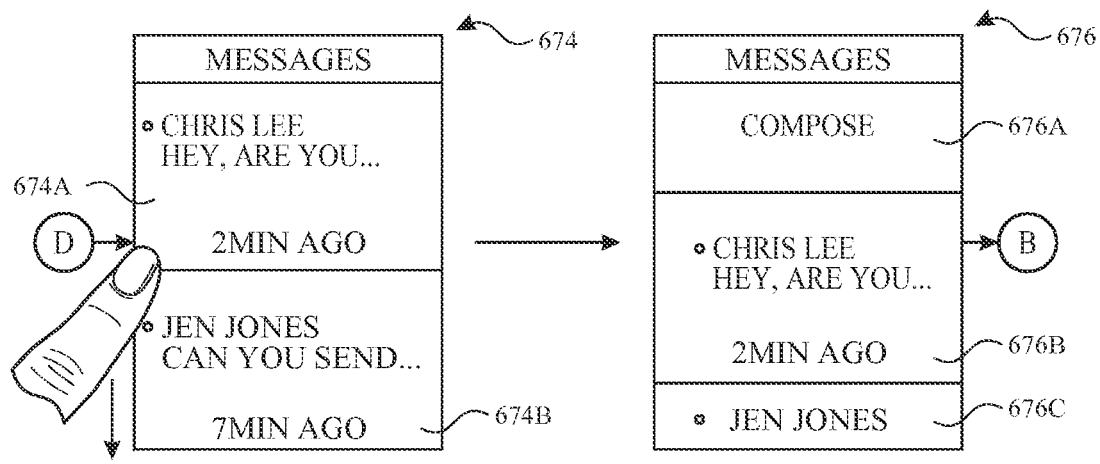

In accordance with some embodiments, at user interface screen 614, the device receives user input representing a substantially downward swipe gesture (e.g., a swipe down gesture) associated with the list of electronic conversation objects (e.g., the inbox), as illustrated in user interface screen 674 of FIG. 6H. In response to receiving user input representing the substantially downward swipe gesture (e.g., a swipe down gesture) associated with the list of electronic conversation objects 674A-B (e.g., on either 674A or 674B of the inbox), the device displays an affordance associated with composing a new electronic message 676A, as illustrated in user interface screen 676. Thus, when the device detects a swipe down gesture at the list of electronic conversation objects, an affordance for composing a new electronic message is displayed at a location above the top of the list of electronic conversation objects. This allows a user to easily access the interface for composing a new electronic message.

In accordance with some embodiments, the device receives user input representing a touch associated with the affordance associated with composing a new electronic message 676A. In response to receiving the user input associated with the affordance associated with composing a new electronic message 676A, the device displays, on the display, the interface for composing a new electronic message 616A-C (e.g., a user interface for entering message recipient and body), as illustrated in user interface screen 616.

In accordance with some embodiments, the interface for composing the new electronic message comprises one or more of: (1) an affordance associated with adding recipient information to the new electronic message 616A, and (2) an affordance associated with adding response information to the new electronic message 616B.

In accordance with some embodiments, the device receives user input representing a touch associated with the affordance associated with adding recipient information to the new electronic message 616A. In response to receiving user input representing the touch associated with the affordance associated with adding recipient information to the new electronic message 616A, the device replaces display of the interface for composing the new electronic message 616A-C with display of a third set of one or more affordances 624A-C associated with the new electronic message (e.g. for selecting recipient using a recent, dictation, or keyboard affordance), as illustrated in user interface screen 624 of FIG. 6C.

In accordance with some embodiments, the third set of one or more affordances associated with the new electronic message includes one or more of: (1) an affordance associated with recent contacts 624A, (2) an affordance associated with dictation 624B, and (3) an affordance associated with keyboard 624C.

In accordance with some embodiments, the device receives user input representing a touch associated with the affordance associated with recent contacts 624A. In response to receiving user input representing the touch associated with the affordance associated with recent contacts 624A, the device replaces display of the third set of one or more affordances 624A-C with display of one or more recent contact affordances 626A-C. For example, the device displays a list of contacts recently contacted (either incoming or outgoing, through audio call, messages, electronic mail, etc) for user selection as a recipient of the new electronic message. Thus, affordance 624A, when activated, causes display of affordances for recently contacted contacts.

In accordance with some embodiments, the device receives user input representing a touch associated with a recent contact affordance 626B of the one or more recent contact affordances 626A-C. In this example, user interface screen 626 includes recent contact affordance 626A ("Mike Smith"), recent contact affordance 626B ("Jen Jones"), and recent contact affordance 626C ("JT White"). The recent contact affordance 626B is associated with contact information (e.g., a phone number, email address, or username). For example, the information is stored on the electronic device and is also accessible through a contacts application. In response to receiving user input representing the touch associated with the recent contact affordance 626B, the device adds the contact information (e.g., the phone number, email address, or username) as recipient information to the new electronic message. For example, when a contact has more than one contact information associated with the contact, the device may use the default contact information as the recipient information for the new electronic message. Thus, the contact affordance 626B, when activated, causes contact information to be added to the new electronic message.

After selection of a recipient using user interface screen 626, user interface screen 632 is displayed, including (1) the affordance associated with adding recipient information to the new electronic message 632A, and (2) the affordance associated with adding response information to the new electronic message 632B. In user interface screen 632, because a recipient has been selected, the affordance 632A provides an indication of the recipient(s). In user interface screen 632, because there is no response information (e.g., message body), affordance 632B does not display response information. In user interface screen 632, affordance 632C is not enabled (and therefore cannot be activated by the user) because the new electronic message does not include both a recipient and body (e.g., recipient information and response information). Thus, affordance 632C may be grayed out until the device determines that the new electronic message includes both recipient information and body information.

In accordance with some embodiments, at user interface screen 624, the device receives user input representing a touch associated with the affordance associated with dictation 624B. In response to receiving user input representing the touch associated with the affordance associated with dictation 624B, the device replaces display of the third set of one or more affordances 624A-C with display of a dictation interface 628. In some examples, the waveform of dictate interface 628 is animated so that it appears to emanate from a physical button, such as a hardware button or a rotatable input mechanism, of the electronic device. In some examples, a microphone of the electronic device is enabled and the graphic waveform display is based on audio input received at the microphone. Automatic speech recognition to transcribe the audio input can happen at the device, at a remote device (such as a laptop, phone, or tablet wirelessly connected to the device using WiFi or bluetooth), or at a remote server (such as a server accessed over the Internet). Cancel affordance 628A can be used, for example, to end transcription/audio recording and to transition the display back to user interface screen 624.

In accordance with some embodiments, the device receives user input representing recipient speech. In response to receiving user input representing recipient speech, the device transcribes the user input representing recipient speech. Transcribing the speech can be done several ways, including: (1) locally, by the electronic device, (2) remotely, where the electronic device transmits (e.g., via WiFi or Bluetooth) the user input representing speech (or data that is based on the user input representing speech) to a companion device (e.g., a cellular phone or laptop), the companion device locally transcribes the user input, and the electronic device receives the transcribed speech from the companion device, (3) remotely, where the electronic device transmits (e.g., via WiFi or Bluetooth) the user input representing speech (or data that is based on the user input representing speech) to a server (e.g., a server connected over the Internet), the server transcribes the user input, and the electronic device receives the transcribed speech from the server (e.g., via WiFi or Bluetooth), or (4) remotely, where the electronic device transmits (e.g., via WiFi or Bluetooth) the user input representing speech (or data that is based on the user input representing speech) to a companion device (e.g., a cellular phone or laptop), the companion device transmits the user input to a server, the server transcribes the user input, the companion device receives the transcribed speech from the server, and the electronic device receives the transcribed speech from the companion device. In response to receiving user input representing recipient speech, the device adds the transcribed recipient speech as recipient information to the new electronic message. Thus, when dictation mode is enabled, the user can speak the name or contact information of a recipient and the device will transcribe the spoken name or contact information.

After selection of a recipient using user interface screen 628, user interface screen 632 is displayed, including (1) the affordance associated with adding recipient information to the new electronic message 632A, and (2) the affordance associated with adding response information to the new electronic message 632B. In user interface screen 632, because a recipient has been selected, the affordance 632A provides an indication of the recipient(s). In user interface screen 632, because there is no response information (e.g., message body), affordance 632B does not display response information. In user interface screen 632, affordance 632C is not enabled (and therefore cannot be activated by the user) because the new electronic message does not include both a recipient and body (e.g., recipient information and response information). Thus, affordance 632C may be grayed out until the device determines that the new electronic message includes both recipient information and body information.

In accordance with some embodiments, at user interface screen 624, the device receives user input representing a touch associated with the affordance associated with keyboard 624C. In response to receiving user input representing the touch associated with the affordance associated with keyboard 624C, the device replaces display of the third set of one or more affordances 624A-C with display of one or more keys of a keyboard (e.g. display a keyboard that allows user input to enter recipient information), as illustrated in FIG. 630.

In accordance with some embodiments, the device receives user input representing keyboard input using the one or more keys of the keyboard of user interface screen 630. The user input representing keyboard input associated with contact information (e.g., the user enters all or a portion of an email address, phone number, or a name linked to an email address or phone number using the keyboard). In response to receiving user input representing the keyboard input, the device adds the contact information (e.g., the phone number, email address, or username) as recipient information to the new electronic message. Thus, the user can enter select a recipient using user interface screen 630.

After selection of a recipient using user interface screen 630, user interface screen 632 is displayed, including (1) the affordance associated with adding recipient information to the new electronic message 632A, and (2) the affordance associated with adding response information to the new electronic message 632B. In user interface screen 632, because a recipient has been selected, the affordance 632A provides an indication of the recipient(s). In user interface screen 632, because there is no response information (e.g., message body), affordance 632B does not display response information. In user interface screen 632, affordance 632C is not enabled (and therefore cannot be activated by the user) because the new electronic message does not include both a recipient and body (e.g., recipient information and response information). Thus, affordance 632C may be grayed out until the device determines that the new electronic message includes both recipient information and body information.

In accordance with some embodiments, the device receives data representing a touch associated with the affordance associated with adding response information to the new electronic message 632B. In response to receiving data representing the touch associated with the affordance associated with adding response information to the new electronic message 632B, the device replaces display of the interface for composing the new electronic message 632A-C with display of a fourth set of one or more affordances 662A-C associated with the new electronic message (e.g. for selecting recipient using a recent, dictation, or keyboard affordance). Thus, affordance 632B, when activated, causes display of the fourth set of one or more affordances 662A-C.

In accordance with some embodiments, the fourth set of affordances associated with the electronic message includes one or more of: (1) an affordance associated with emoji response 662B, (2) an affordance associated with dictation 662A, and (3) an affordance associated with keyboard 662C.

In accordance with some embodiments, the device receives user input representing a touch associated with the affordance associated with emoji response 662B. In response to receiving user input representing the touch associated with the affordance associated with emoji response, the device replaces display of the fourth set of one or more affordances 662A-C with display of an interactive graphical object 666A, as illustrated in user interface screen 666 of FIG. 6G. For example, the graphical item may be a smiley face object, a thumbs up/down object, or the like.

In accordance with some embodiments, the graphical object can be altered (e.g., manipulated) prior to adding the graphical object to the new electronic message using select affordance 666B. For example, in response to receiving a user input associated with the select affordance 666B, the device adds the (user-altered) graphical object as the response information to new electronic message. Once the new electronic message is transmitted, a notification 672 indicating that the new electronic message has been sent is displayed.

In accordance with some embodiments, the device receives user input representing a touch associated with the affordance associated with dictation 662A. In response to receiving user input representing the touch associated with the affordance associated with dictation 662A, the device replaces display of the fourth set of one or more affordances 662A-C with display of a dictation interface 664. In some examples, the waveform of dictate interface 664 is animated so that it appears to emanate from a physical button associated with causing the action, such as a hardware button or a rotatable input mechanism, of the electronic device. In some examples, a microphone of the electronic device is enabled and the graphic waveform display is based on audio input received at the microphone. Automatic speech recognition to transcribe the audio input can happen at the device, at a remote device (such as a laptop, phone, or tablet wirelessly connected to the device using WiFi or bluetooth), or at a remote server (such as a server accessed over the Internet). Cancel affordance 664A can be used, for example, to end transcription/audio recording and to transition the display back to user interface screen 662.

In accordance with some embodiments, the device receives user input representing speech. In response to receiving user input representing speech, the device transcribes the user input representing speech. Transcribing the speech can be done several ways, including: (1) locally, by the electronic device, (2) remotely, where the electronic device transmits (e.g., via WiFi or Bluetooth) the user input representing speech (or data that is based on the user input representing speech) to a companion device (e.g., a cellular phone or laptop), the companion device locally transcribes the user input, and the electronic device receives the transcribed speech from the companion device, (3) remotely, where the electronic device transmits (e.g., via WiFi or Bluetooth) the user input representing speech (or data that is based on the user input representing speech) to a server (e.g., a server connected over the Internet), the server transcribes the user input, and the electronic device receives the transcribed speech from the server (e.g., via WiFi or Bluetooth), or (4) remotely, where the electronic device transmits (e.g., via WiFi or Bluetooth) the user input representing speech (or data that is based on the user input representing speech) to a companion device (e.g., a cellular phone or laptop), the companion device transmits the user input to a server, the server transcribes the user input, the companion device receives the transcribed speech from the server, and the electronic device receives the transcribed speech from the companion device). In response to receiving user input representing speech, the device adds the transcribed speech as response information (e.g., the body of the message) for the new electronic message. Thus, when dictation mode is enabled, the user can speak the contents of the message body. Affordance 664A, when activated, causes the device to cancel the transcription/recording and return to user interface screen 662.

In accordance with some embodiments, the device receives user input representing a touch associated with the affordance associated with keyboard 662C. In response to receiving user input representing the touch associated with the affordance associated with the keyboard 662C, the device replaces display of the fourth set of one or more affordances 662A-C with display of one or more keys of a keyboard (e.g. display a keyboard that allows user input to enter a response; the response is the response information that will be sent to the recipient(s)).

In accordance with some embodiments, the device determines whether the new electronic message includes recipient information and response information. In response to determining that the new electronic message includes recipient information and response information (e.g., both are entered by the user), the device displays an affordance associated with sending the new electronic message 670A. For example, once the user has entered a recipient and a body, the affordance 670A becomes enabled and is no longer grayed out. Once enabled, the user can activate the affordance 670A. When the affordance 670A is not enabled, the user cannot activate the affordance 670A.

In accordance with some embodiments, the device receives user input representing a touch associated with the affordance associated with sending the new electronic message 670A. In response to receiving user input representing the touch associated with the affordance associated with sending the new electronic message (e.g., after the affordance 670A has been enabled), the device transmits the electronic message. The response information is transmitted to recipients, for example, (1) by direct wireless WiFi communication with a WiFi-enabled router, (2) by direct wireless cellular communication with a cellular base station, or (3) by using a companion device (such as a cellular telephone or laptop) as an intermediary and requesting that the companion device transmit the response information. The companion device also includes a user-accessible electronic message application and may be configured for accessing the electronic messages of the user of the electronic device). Once the message is sent, a notification 672 indicating that the message has been sent is displayed. Thus, affordance 670A, when activated, causes the message to be transmitted to the recipients of the new electronic message.

In accordance with some embodiments, at FIG. 6A, the device receives user input representing a substantially horizontal swipe gesture (e.g., a swipe left gesture) associated with an electronic conversation object 614A of the list of electronic conversation objects 614A-B. In some embodiments, the swipe gesture originates at a bezel of the device. In response to receiving user input representing the substantially horizontal swipe gesture (e.g., a swipe left gesture) associated with the electronic conversation object 614A of the list of electronic conversation objects 614A-B, the device determines whether the user input representing the substantially horizontal swipe gesture (e.g., a swipe left gesture) associated with the electronic conversation object 614A indicates the swipe gesture exceeds a first threshold (e.g., a partial swipe across the electronic conversation object) or exceeds a second threshold (e.g., a full or 75% swipe across the electronic conversation object).

In response to receiving user input representing the substantially horizontal swipe gesture (e.g., a swipe left gesture) associated with the electronic conversation object 614A and in accordance with a determination that the user input indicates the substantially horizontal swipe gesture (e.g., a swipe left gesture) associated with the electronic conversation object exceeds the first threshold and does not exceed the second threshold, the device displays an affordance for deleting an electronic conversation associated with the electronic conversation object 614A (e.g., the device displays an affordance for deleting the electronic conversation when the user performs a swipe left gesture across a small portion of the screen). In response to the user tapping on the affordance for deleting the electronic conversation, the electronic conversation and the electronic conversation object are deleted.

In response to receiving user input representing the substantially horizontal swipe gesture (e.g., a swipe left gesture) associated with the electronic conversation object 614A and in accordance with a determination that the user input indicates the substantially horizontal swipe gesture (e.g., a swipe left gesture) associated with the electronic conversation object exceeds the second threshold, the device deletes the electronic conversation associated with the electronic conversation object (e.g., the device deletes the conversation and removes the conversation object without requiring additional confirmation from the user when the user performs a swipe left gesture across a large portion of the screen).

In accordance with some embodiments, a partial swipe across an electronic conversation object displays an affordance for muting the electronic conversation and a full swipe across the electronic conversation object displays an affordance for deleting the electronic conversation (or, alternatively, a partial swipe displays an affordance for deleting and a full swipe displays an affordance for muting the conversation). The device receives user input representing a substantially horizontal swipe gesture (e.g., a swipe left gesture) associated with an electronic conversation object 614A of the list of electronic conversation objects 614A-B, as illustrated in user interface screen 614. The device determines whether the user input representing the substantially horizontal swipe gesture (e.g., a swipe left gesture) associated with the electronic conversation object 614A indicates the swipe gesture exceeds a first threshold (e.g., a partial swipe across the electronic conversation object) or exceeds a second threshold (e.g., a full or 75% swipe across the electronic conversation object).

Related techniques are described in related U.S. Patent Application 62/006,211, titled "Displaying Options, Assigning Notification, Ignoring Messages, and Simultaneous User Interface Displays In A Messaging Application," filed on Jun. 1, 2014, which is hereby incorporated by reference in its entirety.

In response to receiving user input representing the substantially horizontal swipe gesture (e.g., a swipe left gesture) associated with the electronic conversation object 614A and in accordance with a determination that the user input indicates the substantially horizontal swipe gesture (e.g., a swipe left gesture) associated with the electronic conversation object exceeds the first threshold and does not exceed the second threshold, the device displays an affordance for muting the electronic conversation associated with the electronic conversation object 614A (e.g., activating the mute affordance mutes the conversation by preventing/limiting notifications, as discussed in detail above). For example, electronic conversation object 614A slides to the left and partially off of the display to make room for the mute affordance.

In response to receiving user input representing the substantially horizontal swipe gesture (e.g., a swipe left gesture) associated with the electronic conversation object 614A and in accordance with a determination that the user input indicates the substantially horizontal swipe gesture (e.g., a swipe left gesture) associated with the electronic conversation object 614A exceeds the second threshold, the device displays an affordance for deleting an electronic conversation associated with the electronic conversation object 614A. For example, electronic conversation object 614A slides to the left and partially off of the display to make room for the delete affordance. In response to the user tapping on the delete affordance, the conversation associated with the delete affordance is deleted.

FIG. 7 is a flow diagram illustrating method 700 for accessing, composing, and manipulating electronic messages in accordance with some embodiments. In some embodiments, method 700 may be performed at an electronic device with a display (e.g., 112, 340, 504), a touch-sensitive surface (e.g., 112, 355, 504), and a rotatable input mechanism (e.g., 506). Some operations in method 700 may be combined, the order of some operations may be changed, and some operations may be omitted.

In some embodiments, the touch-sensitive surface (e.g., 112, 355, 504) is capable of detecting intensity of touch contacts. Exemplary devices that may perform method 700 include devices 100, 300, and 500 (FIGS. 1A, 3, and 5A).

Method 700 provides an intuitive way to access, compose, and manipulate electronic messages. The method reduces the cognitive burden on a user when using a device to read, send, or otherwise access or manipulate electronic messages, thereby creating a more efficient human-machine interface. For battery-operated computing devices, enabling a user to access electronic mail faster and more efficiently conserves power and increases the time between battery charges.

At block 702, an affordance (e.g., 604) representing an electronic message application is displayed (e.g., an icon among a plurality of icons).

At block 704, user input representing movement of the rotatable input mechanism is received (e.g., user starts the messages app by rotating the rotatable input mechanism). In some embodiments, the user input received represents a detected contact on the touch-sensitive surface (e.g., 112, 355, 504) corresponding to the affordance representing the electronic mail message application (e.g., the user taps on the affordance 604 to start the messages application).

At block 706, in response to receiving the user input representing the movement of the rotatable input mechanism, a landing screen (e.g., 608; the screen displayed when the application starts or the screen the application reaches after initialization) of the electronic message application is displayed. The landing screen (e.g., 608) includes display of an inbox affordance (e.g., 610) and a compose affordance (e.g., 612). In some examples, the inbox affordance (e.g., 610) and a compose affordance (e.g., 612) are displayed concurrently.

At block 708, user input associated with the landing screen (e.g., 608) is received. For example, the user activates the inbox affordance (e.g., 610) or the compose affordance (e.g., 612). Generally, displayed items are associated with user inputs in a contextual manner, such as the user input being received at a location on the touch-sensitive surface (e.g., 112, 355, 504) that corresponds to the location of the displayed item on the display to activate the displayed item.

At block 710, it is determined whether the user input associated with the landing screen represents a touch associated with the displayed inbox affordance or a touch associated with the displayed compose affordance.

At block 712, in response to receiving the user input associated with the landing screen and in accordance with a determination that the user input associated with the landing screen represents a touch associated with the displayed inbox affordance, a list of electronic conversation objects (e.g., 614A-B) is displayed (e.g., a message inbox that displays different conversations).

At block 714, in response to receiving the user input associated with the landing screen and in accordance with a determination that the user input associated with the landing screen represents a touch associated the displayed compose affordance, an interface for composing a new electronic message is displayed (e.g., 616; a user interface for entering a recipient and message body for a new electronic message).

In accordance with some embodiments, the affordance representing the electronic message application (e.g., 604) includes an indication of a number of unread electronic messages (e.g., the icon includes the number of unread text/SMS or iMessage® messages) of the electronic message application.

In accordance with some embodiments, the affordance representing the electronic message application (e.g., 604) does not include an indication of a number of unread electronic messages (e.g., the icon does not include the number of unread text/SMS or iMessage® messages, such as when the number of unread text/SMS or iMessage® messages is zero) of the electronic message application.

In accordance with some embodiments, it is determined whether there are a number of unread messages associated with the electronic message application. In accordance with a determination that there is a number of unread messages associated with the electronic message application, the affordance representing the electronic message application (e.g., 604) is displayed with an indication that a number of unread messages are associated with the electronic message application. In accordance with a determination that there is not a number of unread messages associated with the electronic message application, the affordance representing the electronic message application (e.g., 604) is displayed without indication that there is a number of unread messages.

In accordance with some embodiments, user input representing a touch associated with an electronic conversation object (e.g., 614A, 614B) of the list of electronic conversation objects (e.g., 614A-B) is received. In response to receiving user input representing the touch associated with an electronic conversation object (e.g., 614A, 614B) of the list of electronic conversation objects (e.g., 614A-B), an electronic conversation (e.g., 618A-B) associated with the electronic conversation object is displayed.

In accordance with some embodiments, user input representing a touch associated with the electronic conversation (e.g., 618A-B) is received. For example, the touch may be a vertical swipe gesture in the up or down direction. In response to receiving the touch associated with electronic conversation, the device displays an animation of the messages (e.g., 618A, 618B) of the electronic conversation scrolling in the direction of the received touch (e.g., the messages scroll up if the vertical swipe gesture is in the up direction and the messages scroll down if the vertical swipe gesture is in the down direction). In some examples, the messages (e.g., 618A, 618B) scroll through a three-dimensional space. In some examples, as the messages are moving in the upward direction, when a top message (e.g., 618A) reaches a predetermined height, the top message (e.g., 618A) begins to move away from the viewing user in the z-plane of the three-dimensional space, in addition to moving upwards. When the top message reaches the predetermined height, the rate of the upward movement of the top message reduces. As the bottom message (e.g., 618B) continues upwards, the top edge of the bottom message overlaps the bottom edge of the top message (e.g., because the upward movement of the top message has slowed and the top message has moved back in the z-plane). In some examples, as the messages continue to scroll upwards, the top message disappears from the viewable screen by being partially outside of the viewable screen and partially hidden (overlapped) by the bottom message.

In accordance with some embodiments, user input representing a substantially horizontal swipe gesture (e.g., a swipe right gesture originating at a left bezel) on the electronic conversation (e.g., 618A-B) is received. In response to receiving user input representing the substantially horizontal swipe gesture (e.g., a swipe right gesture originating at a left bezel) on the electronic conversation, display of the electronic conversation (e.g., 618A-B) is replaced with the list of electronic conversation objects (e.g., 614A-B).

In accordance with some embodiments, the user input representing a substantially horizontal swipe gesture is a user input representing a substantially horizontal swipe gesture from a bezel of the electronic device (e.g., a swipe right gesture originating at a left bezel).

In accordance with some embodiments, the touch-sensitive surface (e.g., 112, 355, 504) is configured to detect intensity of touches. User input representing a touch on the electronic conversation (e.g., 618A-B) is received. It is determined whether a characteristic intensity of the touch on the electronic conversation is above an intensity threshold (e.g., a hard press; intensity may be measured based on pressure or determined based on the size of a touch). In response to receiving the user input representing the touch on the electronic conversation and in accordance with a determination that the characteristic intensity of the touch is above the intensity threshold (e.g., a deep press; intensity may be measured based on pressure or determined based on the size of a touch), a first set of one or more affordances (e.g., 620A-D) associated with the electronic conversation is displayed.

In accordance with some embodiments, displaying the first set of one or more affordances (e.g., 620A-D) associated with the electronic conversation comprises replacing display of the electronic conversation (e.g., 618A-B) with display of the first set of one or more affordances (e.g., 620A-D) associated with the electronic conversation.

In accordance with some embodiments, the first set of one or more affordances (e.g., 620A-D) associated with the electronic conversation includes one or more of: an affordance associated with replying to the electronic conversation (e.g., 620A), an affordance associated with marking the electronic conversation as unread (e.g., 620B), an affordance associated with opening the electronic conversation on a second device (e.g., 620C; opening on a phone, tablet, or computer), and a first affordance associated with a cancel action associated with the electronic conversation (e.g., 620D).

In accordance with some embodiments, the first set of one or more affordances (e.g., 620A-D) may further include one or more of: an affordance for starting a new conversation (e.g., the affordance for starting a new conversation, when activated, causes display of user interface screen 616) and an affordance for muting a conversation (e.g., the affordance, when activated, disables notifications related to new incoming messages in the conversation)

In accordance with some embodiments, user input representing a substantially upward swipe gesture (e.g., a swipe up gesture) associated with the electronic conversation (e.g., 618A-B) is received. In response to receiving user input representing the substantially upward swipe gesture (e.g., a swipe up gesture) associated with the electronic conversation, an affordance associated with replying to the electronic conversation (e.g., 636B) is displayed. Thus, when the device detects a swipe up gesture at the electronic conversation (e.g., 618A-B), an affordance (e.g., 636B) for replying to the conversation is displayed. In some embodiments, in response to receiving user input representing the substantially upward swipe gesture (e.g., a swipe up gesture) associated with the electronic conversation, an entry box is displayed for entering content.

In accordance with some embodiments, user input representing a touch associated with the first affordance associated with the cancel action (e.g., 620D) is received. In response to receiving user input representing the touch associated with the first affordance associated with the cancel action (e.g., 620D), display of the first set of one or more affordances (e.g., 620A-D) is replaced with display of the electronic conversation (e.g., 618A-B).

In accordance with some embodiments, user input representing a touch associated with the affordance associated with replying to the electronic conversation (e.g., 620A) is received. In response to receiving user input representing the touch associated with the affordance associated with replying to the electronic conversation (e.g., 620A), display of the first set of one or more affordances (e.g., 620A-D) is replaced with a second set of one or more affordances (e.g., 622A-D) associated with the electronic conversation.

In accordance with some embodiments, the second set of affordances (e.g., 622A-D) associated with the electronic conversation includes one or more of: an affordance associated with smart response (e.g., 622A), an affordance associated with emoji response (e.g., 622C), an affordance associated with dictation (e.g., 622B), and an affordance associated with keyboard (e.g., 622D).

In accordance with some embodiments, user input representing a touch associated with the affordance associated with smart response (e.g., 622A) is received. In response to receiving user input representing the touch associated with the affordance associated with smart response (e.g., 622A), display of the second set of one or more affordances (e.g., 622A-D) is replaced with display of one or more suggested responses (e.g., 638A-C; the device determines potential responses to the last received message in the conversation and presents the responses to the user as suggestions for selection).

In accordance with some embodiments, user input representing a touch associated with a first suggested response (e.g., 638C) of the one or more suggested responses (e.g., 638A-C) is received. In response to receiving user input representing the touch associated with the first suggested response (e.g., 638C), the first suggested response is transmitted (e.g., send the response to the recipient(s) using text entered by the user when the user activates the send affordance). The response information is transmitted to recipients, for example, (1) by direct wireless WiFi communication with a WiFi-enabled router, (2) by direct wireless cellular communication with a cellular base station, or (3) by using a companion device (such as a cellular telephone or laptop) as an intermediary and requesting that the companion device transmit the response information. The companion device also includes a user-accessible electronic message application and may be configured for accessing the electronic messages of the user of the electronic device.

In accordance with some embodiments, user input representing a touch associated with a first suggested response (e.g., 638C) of the one or more suggested responses (e.g., 638A-C) is received. In response to receiving user input representing the touch associated with the first suggested response (e.g., 638C), the first suggested response is added as response information for the electronic conversation.

In accordance with some embodiments, user input representing a touch associated with the affordance associated with emoji response (e.g., 622C) is received. In response to receiving user input representing the touch associated with the affordance associated with emoji response (e.g., 622C), display of the second set of one or more affordances (e.g., 622A-D) is replaced with display of an interactive graphical object (e.g. 658A; display a graphical object that can be altered prior to sending; the graphical object is the response information that will be sent to the recipient(s)).

In accordance with some embodiments, user input representing a touch associated with the affordance associated with dictation (e.g., 622B) is received. In response to receiving user input representing the touch associated with the affordance associated with dictation (e.g., 622B), display of the second set of one or more affordances (e.g., 622A-D) is replaced with display of a dictation interface (e.g. 644; enable a microphone of the electronic device and display a graphic waveform based on audio input received at the microphone; automatic speech recognition can happen at the device, at a remote device, or at a remote server).

In accordance with some embodiments, user input representing speech is received. In response to receiving user input representing speech, the user input representing speech is transcribed. Transcribing the speech can be done several ways, including: (1) locally, by the electronic device, (2) remotely, where the electronic device transmits (e.g., via WiFi or Bluetooth) the user input representing speech (or data that is based on the user input representing speech) to a companion device (e.g., a cellular phone or laptop), the companion device locally transcribes the user input, and the electronic device receives the transcribed speech from the companion device, (3) remotely, where the electronic device transmits (e.g., via WiFi or Bluetooth) the user input representing speech (or data that is based on the user input representing speech) to a server (e.g., a server connected over the Internet), the server transcribes the user input, and the electronic device receives the transcribed speech from the server (e.g., via WiFi or Bluetooth), or (4) remotely, where the electronic device transmits (e.g., via WiFi or Bluetooth) the user input representing speech (or data that is based on the user input representing speech) to a companion device (e.g., a cellular phone or laptop), the companion device transmits the user input to a server, the server transcribes the user input, the companion device receives the transcribed speech from the server, and the electronic device receives the transcribed speech from the companion device. In response to receiving user input representing speech, the transcribed speech is added as response information to the electronic conversation.

In accordance with some embodiments, user input representing a touch associated with the affordance associated with keyboard is received (e.g., 622D). In response to receiving user input representing the touch associated with the affordance associated with the keyboard (e.g., 622D), display of the second set of one or more affordances (e.g., 622A-D) is replaced with display of one or more keys of a keyboard (e.g. 650; display a keyboard that allows user input to enter a reply; the reply is the response information that will be sent to the recipient(s)).

In accordance with some embodiments, it is determined whether the electronic conversation includes response information. In response to determining that the electronic conversation includes response information, an affordance associated with sending the response information (e.g., 646C, 652C) is displayed (e.g., once the user has entered a response into the response field, the send affordance becomes enabled and is no longer grayed out).

In accordance with some embodiments, user input representing a touch associated with the affordance associated with sending the response information (e.g., 646C, 652C) is received. In response to receiving user input representing the touch associated with the affordance associated with sending the response information, the response information is transmitted (e.g., send the response to the recipient(s) using text entered by the user when the user activates the send affordance). The response information is transmitted to recipients, for example, (1) by direct wireless WiFi communication with a WiFi-enabled router, (2) by direct wireless cellular communication with a cellular base station, or (3) by using a companion device (such as a cellular telephone or laptop) as an intermediary and requesting that the companion device transmit the response information. The companion device also includes a user-accessible electronic message application and may be configured for accessing the electronic messages of the user of the electronic device.

In accordance with some embodiments, user input representing a touch associated with the affordance associated with marking the electronic conversation as unread (e.g., 620B) is received. In response to receiving user input representing the touch associated with the affordance associated with marking the electronic conversation as unread (e.g., 620B), display of the first set of one or more affordances (e.g., 620A-D) is replaced with display of the list of electronic conversation objects (e.g., 634A-D), including an unread indicator (e.g., 634C; display the conversation with a circle to indicate the conversation is unread).

In accordance with some embodiments, user input representing a touch associated with the affordance associated with opening the electronic conversation on a second device (e.g., 620C; open on a phone, tablet, or computer) is received. In response to receiving user input representing the touch associated with the affordance associated with opening the electronic conversation on a second device (e.g., 620C), the electronic conversation (e.g., 618A-B) is caused to be displayed on a linked companion device (e.g., displaying the conversation on a phone, tablet, or laptop that has been linked to the electronic device).

In accordance with some embodiments, user input representing a substantially downward swipe gesture (e.g., a swipe down gesture) associated with the list of electronic conversation objects (e.g., 674A-B; the inbox) is received. In response to receiving user input representing the substantially downward swipe gesture (e.g., a swipe down gesture) associated with the list of electronic conversation objects (e.g., 674A-B; the inbox), an affordance associated with composing a new electronic message (e.g., 676A) is displayed. Thus, when the device detects a swipe down gesture at the list of electronic conversation objects, an affordance for co In accordance with some embodiments, user input representing a touch associated with the affordance associated with composing a new electronic message (e.g., 676A) is received. In response to receiving the user input associated with the affordance associated with composing a new electronic message (e.g., 676A), the interface for composing a new electronic message (e.g., 616) is displayed (e.g., a user interface for entering message recipient and body).

In accordance with some embodiments, the interface for composing the new electronic message (e.g., 616) comprises one or more of: an affordance associated with adding recipient information to the new electronic message (e.g., 616A) and an affordance associated with adding response information to the new electronic message (e.g., 616B).

In accordance with some embodiments, user input representing a touch associated with the affordance associated with adding recipient information to the new electronic message (e.g., 616A) is received. In response to receiving user input representing the touch associated with the affordance associated with adding recipient information to the new electronic message (e.g., 616A), display of the interface for composing the new electronic message (e.g., 616) is replaced with display of a third set of one or more affordances (e.g., 624A-C) associated with the new electronic message (e.g. for selecting recipient using a recent, dictation, or keyboard affordance).

In accordance with some embodiments, the third set of one or more affordances (e.g., 624A-C) associated with the new electronic message includes one or more of: an affordance associated with recent contacts (e.g., 624A), an affordance associated with dictation (e.g., 624B), and an affordance associated with keyboard (e.g., 624C).

In accordance with some embodiments, user input representing a touch associated with the affordance associated with recent contacts (e.g., 624A) is received. In response to receiving user input representing the touch associated with the affordance associated with recent contacts (e.g., 624A), display of the third set of one or more affordances (e.g., 624A-C) is replaced with display of one or more recent contact affordances (e.g., 626A-C). For example, displaying a list of contacts recently contacted (incoming or outgoing) and receiving a selection of a contact to use as a recipient of the new message.

In accordance with some embodiments, user input representing a touch associated with a recent contact affordance (e.g., 626B) of the one or more recent contact affordances (e.g., 626A-C) is received. The recent contact affordance (e.g., 626B) is associated with contact information (e.g., a phone number, email address, or username). In response to receiving user input representing the touch associated with the recent contact affordance (e.g., 626B), the contact information is added as recipient information to the new electronic message (e.g., use the default contact method as the recipient information for the new electronic message).

In accordance with some embodiments, user input representing a touch associated with the affordance associated with dictation is received (e.g., 624B). In response to receiving user input representing the touch associated with the affordance associated with dictation (e.g., 624B), display of the third set of one or more affordances (e.g., 624A-C) is replaced with display of a dictation interface (e.g. 628; enable a microphone of the electronic device and display a graphic waveform based on audio input received at the microphone).

In accordance with some embodiments, user input representing recipient speech is received. In response to receiving user input representing recipient speech, the user input representing recipient speech is transcribed. Transcribing the speech can be done several ways, including: (1) locally, by the electronic device, (2) remotely, where the electronic device transmits (e.g., via WiFi or Bluetooth) the user input representing speech (or data that is based on the user input representing speech) to a companion device (e.g., a cellular phone or laptop), the companion device locally transcribes the user input, and the electronic device receives the transcribed speech from the companion device, (3) remotely, where the electronic device transmits (e.g., via WiFi or Bluetooth) the user input representing speech (or data that is based on the user input representing speech) to a server (e.g., a server connected over the Internet), the server transcribes the user input, and the electronic device receives the transcribed speech from the server (e.g., via WiFi or Bluetooth), or (4) remotely, where the electronic device transmits (e.g., via WiFi or Bluetooth) the user input representing speech (or data that is based on the user input representing speech) to a companion device (e.g., a cellular phone or laptop), the companion device transmits the user input to a server, the server transcribes the user input, the companion device receives the transcribed speech from the server, and the electronic device receives the transcribed speech from the companion device. In response to receiving user input representing recipient speech, the transcribed recipient speech is added as recipient information to the new electronic message.

In accordance with some embodiments, user input representing a touch associated with the affordance associated with keyboard (e.g., 624C) is received. In response to receiving user input representing the touch associated with the affordance associated with keyboard (e.g., 624C), display of the third set of one or more affordances (e.g., 624A-C) is replaced with display of one or more keys of a keyboard (e.g. 630; display a keyboard that allows the user input to enter recipient information).

In accordance with some embodiments, user input representing keyboard input using the one or more keys of the keyboard (e.g., 630) is received. The user input representing keyboard input associated with contact information (e.g., the user enters an email address, phone number, or a name linked to an email address or phone number using the keyboard). In response to receiving user input representing the keyboard input, the contact information (e.g., a phone number, email address, or username) is added as recipient information to the new electronic message.

In accordance with some embodiments, data representing a touch associated with the affordance associated with adding response information to the new electronic message (e.g., 632B; 616B) is received. In response to receiving data representing the touch associated with the affordance associated with adding response information to the new electronic message (e.g., 632B; 616B), display of the interface for composing the new electronic message (e.g., 632; 616) is replaced with display of a fourth set of one or more affordances (e.g., 662A-C) associated with the new electronic message (e.g. for selecting recipient using a recent, dictation, or keyboard affordance).

In accordance with some embodiments, the fourth set of affordances (e.g., 662A-C) associated with the electronic message includes one or more of: an affordance associated with emoji response (e.g., 662A), an affordance associated with dictation (e.g., 662B), and an affordance associated with keyboard (e.g., 662C).

In accordance with some embodiments, user input representing a touch associated with the affordance associated with emoji response (e.g., 662A) is received. In response to receiving user input representing the touch associated with the affordance associated with emoji response (e.g., 662A), display of the fourth set of one or more affordances (e.g., 662A-C) is replaced with display of an interactive graphical object (e.g. 666A; display a graphical object that can be altered prior to sending; the graphical object is the response information that will be sent to the recipient(s)).

In accordance with some embodiments, user input representing a touch associated with the affordance associated with dictation (e.g., 662B) is received. In response to receiving user input representing the touch associated with the affordance associated with dictation (e.g., 662B), display of the fourth set of one or more affordances (e.g., 662A-C) is replaced with display of a dictation interface (e.g. 664; enable a microphone of the electronic device and display a graphic waveform based on audio input received at the microphone; automatic speech recognition can happen at the device, at a remote device, or at a remote server).

In accordance with some embodiments, user input representing speech is received. In response to receiving user input representing speech, the user input representing speech is transcribed. Transcribing the speech can be done several ways, including: (1) locally, by the electronic device, (2) remotely, where the electronic device transmits (e.g., via WiFi or Bluetooth) the user input representing speech (or data that is based on the user input representing speech) to a companion device (e.g., a cellular phone or laptop), the companion device locally transcribes the user input, and the electronic device receives the transcribed speech from the companion device, (3) remotely, where the electronic device transmits (e.g., via WiFi or Bluetooth) the user input representing speech (or data that is based on the user input representing speech) to a server (e.g., a server connected over the Internet), the server transcribes the user input, and the electronic device receives the transcribed speech from the server (e.g., via WiFi or Bluetooth), or (4) remotely, where the electronic device transmits (e.g., via WiFi or Bluetooth) the user input representing speech (or data that is based on the user input representing speech) to a companion device (e.g., a cellular phone or laptop), the companion device transmits the user input to a server, the server transcribes the user input, the companion device receives the transcribed speech from the server, and the electronic device receives the transcribed speech from the companion device. In response to receiving user input representing speech, the transcribed speech is added as response information to the new electronic message.

In accordance with some embodiments, user input representing a touch associated with the affordance associated with keyboard (e.g., 662C) is received. In response to receiving user input representing the touch associated with the affordance associated with the keyboard (e.g., 662C), display of the fourth set of one or more affordances (e.g., 662A-C) is replaced with display of one or more keys of a keyboard (e.g. 668; display a keyboard that allows user input to enter a response; the response is the response information that will be sent to the recipient(s)).

In accordance with some embodiments, it is determined whether the new electronic message includes recipient information and response information. In response to determining that the new electronic message includes recipient information and response information, an affordance associated with sending the new electronic message (e.g., 670A) is displayed (e.g., once the user has entered a recipient and a response, the send affordance becomes enabled and is no longer grayed out).

In accordance with some embodiments, user input representing a touch associated with the affordance associated with sending the new electronic message (e.g., 670A) is received. In response to receiving user input representing the touch associated with the affordance associated with sending the new electronic message (e.g., 670A), the electronic message is transmitted (e.g., send the message to the recipient(s) using text entered by the user when the user presses the send affordance). The response information is transmitted to recipients, for example, (1) by direct wireless WiFi communication with a WiFi-enabled router, (2) by direct wireless cellular communication with a cellular base station, or (3) by using a companion device (such as a cellular telephone or laptop) as an intermediary and requesting that the companion device transmit the response information. The companion device also includes a user-accessible electronic message application and may be configured for accessing the electronic messages of the user of the electronic device.

In accordance with some embodiments, user input representing a substantially horizontal swipe gesture (e.g., a swipe left gesture) associated with an electronic conversation object (e.g., 614A) of the list of electronic conversation objects (e.g., 614A-B) is received. In some embodiments, the swipe gesture originates at a bezel of the device. In response to receiving user input representing the substantially horizontal swipe gesture (e.g., a swipe left gesture) associated with the electronic conversation object (e.g., 614A) of the list of electronic conversation objects (e.g., 614A-B), it is determined whether the user input representing the substantially horizontal swipe gesture (e.g., a swipe left gesture) associated with the electronic conversation object (e.g., 614A) indicates the swipe gesture exceeds a first threshold (e.g., a partial swipe across the electronic conversation object) or exceeds a second threshold (e.g., a full or 75% swipe across the electronic conversation object).

In response to receiving user input representing the substantially horizontal swipe gesture (e.g., a swipe left gesture) associated with the electronic conversation object (e.g., 614A) and in accordance with a determination that the user input indicates the substantially horizontal swipe gesture (e.g., a swipe left gesture) associated with the electronic conversation object exceeds the first threshold and does not exceed the second threshold, an affordance for deleting an electronic conversation associated with the electronic conversation object (e.g., 614A) is displayed (e.g., the device displays an affordance for deleting the electronic conversation when the user performs a swipe left gesture across a small portion of the screen). In response to the user tapping on the affordance for deleting the electronic conversation, the electronic conversation and the electronic conversation object are deleted.

In response to receiving user input representing the substantially horizontal swipe gesture (e.g., a swipe left gesture) associated with the electronic conversation object (e.g., 614A) and in accordance with a determination that the user input indicates the substantially horizontal swipe gesture (e.g., a swipe left gesture) associated with the electronic conversation object exceeds the second threshold, the electronic conversation associated with the electronic conversation object is deleted (e.g., the device deletes the conversation and removes the conversation object without requiring additional confirmation from the user when the user performs a swipe left gesture across a large portion of the screen).

In accordance with some embodiments, user input representing a substantially horizontal swipe gesture (e.g., a swipe left gesture) associated with an electronic conversation object (e.g., 614A) of the list of electronic conversation objects (e.g., 614A-B) is received. It is determined whether the user input representing the substantially horizontal swipe gesture (e.g., a swipe left gesture) associated with the electronic conversation object (e.g., 614A) indicates the swipe gesture exceeds a first threshold (e.g., a partial swipe across the electronic conversation object) or exceeds a second threshold (e.g., a full or 75% swipe across the electronic conversation object).

In response to receiving user input representing the substantially horizontal swipe gesture (e.g., a swipe left gesture) associated with the electronic conversation object (e.g., 614A) and in accordance with a determination that the user input indicates the substantially horizontal swipe gesture (e.g., a swipe left gesture) associated with the electronic conversation object exceeds the first threshold and does not exceed the second threshold, an affordance for muting the electronic conversation associated with the electronic conversation object (e.g., 614A) is displayed (e.g., activating the mute affordance mutes the conversation by preventing/limiting notifications, as discussed in detail above).

In response to receiving user input representing the substantially horizontal swipe gesture (e.g., a swipe left gesture) associated with the electronic conversation object (e.g., 614A) and in accordance with a determination that the user input indicates the substantially horizontal swipe gesture (e.g., a swipe left gesture) associated with the electronic conversation object (e.g., 614A) exceeds the second threshold, an affordance for deleting an electronic conversation associated with the electronic conversation object (e.g., 614A) is displayed. In response to the user tapping on the delete affordance, the conversation associated with the delete affordance is deleted.

Note that details of the processes described above with respect to method 700 (FIG. 7) are also applicable in an analogous manner to the methods described below. For example, method 800 (FIG. 8) may include one or more of the characteristics of the various methods described above with reference to method 700. For brevity, these details are not repeated below.

It should be understood that the particular order in which the operations in FIG. 7 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of method 700 (FIG. 7) and method 800 (FIG. 8) may be incorporated with one another. Thus, the techniques described with respect to method 700 may be relevant to method 800.

FIG. 8 is a flow diagram illustrating process 800 for accessing, composing, and manipulating electronic messages in accordance with some embodiments. In some embodiments, method 800 may be performed at an electronic device with a display (e.g., 112, 340, 504), a touch-sensitive surface (e.g., 112, 355, 504), and a rotatable input mechanism (e.g., 506). Some operations in method 800 may be combined, the order of some operations may be changed, and some operations may be omitted.

In some embodiments, process 800 may be performed at a touch-sensitive surface is capable of detecting intensity of touch contacts. Exemplary devices that may perform process 800 include devices 100, 300, and 500 (FIGS. 1, 3, and 5).

At block 802, an affordance (e.g., 604) representing an electronic message application is displayed (e.g., an icon among a plurality of icons).

At block 804, user input representing movement of the rotatable input mechanism is received (e.g., user starts the messages app by rotating the rotatable input mechanism). In some embodiments, the user input received represents a detected contact on the touch-sensitive surface (e.g., 112, 355, 504) corresponding to the affordance representing the electronic messages application (e.g., the user taps on the affordance 604 to start the electronic messages application).

At block 806, in response to receiving the user input representing the movement of the rotatable input mechanism, a landing screen (e.g., 608; the screen displayed when the application starts or the screen the application reaches after initialization) of the electronic message application is displayed. The landing screen (e.g., 608) includes display of an inbox affordance (e.g., 610) and a compose affordance (e.g., 612). In some examples, the inbox affordance (e.g., 610) and a compose affordance (e.g., 612) are displayed concurrently.

At block 808, user input associated with the landing screen (e.g., 608) is received. For example, the user activates the inbox affordance (e.g., 610) or the compose affordance (e.g., 612). Generally, displayed items are associated with user inputs in a contextual manner, such as the user input being received at a location on the touch-sensitive surface (e.g., 112, 355, 504) that corresponds to the location of the displayed item on the display to activate the displayed item.

At block 810, it is determined whether the user input associated with the landing screen represents a touch associated with the displayed inbox affordance or a touch associated with the displayed compose affordance.

At block 812, in response to receiving the user input associated with the landing screen and in accordance with a determination that the user input associated with the landing screen represents a touch associated with the displayed inbox affordance, a list of electronic conversation objects (e.g., 614A-B) is displayed (e.g., a message inbox that displays different conversations).

At block 814, in response to receiving the user input associated with the landing screen and in accordance with a determination that the user input associated with the landing screen represents a touch associated the displayed compose affordance, an interface for composing a new electronic message is displayed (e.g., 616; a user interface for entering a recipient and message body for a new electronic message).

Figure 9:
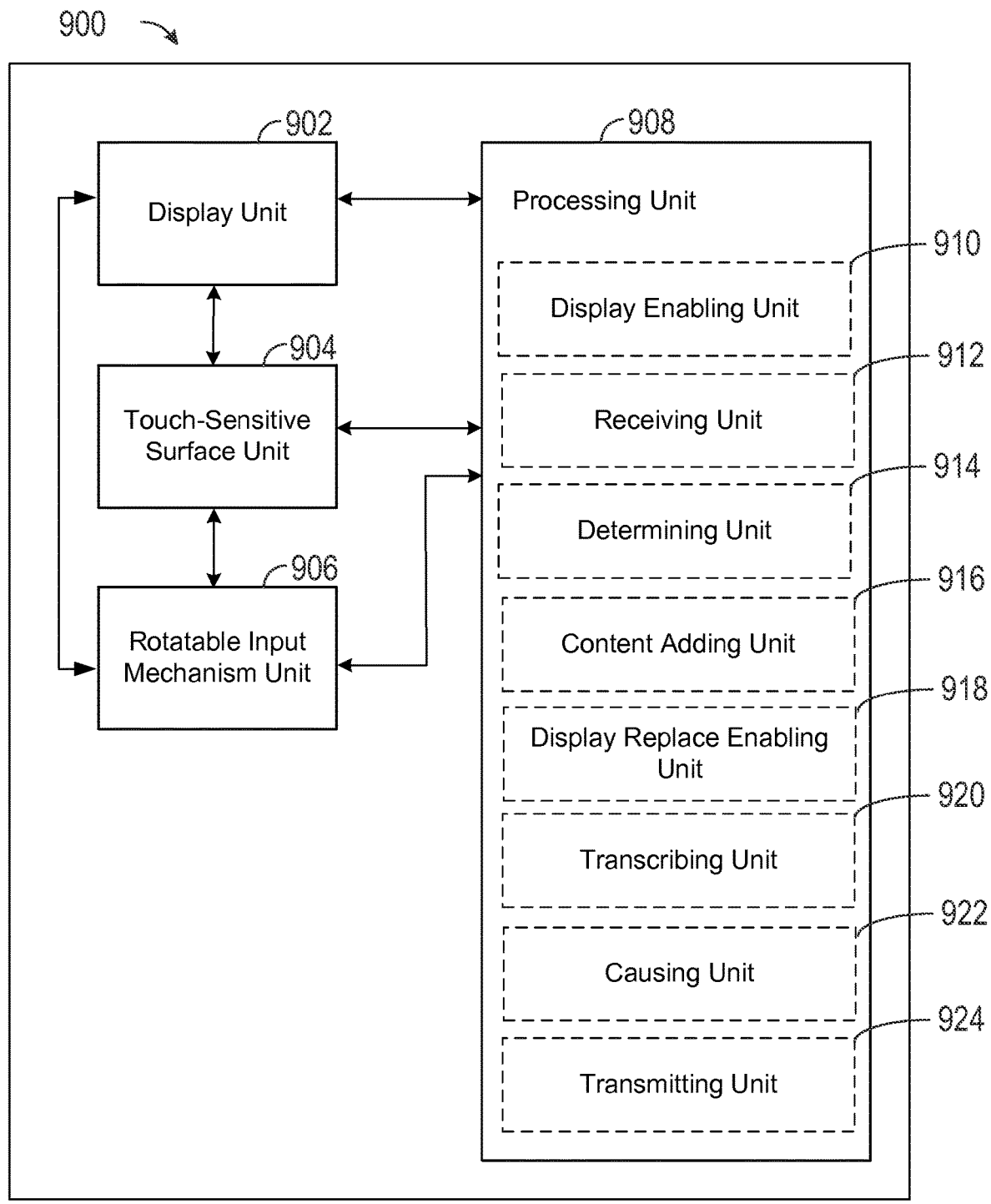
FIG. 9 illustrates a functional block diagram in accordance with some embodiments.

In accordance with some embodiments, FIG. 9 shows an exemplary functional block diagram of an electronic device 900 configured in accordance with the principles of the various described embodiments. In accordance with some embodiments, the functional blocks of electronic device 900 are configured to perform the techniques described above. The functional blocks of the device 900 are, optionally, implemented by hardware, software, or a combination of hardware and software to carry out the principles of the various described examples. It is understood by persons of skill in the art that the functional blocks described in FIG. 9 are, optionally, combined or separated into sub-blocks to implement the principles of the various described examples. Therefore, the description herein optionally supports any possible combination or separation or further definition of the functional blocks described herein.

As shown in FIG. 9, an electronic device 900 includes a display unit 902 configured to display a graphic user interface, a touch-sensitive surface unit 904 configured to receive contacts, a rotatable input mechanism unit 906 configured to receive user input, and a processing unit 908 coupled to the display unit 902, the touch-sensitive surface unit 904, and the rotatable input mechanism unit 906. In some embodiments, the processing unit 908 includes a display enabling unit 910, a receiving unit 912, a determining unit 914, a content adding unit 916, a display replace enabling unit 918, a transcribing unit 920, a causing unit 922, and a transmitting unit 924.

The processing unit 908 is configured to display (e.g., using display enabling unit 910), on the display unit 902, an affordance representing an electronic message application; receive (e.g., using receiving unit 912) user input representing movement of the rotatable input mechanism unit; and in response to receiving the user input representing the movement of the rotatable input mechanism unit, display (e.g. using display enabling unit 910) a landing screen of the electronic message application, wherein the landing screen includes display of an inbox affordance and a compose affordance. The processing unit 908 is further configured to receive (e.g., using receiving unit 912) user input associated with the landing screen. The processing unit 908 is further configured to determine (e.g., using determining unit 914) whether the user input associated with the landing screen represents a touch associated with the displayed inbox affordance or a touch associated with the displayed compose affordance. The processing unit 908 is further configured to, in response to receiving the user input associated with the landing screen and in accordance with a determination that the user input associated with the landing screen represents a touch associated with the displayed inbox affordance, display (e.g. using display enabling unit 910), on the display unit 902, a list of electronic conversation objects. The processing unit 908 is further configured to, in response to receiving the user input associated with the landing screen and in accordance with a determination that the user input associated with the landing screen represents a touch associated the displayed compose affordance, display (e.g. using display enabling unit 910), on the display unit 902, an interface for composing a new electronic message.

In some embodiments, the affordance representing the electronic message application includes an indication of a number of unread electronic messages of the electronic message application. In some embodiments, the affordance representing the electronic message application does not include an indication of a number of unread electronic messages of the electronic message application.

In some embodiments, the processing unit 908 is further configured to determine (e.g., using determining unit 914) whether there are a number of unread messages associated with the electronic message application. The processing unit 908 is further configured to, in accordance with a determination that there is a number of unread messages associated with the electronic message application, display (e.g. using display enabling unit 910) the affordance representing the electronic message application with an indication that a number of unread messages are associated with the electronic message application. The processing unit 908 is further configured to, in accordance with a determination that there is not a number of unread messages associated with the electronic message application, display (e.g. using display enabling unit 910) the affordance representing the electronic message application without indication that there is a number of unread messages.

In some embodiments, the processing unit 908 is further configured to receive (e.g., using receiving unit 912) user input representing a touch associated with an electronic conversation object of the list of electronic conversation objects, and, in response to receiving user input representing the touch associated with an electronic conversation object of the list of electronic conversation objects, display (e.g. using display enabling unit 910), on the display unit 902, an electronic conversation associated with the electronic conversation object.

In some embodiments, the processing unit 908 is further configured to receive (e.g., using receiving unit 912) user input representing a substantially horizontal swipe gesture on the electronic conversation, and, in response to receiving user input representing the substantially horizontal swipe gesture on the electronic conversation, replace display (e.g., using display replace enabling unit 918) of the electronic conversation with the list of electronic conversation objects.

In some embodiments, the user input representing a substantially horizontal swipe gesture is a user input representing a substantially horizontal swipe gesture from a bezel of the electronic device.

In some embodiments, the touch-sensitive surface unit 904 is configured to detect intensity of touches. The processing unit 908 is further configured to receive (e.g., using receiving unit 912) user input representing a touch on the electronic conversation. The processing unit 908 is further configured to determine (e.g., using determining unit 914) whether a characteristic intensity of the touch on the electronic conversation is above an intensity threshold, and, in response to receiving the user input representing the touch on the electronic conversation and in accordance with a determination that the characteristic intensity of the touch is above the intensity threshold, display (e.g. using display enabling unit 910), on the display unit 902, a first set of one or more affordances associated with the electronic conversation.

In some embodiments, displaying the first set of one or more affordances associated with the electronic conversation comprises replacing display of the electronic conversation with display of the first set of one or more affordances associated with the electronic conversation.

In some embodiments, the first set of one or more affordances associated with the electronic conversation includes one or more of: an affordance associated with replying to the electronic conversation, an affordance associated with marking the electronic conversation as unread, an affordance associated with opening the electronic conversation on a second device, and a first affordance associated with a cancel action associated with the electronic conversation.

In some embodiments, the processing unit 908 is further configured to receive (e.g., using receiving unit 912) user input representing a substantially upward swipe gesture associated with the electronic conversation, and, in response to receiving user input representing the substantially upward swipe gesture associated with the electronic conversation, display (e.g. using display enabling unit 910) an affordance associated with replying to the electronic conversation.

In some embodiments, the processing unit 908 is further configured to receive (e.g., using receiving unit 912) user input representing a touch associated with the first affordance associated with the cancel action, and, in response to receiving user input representing the touch associated with the first affordance associated with the cancel action, replace display (e.g., using display replace enabling unit 918) of the first set of one or more affordances with display of the electronic conversation.

In some embodiments, the processing unit 908 is further configured to receive (e.g., using receiving unit 912) user input representing a touch associated with the affordance associated with replying to the electronic conversation, and, in response to receiving user input representing the touch associated with the affordance associated with replying to the electronic conversation, replace display (e.g., using display replace enabling unit 918) of the first set of one or more affordances with a second set of one or more affordances associated with the electronic conversation.

In some embodiments, the second set of affordances associated with the electronic conversation includes one or more of: an affordance associated with smart response, an affordance associated with emoji response, an affordance associated with dictation, and an affordance associated with keyboard.

In some embodiments, the processing unit 908 is further configured to receive (e.g., using receiving unit 912) user input representing a touch associated with the affordance associated with smart response, and, in response to receiving user input representing the touch associated with the affordance associated with smart response, replace display (e.g., using display replace enabling unit 918) of the second set of one or more affordances with display of one or more suggested responses.

In some embodiments, the processing unit 908 is further configured to receive (e.g., using receiving unit 912) user input representing a touch associated with a first suggested response of the one or more suggested responses, and, in response to receiving user input representing the touch associated with the first suggested response, transmit (e.g., using transmitting unit 924) the first suggested response.

In some embodiments, the processing unit 908 is further configured to receive (e.g., using receiving unit 912) user input representing a touch associated with a first suggested response of the one or more suggested responses, and, in response to receiving user input representing the touch associated with the first suggested response, add (e.g., using content adding unit 916) the first suggested response as response information for the electronic conversation.

In some embodiments, the processing unit 908 is further configured to receive (e.g., using receiving unit 912) user input representing a touch associated with the affordance associated with emoji response, and, in response to receiving user input representing the touch associated with the affordance associated with emoji response, replace display (e.g., using display replace enabling unit 918) of the second set of one or more affordances with display of an interactive graphical object.

In some embodiments, the processing unit 908 is further configured to receive (e.g., using receiving unit 912) user input representing a touch associated with the affordance associated with dictation, and, in response to receiving user input representing the touch associated with the affordance associated with dictation, replace display (e.g., using display replace enabling unit 918) of the second set of one or more affordances with display of a dictation interface.

In some embodiments, the processing unit 908 is further configured to receive (e.g., using receiving unit 912 and/or a microphone unit) user input representing speech, and, in response to receiving user input representing speech: transcribe (e.g., using transcribing unit 920) the user input representing speech, and add (e.g., using content adding unit 916) the transcribed speech as response information for the electronic conversation.

In some embodiments, the processing unit 908 is further configured to receive (e.g., using receiving unit 912) user input representing a touch associated with the affordance associated with keyboard, and, in response to receiving user input representing the touch associated with the affordance associated with the keyboard, replace display (e.g., using display replace enabling unit 918) of the second set of one or more affordances with display of one or more keys of a keyboard.

In some embodiments, the processing unit 908 is further configured to determine (e.g., using determining unit 914) whether the electronic conversation includes response information, and. in response to determining that the electronic conversation includes response information, display (e.g. using display enabling unit 910) an affordance associated with sending the response information.

In some embodiments, the processing unit 908 is further configured to receive (e.g., using receiving unit 912) user input representing a touch associated with the affordance associated with sending the response information, and, in response to receiving user input representing the touch associated with the affordance associated with sending the response information, transmit (e.g., using transmitting unit 924) the response information.

In some embodiments, the processing unit 908 is further configured to receive (e.g., using receiving unit 912) user input representing a touch associated with the affordance associated with marking the electronic conversation as unread, and, in response to receiving user input representing the touch associated with the affordance associated with marking the electronic conversation as unread, replace display (e.g., using display replace enabling unit 918) of the first set of one or more affordances with display of the list of electronic conversation objects, including an unread indicator.

In some embodiments, the processing unit 908 is further configured to receive (e.g., using receiving unit 912) user input representing a touch associated with the affordance associated with opening the electronic conversation on a second device, and, in response to receiving user input representing the touch associated with the affordance associated with opening the electronic conversation on a second device, cause (e.g., using causing unit 922) the electronic conversation to be displayed on a linked companion device.

In some embodiments, the processing unit 908 is further configured to receive (e.g., using receiving unit 912) user input representing a substantially downward swipe gesture associated with the list of electronic conversation objects, and in response to receiving user input representing the substantially downward swipe gesture associated with the list of electronic conversation objects, display (e.g. using display enabling unit 910) an affordance associated with composing a new electronic message.

In some embodiments, the processing unit 908 is further configured to receive (e.g., using receiving unit 912) user input representing a touch associated with the affordance associated with composing a new electronic message, and in response to receiving the user input associated with the affordance associated with composing a new electronic message, display (e.g. using display enabling unit 910), on the display unit 902, the interface for composing a new electronic message.

In some embodiments, the interface for composing the new electronic message comprises one or more of: an affordance associated with adding recipient information to the new electronic message, and an affordance associated with adding response information to the new electronic message.

In some embodiments, the processing unit 908 is further configured to receive (e.g., using receiving unit 912) user input representing a touch associated with the affordance associated with adding recipient information to the new electronic message, and in response to receiving user input representing the touch associated with the affordance associated with adding recipient information to the new electronic message, replace display (e.g., using display replace enabling unit 918) of the interface for composing the new electronic message with display of a third set of one or more affordances associated with the new electronic message.

In some embodiments, the third set of one or more affordances associated with the new electronic message includes one or more of: an affordance associated with recent contacts, an affordance associated with dictation, and an affordance associated with keyboard.

In some embodiments, the processing unit 908 is further configured to receive (e.g., using receiving unit 912) user input representing a touch associated with the affordance associated with recent contacts, and in response to receiving user input representing the touch associated with the affordance associated with recent contacts, replace display (e.g., using display replace enabling unit 918) of the third set of one or more affordances with display of one or more recent contact affordances.

In some embodiments, the processing unit 908 is further configured to receive (e.g., using receiving unit 912) user input representing a touch associated with a recent contact affordance of the one or more recent contact affordances, the recent contact affordance associated with contact information, and, in response to receiving user input representing the touch associated with the recent contact affordance, add (e.g., using content adding unit 916) the contact information as recipient information to the new electronic message.

In some embodiments, the processing unit 908 is further configured to receive (e.g., using receiving unit 912) user input representing a touch associated with the affordance associated with dictation, and in response to receiving user input representing the touch associated with the affordance associated with dictation, replace display (e.g., using display replace enabling unit 918) of the third set of one or more affordances with display of a dictation interface.

In some embodiments, the processing unit 908 is further configured to receive (e.g., using receiving unit 912 and/or a microphone unit) user input representing recipient speech, and in response to receiving user input representing recipient speech: transcribe (e.g., using transcribing unit 920) the user input representing recipient speech, and add (e.g., using content adding unit 916) the transcribed recipient speech as recipient information to the new electronic message.

In some embodiments, the processing unit 908 is further configured to receive (e.g., using receiving unit 912) user input representing a touch associated with the affordance associated with keyboard, and in response to receiving user input representing the touch associated with the affordance associated with keyboard, replace display (e.g., using display replace enabling unit 918) of the third set of one or more affordances with display of one or more keys of a keyboard.

In some embodiments, the processing unit 908 is further configured to receive (e.g., using receiving unit 912) user input representing keyboard input using the one or more keys of the keyboard, the user input representing keyboard input associated with contact information, and, in response to receiving user input representing the keyboard input, add (e.g., using content adding unit 916) the contact information as recipient information to the new electronic message.

In some embodiments, the processing unit 908 is further configured to receive (e.g., using receiving unit 912) user input representing a touch associated with the affordance associated with adding response information to the new electronic message, and, in response to receiving user input representing the touch associated with the affordance associated with adding response information to the new electronic message, replace display (e.g., using display replace enabling unit 918) of the interface for composing the new electronic message with display of a fourth set of one or more affordances associated with the new electronic message.

In some embodiments, the fourth set of affordances associated with the electronic message includes one or more of:

an affordance associated with emoji response, an affordance associated with dictation, and an affordance associated with keyboard.

In some embodiments, the processing unit 908 is further configured to receive (e.g., using receiving unit 912) user input representing a touch associated with the affordance associated with emoji response, and in response to receiving user input representing the touch associated with the affordance associated with emoji response, replace display (e.g., using display replace enabling unit 918) of the fourth set of one or more affordances with display of an interactive graphical object.

In some embodiments, the processing unit 908 is further configured to receive (e.g., using receiving unit 912) user input representing a touch associated with the affordance associated with dictation, and in response to receiving user input representing the touch associated with the affordance associated with dictation, replace display (e.g., using display replace enabling unit 918) of the fourth set of one or more affordances with display of a dictation interface.

In some embodiments, the processing unit 908 is further configured to receive (e.g., using receiving unit 912 and/or a microphone unit) user input representing speech, and, in response to receiving user input representing speech: transcribe (e.g., using transcribing unit 920) the user input representing speech, and add (e.g., using content adding unit 916) the transcribed speech as response information for the new electronic message.

In some embodiments, the processing unit 908 is further configured to receive (e.g., using receiving unit 912) user input representing a touch associated with the affordance associated with keyboard, and, in response to receiving user input representing the touch associated with the affordance associated with the keyboard, replace display (e.g., using display replace enabling unit 918) of the fourth set of one or more affordances with display of one or more keys of a keyboard.

In some embodiments, the processing unit 908 is further configured to determine (e.g., using determining unit 914) whether the new electronic message includes recipient information and response information, and, in response to determining that the new electronic message includes recipient information and response information, display (e.g., using display enabling unit 910) an affordance associated with sending the new electronic message.

In some embodiments, the processing unit 908 is further configured to receive (e.g., using receiving unit 912) user input representing a touch associated with the affordance associated with sending the new electronic message, and, in response to receiving user input representing the touch associated with the affordance associated with sending the new electronic message, transmit (e.g., using transmitting unit 924) the electronic message.

The operations described above with reference to FIGS. 7 and 8 are, optionally, implemented by components depicted in FIGS. 1A-1B or FIG. 9. For example, displaying operation 702, receiving operation 704, and determining operation 710 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A non-transitory computer readable storage medium storing one or more programs, the one or more programs comprising instructions, which when executed by one or more processors of an electronic device with a rotatable input mechanism, a display, and a touch-sensitive surface configured to detect intensity of touches, cause the electronic device to:
    display, on the display, an affordance representing an electronic message application;
    receive user input activating the affordance representing the electronic message application;
    display, on the display, a list of electronic conversation objects;
    receive user input activating an electronic conversation object of the list of electronic conversation objects;
    in response to detecting the user input activating the electronic conversation object, display one or more messages in an electronic conversation corresponding to the activated electronic conversation object;
    while displaying the electronic conversation, receive user input;
    in accordance with a determination that the user input is a rotation of the rotatable input mechanism:
        determine one or more suggested responses to the electronic conversation object; and
        display a set of one or more affordances corresponding to the one or more suggested responses;
    in accordance with a determination that the user input is a swipe input on the electronic conversation, display the set of one or more affordances corresponding to the one or more suggested responses;
    in accordance with a determination that the user input is a touch on the electronic conversation:
        in accordance with a determination that a characteristic intensity of the touch is above an intensity threshold, replace display of the electronic conversation with a first set of one or more affordances associated with the electronic conversation, wherein the first set of one or more affordances associated with the electronic conversation includes an affordance associated with replying to the electronic conversation; and in accordance with a determination that the characteristic intensity of the touch is not above the intensity threshold, forgo replacing display of the electronic conversation with the first set of one or more affordances associated with the electronic conversation.

2. The non-transitory computer readable storage medium of claim 1, further comprising instructions which when executed by the one or more processors of the electronic device, cause the device to:

determine whether there are a number of unread messages associated with the electronic message application;

in accordance with a determination that there is a number of unread messages associated with the electronic message application, display the affordance representing the electronic message application with an indication that a number of unread messages are associated with the electronic message application; and in accordance with a determination that there is not a number of unread messages associated with the electronic message application, display the affordance representing the electronic message application without indication that there is a number of unread messages.

3. The non-transitory computer readable storage medium of claim 1, wherein the first set of one or more affordances associated with the electronic conversation includes one or more of:

an affordance associated with marking the electronic conversation as unread, an affordance associated with opening the electronic conversation on a second device, and a first affordance associated with a cancel action associated with the electronic conversation.

4. The non-transitory computer readable storage medium of claim 3, further comprising instructions which when executed by the one or more processors of the electronic device, cause the device to:

receive user input representing a touch associated with the first affordance associated with the cancel action; and in response to receiving user input representing the touch associated with the first affordance associated with the cancel action, replace display of the first set of one or more affordances with display of the electronic conversation.

5. The non-transitory computer readable storage medium of claim 3, further comprising instructions which when executed by the one or more processors of the electronic device, cause the device to:

receive user input representing a touch associated with the affordance associated with replying to the electronic conversation; and in response to receiving user input representing the touch associated with the affordance associated with replying to the electronic conversation, replace display of the first set of one or more affordances with a second set of one or more affordances associated with the electronic conversation.

6. The non-transitory computer readable storage medium of claim 5, wherein the second set of one or more affordances associated with the electronic conversation includes one or more of:

an affordance associated with smart response,
an affordance associated with emoji response,
an affordance associated with dictation, and
an affordance associated with keyboard.

7. The non-transitory computer readable storage medium of claim 6, further comprising instructions which when executed by the one or more processors of the electronic device, cause the device to:

receive user input representing a touch associated with the affordance associated with smart response; and in response to receiving user input representing the touch associated with the affordance associated with smart response, replace display of the second set of one or more affordances with display of one or more suggested responses.

8. The non-transitory computer readable storage medium of claim 7, further comprising instructions which when executed by the one or more processors of the electronic device, cause the device to:

receive user input representing a touch associated with a first suggested response of the one or more suggested responses; and in response to receiving user input representing the touch associated with the first suggested response, transmit the first suggested response.

9. The non-transitory computer readable storage medium of claim 6, further comprising instructions which when executed by the one or more processors of the electronic device, cause the device to:

receive user input representing a touch associated with a first suggested response of the one or more suggested responses; and in response to receiving user input representing the touch associated with the first suggested response, add the first suggested response as response information for the electronic conversation.

10. The non-transitory computer readable storage medium of claim 6, further comprising instructions which when executed by the one or more processors of the electronic device, cause the device to:

receive user input representing a touch associated with the affordance associated with emoji response; and in response to receiving user input representing the touch associated with the affordance associated with emoji response, replace display of the second set of one or more affordances with display of an interactive graphical object.

11. The non-transitory computer readable storage medium of claim 6, further comprising instructions which when executed by the one or more processors of the electronic device, cause the device to:

receive user input representing a touch associated with the affordance associated with dictation; and in response to receiving user input representing the touch associated with the affordance associated with dictation, replace display of the second set of one or more affordances with display of a dictation interface.

12. The non-transitory computer readable storage medium of claim 11, further comprising instructions which when executed by the one or more processors of the electronic device, cause the device to:

receive user input representing speech; and in response to receiving user input representing speech:
transcribe the user input representing speech, and
add the transcribed speech as response information for the electronic conversation.

13. The non-transitory computer readable storage medium of claim 3, further comprising instructions which when executed by the one or more processors of the electronic device, cause the device to:

receive user input representing a touch associated with the affordance associated with marking the electronic conversation as unread; and in response to receiving user input representing the touch associated with the affordance associated with marking the electronic conversation as unread, replace display of the first set of one or more affordances with display of the list of electronic conversation objects, including an unread indicator.

14. The non-transitory computer readable storage medium of claim 3, further comprising instructions which when executed by the one or more processors of the electronic device, cause the device to:

receive user input representing a touch associated with the affordance associated with opening the electronic conversation on a second device; and in response to receiving user input representing the touch associated with the affordance associated with opening the electronic conversation on a second device, cause the electronic conversation to be displayed on a linked companion device.

15. The non-transitory computer readable storage medium of claim 1, further comprising instructions which when executed by the one or more processors of the electronic device, cause the device to:

in accordance with the determination that the user input is a touch input on the affordance associated with replying to the electronic conversation and that the characteristic intensity of the touch is above the intensity threshold, display the set of one or more affordances corresponding to the one or more suggested responses.

16. A method, comprising:

at an electronic device with a rotatable input mechanism, a display, and a touch-sensitive surface configured to detect intensity of touches:

displaying, on the display, an affordance representing an electronic message application;

receiving user input activating the affordance representing the electronic message application;

displaying, on the display, a list of electronic conversation objects;

receiving user input activating an electronic conversation object of the list of electronic conversation objects;

in response to detecting the user input activating the electronic conversation object, displaying one or more messages in an electronic conversation corresponding to the activated electronic conversation object;

while displaying the electronic conversation, receiving user input;

in accordance with a determination that the user input is a rotation of the rotatable input mechanism:

determining one or more suggested responses to the electronic conversation object; and displaying a set of one or more affordances corresponding to the one or more suggested responses;

in accordance with a determination that the user input is a swipe input on the electronic conversation, displaying the set of one or more affordances corresponding to the one or more suggested responses;

in accordance with a determination that the user input is a touch on the electronic conversation:

in accordance with a determination that a characteristic intensity of the touch is above a intensity threshold, replacing display of the electronic conversation with a first set of one or more affordances associated with the electronic conversation, wherein the first set of one or more affordances associated with the electronic conversation includes an affordance associated with replying to the electronic conversation; and in accordance with a determination that the characteristic intensity of the touch is not above the intensity threshold, forgoing replacing display of the electronic conversation with the first set of one or more affordances associated with the electronic conversation.

17. The method of claim 16, further comprising:

determining whether there are a number of unread messages associated with the electronic message application;

in accordance with a determination that there is a number of unread messages associated with the electronic message application, displaying the affordance representing the electronic message application with an indication that a number of unread messages are associated with the electronic message application; and in accordance with a determination that there is not a number of unread messages associated with the electronic message application, displaying the affordance representing the electronic message application without indication that there is a number of unread messages.

18. The method of claim 16, wherein the first set of one or more affordances associated with the electronic conversation includes one or more of:

an affordance associated with marking the electronic conversation as unread, an affordance associated with opening the electronic conversation on a second device, and a first affordance associated with a cancel action associated with the electronic conversation.

19. The method of claim 18, further comprising:

receiving user input representing a touch associated with the first affordance associated with the cancel action; and in response to receiving user input representing the touch associated with the first affordance associated with the cancel action, replacing display of the first set of one or more affordances with display of the electronic conversation.

20. The method of claim 18, further comprising:

receiving user input representing a touch associated with the affordance associated with replying to the electronic conversation; and in response to receiving user input representing the touch associated with the affordance associated with replying to the electronic conversation, replacing display of the first set of one or more affordances with a second set of one or more affordances associated with the electronic conversation.

21. The method of claim 20, wherein the second set of one or more affordances associated with the electronic conversation includes one or more of:

an affordance associated with smart response, an affordance associated with emoji response, an affordance associated with dictation, and an affordance associated with keyboard.

22. The method of claim 21, further comprising:

receiving user input representing a touch associated with the affordance associated with smart response; and in response to receiving user input representing the touch associated with the affordance associated with smart response, replacing display of the second set of one or more affordances with display of one or more suggested responses.

23. The method of claim 22, further comprising:
receiving user input representing a touch associated with a first suggested response of the one or more suggested responses; and
in response to receiving user input representing the touch associated with the first suggested response, transmitting the first suggested response.

24. The method of claim 21, further comprising:
receiving user input representing a touch associated with a first suggested response of the one or more suggested responses; and
in response to receiving user input representing the touch associated with the first suggested response, adding the first suggested response as response information for the electronic conversation.

25. The method of claim 21, further comprising:
receiving user input representing a touch associated with the affordance associated with emoji response; and
in response to receiving user input representing the touch associated with the affordance associated with emoji response, replacing display of the second set of one or more affordances with display of an interactive graphical object.

26. The method of claim 21, further comprising:
receiving user input representing a touch associated with the affordance associated with dictation; and
in response to receiving user input representing the touch associated with the affordance associated with dictation, replacing display of the second set of one or more affordances with display of a dictation interface.

27. The method of claim 26, further comprising:
receiving user input representing speech; and
in response to receiving user input representing speech:
transcribing the user input representing speech, and
adding the transcribed speech as response information for the electronic conversation.

28. The method of claim 18, further comprising:
receiving user input representing a touch associated with the affordance associated with marking the electronic conversation as unread; and
in response to receiving user input representing the touch associated with the affordance associated with marking the electronic conversation as unread, replacing display of the first set of one or more affordances with display of the list of electronic conversation objects, including an unread indicator.

29. The method of claim 18, further comprising:
receiving user input representing a touch associated with the affordance associated with opening the electronic conversation on a second device; and
in response to receiving user input representing the touch associated with the affordance associated with opening the electronic conversation on a second device, causing the electronic conversation to be displayed on a linked companion device.

30. The method of claim 16, further comprising:
in accordance with the determination that the user input is a touch input on the affordance associated with replying to the electronic conversation and that the characteristic intensity of the touch is above the intensity threshold, displaying the set of one or more affordances corresponding to the one or more suggested responses.

31. An electronic device, comprising:
a display;
a touch-sensitive surface configured to detect intensity of touches;
a rotatable input mechanism;
one or more processors;
a memory; and
one or more programs, wherein the one or more programs are stored in the memory and configured to be executed by the one or more processors, the one or more programs including instructions for:
displaying, on the display, an affordance representing an electronic message application;
receiving user input activating the affordance representing the electronic message application displaying, on the display, a list of electronic conversation objects;
receiving user input activating an electronic conversation object of the list of electronic conversation objects;
in response to detecting the user input activating the electronic conversation object, displaying one or more messages in an electronic conversation corresponding to the activated electronic conversation object;
while displaying the electronic conversation, receiving user input;
in accordance with a determination that the user input is a rotation of the rotatable input mechanism:
determining one or more suggested responses to the electronic conversation object; and
displaying a set of one or more affordances corresponding to the one or more suggested responses;
in accordance with a determination that the user input is a swipe input on the electronic conversation, displaying the set of one or more affordances corresponding to the one or more suggested responses;
in accordance with a determination that the user input is a touch on the electronic conversation:
in accordance with a determination a the characteristic intensity of the touch is above a intensity threshold, replacing display of the electronic conversation with a first set of one or more affordances associated with the electronic conversation, wherein the first set of one or more affordances associated with the electronic conversation includes an affordance associated with replying to the electronic conversation; and
in accordance with a determination that the characteristic intensity of the touch is not above the intensity threshold, forgoing replacing display of the electronic conversation with the first set of one or more affordances associated with the electronic conversation.

32. The device of claim 31, the one or more programs further including instructions for:
determining whether there are a number of unread messages associated with the electronic message application;
in accordance with a determination that there is a number of unread messages associated with the electronic message application, displaying the affordance representing the electronic message application with an indication that a number of unread messages are associated with the electronic message application; and
in accordance with a determination that there is not a number of unread messages associated with the electronic message application, displaying the affordance representing the electronic message application without indication that there is a number of unread messages.

33. The device of claim 31, wherein the first set of one or more affordances associated with the electronic conversation includes one or more of:
- an affordance associated with marking the electronic conversation as unread,
- an affordance associated with opening the electronic conversation on a second device, and
- a first affordance associated with a cancel action associated with the electronic conversation.

34. The device of claim 33, the one or more programs further including instructions for:
- receiving user input representing a touch associated with the first affordance associated with the cancel action; and
- in response to receiving user input representing the touch associated with the first affordance associated with the cancel action, replacing display of the first set of one or more affordances with display of the electronic conversation.

35. The device of claim 33, the one or more programs further including instructions for:
- receiving user input representing a touch associated with the affordance associated with replying to the electronic conversation; and
- in response to receiving user input representing the touch associated with the affordance associated with replying to the electronic conversation, replacing display of the first set of one or more affordances with a second set of one or more affordances associated with the electronic conversation.

36. The device of claim 35, wherein the second set of one or more affordances associated with the electronic conversation includes one or more of:
- an affordance associated with smart response,
- an affordance associated with emoji response,
- an affordance associated with dictation, and
- an affordance associated with keyboard.

37. The device of claim 36, the one or more programs further including instructions for:
- receiving user input representing a touch associated with the affordance associated with smart response; and
- in response to receiving user input representing the touch associated with the affordance associated with smart response, replacing display of the second set of one or more affordances with display of one or more suggested responses.

38. The device of claim 37, the one or more programs further including instructions for:
- receiving user input representing a touch associated with a first suggested response of the one or more suggested responses; and
- in response to receiving user input representing the touch associated with the first suggested response, transmitting the first suggested response.

39. The device of claim 36, the one or more programs further including instructions for:
- receiving user input representing a touch associated with a first suggested response of the one or more suggested responses; and
- in response to receiving user input representing the touch associated with the first suggested response, adding the first suggested response as response information for the electronic conversation.

40. The device of claim 36, the one or more programs further including instructions for:
- receiving user input representing a touch associated with the affordance associated with emoji response; and
- in response to receiving user input representing the touch associated with the affordance associated with emoji response, replacing display of the second set of one or more affordances with display of an interactive graphical object.

41. The device of claim 36, the one or more programs further including instructions for:
- receiving user input representing a touch associated with the affordance associated with dictation; and
- in response to receiving user input representing the touch associated with the affordance associated with dictation, replacing display of the second set of one or more affordances with display of a dictation interface.

42. The device of claim 41, the one or more programs further including instructions for:
- receiving user input representing speech; and
- in response to receiving user input representing speech:
  - transcribing the user input representing speech, and
  - adding the transcribed speech as response information for the electronic conversation.

43. The device of claim 33, the one or more programs further including instructions for:
- receiving user input representing a touch associated with the affordance associated with marking the electronic conversation as unread; and
- in response to receiving user input representing the touch associated with the affordance associated with marking the electronic conversation as unread, replacing display of the first set of one or more affordances with display of the list of electronic conversation objects, including an unread indicator.

44. The device of claim 33, the one or more programs further including instructions for:
- receiving user input representing a touch associated with the affordance associated with opening the electronic conversation on a second device; and
- in response to receiving user input representing the touch associated with the affordance associated with opening the electronic conversation on a second device, causing the electronic conversation to be displayed on a linked companion device.

45. The device of claim 31, the one or more programs further including instructions for:
- in accordance with the determination that the user input is a touch input on the affordance associated with replying to the electronic conversation and that the characteristic intensity of the touch is above the intensity threshold, displaying the set of one or more affordances corresponding to the one or more suggested responses.

* * * * *